US012762863B2

(12) United States Patent
Musiani et al.

(10) Patent No.: US 12,762,863 B2
(45) Date of Patent: Oct. 13, 2026

(54) SYSTEM AND METHOD TO DETECT SCAN AVOIDANCE BEHAVIOR

(71) Applicant: Datalogic IP Tech, S.r.l., Bologna (IT)

(72) Inventors: Roberto Musiani, Bologna (IT); Angelo Carraggi, Bologna (IT); Maurizio De Girolami, Bologna (IT); Lorenzo Vorabbi, Rimini (IT)

(73) Assignee: Datalogic IP Tech, S.r.l., Bologna (IT)

( * ) Notice: Subject to any disclaimer, the term of this patent is extended or adjusted under 35 U.S.C. 154(b) by 0 days.

(21) Appl. No.: 19/006,568

(22) Filed: Dec. 31, 2024

(65) Prior Publication Data

US 2026/0188014 A1 Jul. 2, 2026

(51) Int. Cl.

| | |
|---|---|
| ***G06V 20/52*** | (2022.01) |
| ***G06Q 20/20*** | (2012.01) |
| ***G06T 7/12*** | (2017.01) |
| ***G06T 7/20*** | (2017.01) |
| ***G06T 7/50*** | (2017.01) |
| ***G06V 10/25*** | (2022.01) |
| ***G06V 10/26*** | (2022.01) |
| ***G06V 10/764*** | (2022.01) |
| ***G06V 40/20*** | (2022.01) |

(52) U.S. Cl.

CPC ........... *G06V 20/52* (2022.01); *G06Q 20/208* (2013.01); *G06T 7/12* (2017.01); *G06T 7/20* (2013.01); *G06T 7/50* (2017.01); *G06V 10/25* (2022.01); *G06V 10/267* (2022.01); *G06V 10/764* (2022.01); *G06V 40/28* (2022.01); *G06V 2201/07* (2022.01)

(58) Field of Classification Search

CPC ........ G06V 20/52; G06V 10/25; G06V 40/28; G06V 10/267; G06V 10/764; G06T 7/12; G06T 7/50; G06T 7/20; G06Q 20/208

See application file for complete search history.

(56) References Cited

U.S. PATENT DOCUMENTS

| | | | | |
|---|---|---|---|---|
| 6,236,736 | B1 | 5/2001 | Crabtree et al. | |
| 2013/0039409 | A1* | 2/2013 | Gupta .................... | G06V 10/25 375/E7.126 |
| 2020/0193407 | A1* | 6/2020 | Costello ........... | G06Q 20/40155 |
| 2020/0279310 | A1* | 9/2020 | Kundu ................. | G07G 1/0036 |
| 2021/0280027 | A1 | 9/2021 | Wen et al. | |
| 2021/0374375 | A1* | 12/2021 | Gururaja .............. | G06K 7/1439 |

(Continued)

OTHER PUBLICATIONS

Extended European Search Report for European Application No. 25227398.2-1218 mailed Jun. 2, 2026, 10 pages.

*Primary Examiner* — Mishawn N. Hunter
(74) *Attorney, Agent, or Firm* — Cozen O'Connor

(57) ABSTRACT

Systems and methods detect scan avoidance behaviors at a self-service point-of-sale (POS) terminal. The system includes a camera positioned to capture video images of an operational area of the POS terminal and a computer that determines when movement of an item by a customer operating the POS terminal indicates scan avoidance. The computer receives video images from the camera, preprocesses frames of the video images to suppress background and to track the movement of the item from a pickup area of the POS terminal, through a scan area of a scanner of the POS terminal, and to a bagging area of the POS terminal. The system may also include a 3D sensor for detecting depth data that is used to improve hand-item contact.

20 Claims, 38 Drawing Sheets

(56) References Cited

U.S. PATENT DOCUMENTS

| | | | |
|---|---|---|---|
| 2023/0101001 A1 | 3/2023 | Ushijima et al. | |
| 2023/0186266 A1* | 6/2023 | Johnson | G07G 1/0063 705/20 |
| 2023/0368625 A1* | 11/2023 | Sanil | G06Q 20/18 |
| 2024/0005292 A1 | 1/2024 | Engelnkemper et al. | |
| 2024/0193993 A1 | 6/2024 | Ishida et al. | |

* cited by examiner

SYSTEM AND METHOD TO DETECT SCAN AVOIDANCE BEHAVIOR

FIELD

The present application is directed to self-service checkout at a retail store, and more particularly to monitoring actions of a customer a self-service checkout to detect when an item is not scanned.

BACKGROUND

A self-service point-of-sale terminal, also known as self-service checkout or self-checkout (SCOs) is a retail point-of-sale (POS) terminal that allows a customers to complete their own transaction at a retail store without needing the conventional one-to-one staff assistance.

While self-service checkout systems have been proposed since the 1980s and there is currently a strong trend toward the development/deployment of "checkout free systems" or "frictionless" systems with notable attempts by: Amazon (Amazon GO), Walmart, Alibaba (Hema), NCR, and Malong, and other companies in the retail field, the currently available systems have practical limitations due to the necessity/difficulty to guarantee a seamless and issue free self-checkout process.

Without a representative (e.g., a human cashier/operator) of the retail store performing the checkout, the system is vulnerable to a variety of issues, such as fraudulent behavior (e.g., shoplifting, sweethearting, label swapping, etc.) by a customer where items are not scanned and taken from the retail store. Fraudulent behavior may include the customer doing one or more of: faking the scanning action, hiding the barcode from the scanner, leaving items in the shopping cart, passing multiple items across the scanner that cannot scans all the items, and/or replacing the original barcode with another one. However, scanning errors may also occur when a customer makes a mistake, such as when having scanning difficulties, when forgetting items, inadvertent missed scans, and so on.

SUMMARY

For the above reasons, retail stores desire improvement of self-service point-of-sale terminals to prevent loss. Accordingly, there is a need for a smart checkout process that provides a seamless checkout experience while managing the variability and unpredictability of real-life behavior at the self-service point-of-sale terminal. The complexity of the checkout process requires a secure and efficient solution using a variety of technology innovations to ensure the customer self-checkout process take place in a correct and easy manner. Images from a camera (e.g., RGB camera) are processed to determine behavior of the customer scanning items at the self-service POS terminal, whereby an alert is generated when the customer exhibits malevolent behavior.

One aspect of the present embodiments includes the realization even with advanced neural network models, reliability of detecting scan avoidance, and the equally problematic alerts to scan avoidance when all items were scanned, are in need of improvement to make the scan avoidance detection acceptable in the retail environment. The present embodiments solve this problem by implementing several innovative key contributions such as by improving hand and connected item detection to provide reliable information to a downstream customer activities classifier and by improving analysis and classification of customer activities at the self-service point-of-sale terminals. These improvements provide reliable lightweight scan avoidance detection that may reduce or prevent loss while reducing false positive alerts.

Another aspect of the present embodiments include the realization that hand detection and hand-item association improvements are needed to increase reliability of scan avoidance detection. The present embodiments solve this problem by improving hand recognition in images from a 2D RGB camera and by using a 3D sensor, mounted with the 2D RGB camera, to improve hand-item association reliability. Advantageously, these improvements further improve the reliability of scan avoidance detection.

In certain embodiments, the techniques described herein relate to a system to detect scan avoidance behavior, including: a camera positioned to capture video images of an operational area of a self-service point-of-sale terminal; and a computer having a processor and memory storing machine-executable instructions that, when executed by the processor, control the processor to: receive video images from the camera; preprocess frames of the video images to suppress background; process the video images to track movement, by a customer operating the self-service point-of-sale terminal, of an item from a pickup area of the self-service point-of-sale terminal, through a scan area of a scanner of the self-service point-of-sale terminal, and to a bagging area of the self-service point-of-sale terminal; determine when the movement indicates scan avoidance.

In certain embodiments, the techniques described herein relate to a method for detecting scan avoidance behavior at a self-service point-of-sale terminal, including: determining a hand bounding region indicative of a region in an image occupied by a hand of a consumer; generating a polarized extension of the hand bounding region; determining a segmented hand and object connection based on the polarized extension; applying at least one hand-item contact classification rule to determine whether the hand is carrying an item; and determining scan avoidance behavior when the hand drops the item in a bagging area of the self-service point-of-sale terminal without a machine-readable code scan event.

BRIEF DESCRIPTION OF THE FIGURES

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE EMBODIMENTS

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with scanners, safety laser scanners, computers, processors (hardware processors) memory or other storage have not been shown or described in detail to avoid unnecessarily obscuring descriptions of the various implementations and embodiments.

Unless the context requires otherwise, throughout the specification and claims which follow, the word "comprise"

and variations thereof, such as, "comprises" and "comprising" are to be construed in an open, inclusive sense that is as "including, but not limited to."

Reference throughout this specification to "one implementation" or "an implementation" or "one embodiment" or "an embodiment" means that a particular feature, structure or characteristic described in connection with the embodiment is included in at least one implementation or embodiment. Thus, the appearances of the phrases "one implementation" or "an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1A:
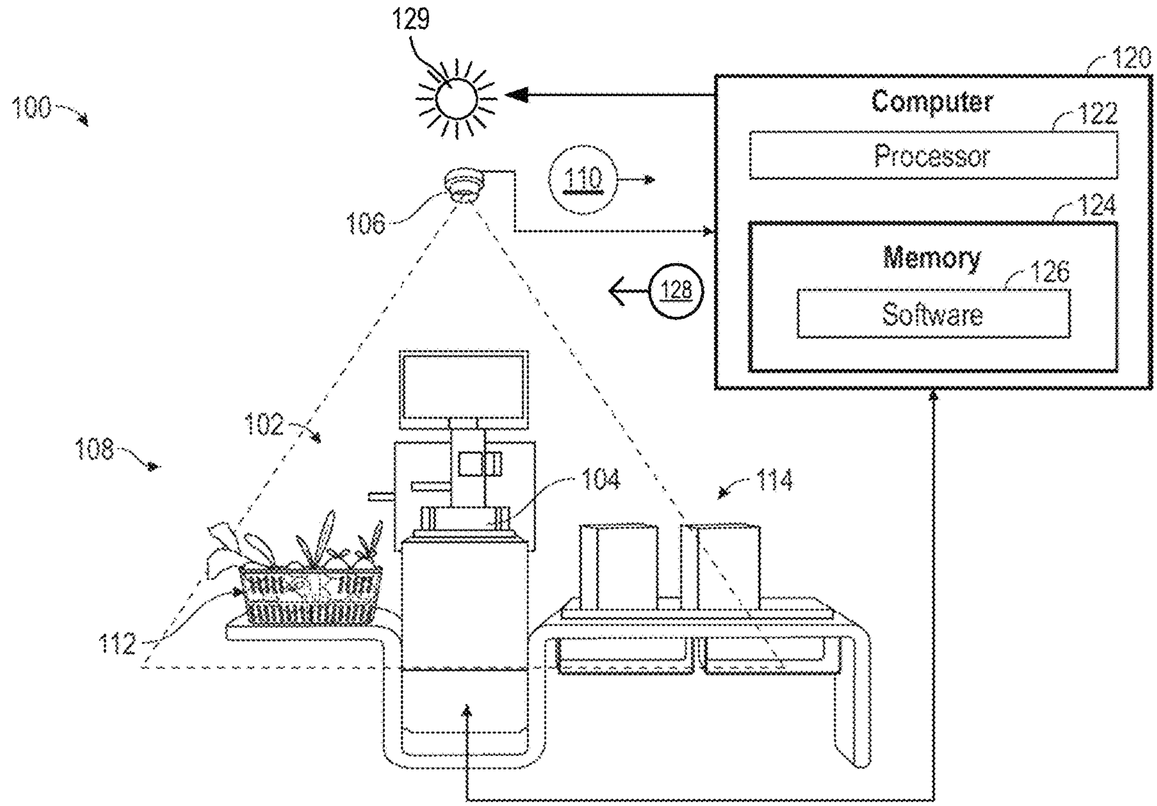
FIG. 1A is a schematic diagram illustrating one example lightweight system for detecting scan avoidance behavior to prevent loss in retail, in embodiments.

FIG. 1A is a schematic diagram illustrating one example lightweight system 100 for detecting scan avoidance behavior to prevent loss in retail, in embodiments. Herein, the term "lightweight" means requiring little computational power as compared to other computationally intensive techniques for tracking human movement. System 100 includes a self-service point-of-sale terminal 102 (POS terminal 102) with a scanner 104 for scanning machine-readable symbols (e.g., one-dimensional symbols such as barcodes, two-dimensional symbols such as matrix code symbols, QR codes, etc.) on labels of items being purchased. Machine-readable symbols, also referred to as codes herein, are typically comprised of symbol elements defined by a corresponding machine-readable symbology. System 100 also includes a camera 106 positioned above self-service point-of-sale terminal 102 to have a field-of-view that includes an operational area 108 of POS terminal 102. In certain embodiments, camera 106 is a conventional, inexpensive, RGB camera. In other embodiments, as described below, additional cameras and/or 3D sensors may be used for improved reliability.

System 100 also includes a computer 120 with a processor 122 and memory 124 storing software 126 that includes machine-readable instructions that are executable by processor 122 to implement functionality of system 100 as described herein. Computer 120 implements a powerful data processing pipeline that is configured to interpret people's actions and detect scan avoidance behaviors. During operation of POS terminal 102, camera 106 may continuously capture and send video images 110 of operational area 108 to computer 120, while in some embodiments the camera 106 may "wake up" responsive to certain predetermined events such as when a person approaches the POS terminal 102. Software 126 causes processor 122 to process video images 110 to detect scan avoidance, as described in further detail below. Operational area 108 includes a pickup area 112 where items are placed prior to scanning and a bagging area 114 where items are placed after scanning.

When scan avoidance is identified, software 126 generates an alert 128 such that security personnel at the retail store may perform a post checkout control of the customer's basket against the transaction (e.g., receipt). Alert 128 may identify POS terminal 102 and may include details of a current transaction at POS terminal 102.

Alert 128 may be one or more of a discreet message (e.g., text, notification, etc.) to security personnel at the retail store, a light 129, possibly flashing, at POS terminal 102, a barrier near POS terminal 102 that closes to direct the customer to a security control area, and so on. A type of alert 128 may be selected based on the type and location of the retail store, for example.

Figure 1B:
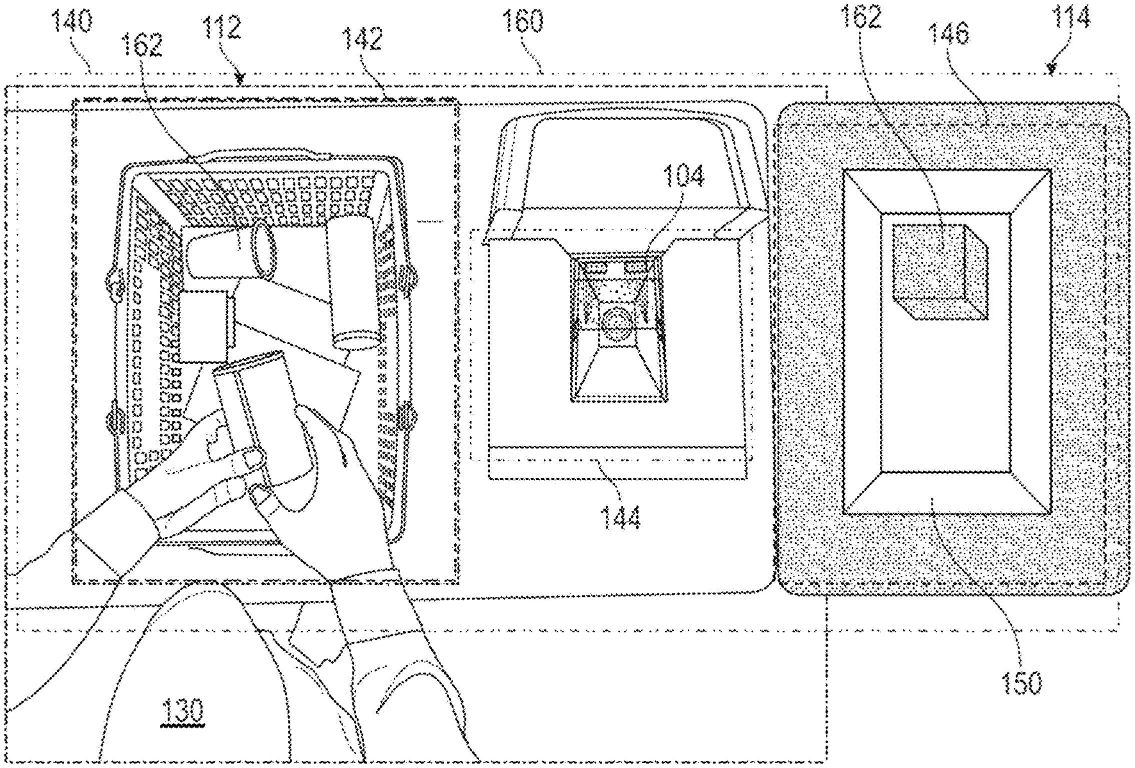
FIG. 1B shows one example frame of video images illustrating a customer scanning items at the POS terminal of FIG. 1A, in embodiments.

FIG. 1B shows one example frame 160 of video images 110 illustrating a customer 130 scanning items 162 at POS terminal 102. FIGS. 1A and 1B are best viewed together with the following description. Software 126 processes a self-checkout region of interest (ROI) 140 of frame 160, which includes an item-pickup ROI 142 that corresponds to pickup area 112, an item-scan ROI 144 that corresponds to scanner 104, and an item-drop ROI 146 that corresponds to bagging area 114. Software 126 implements a plurality of algorithms that monitor behavior of customer 130 as items 162 (e.g., grocery items) are picked up from pickup area 112, moved across scanner 104, and dropped into bagging area 114.

Figure 2:
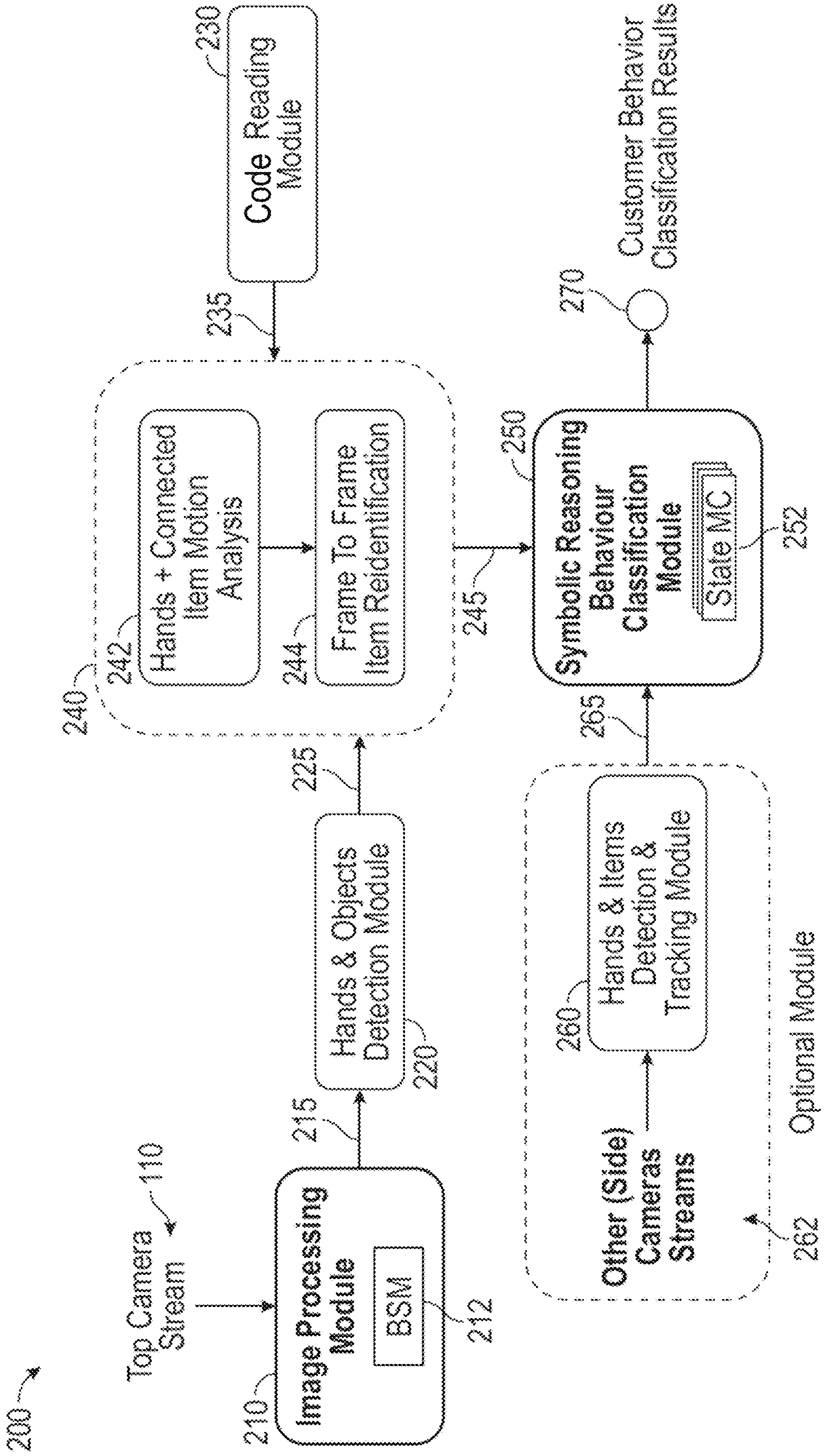
FIG. 2 is a block diagram illustrating one example data processing pipeline implemented by software of FIG. 1A, in embodiments.
Figure 3A:
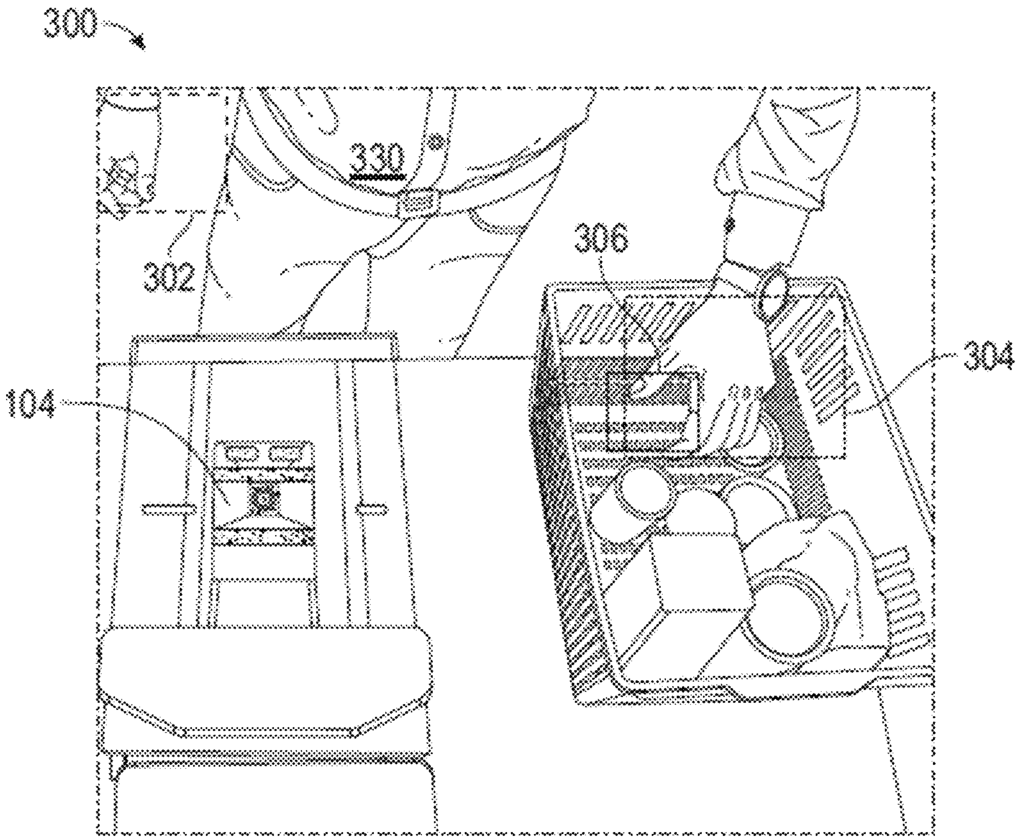
FIGS. 3A, 3B, 3C, and 3D show image recognition problems of prior art detection based on video images.
Figure 3B:
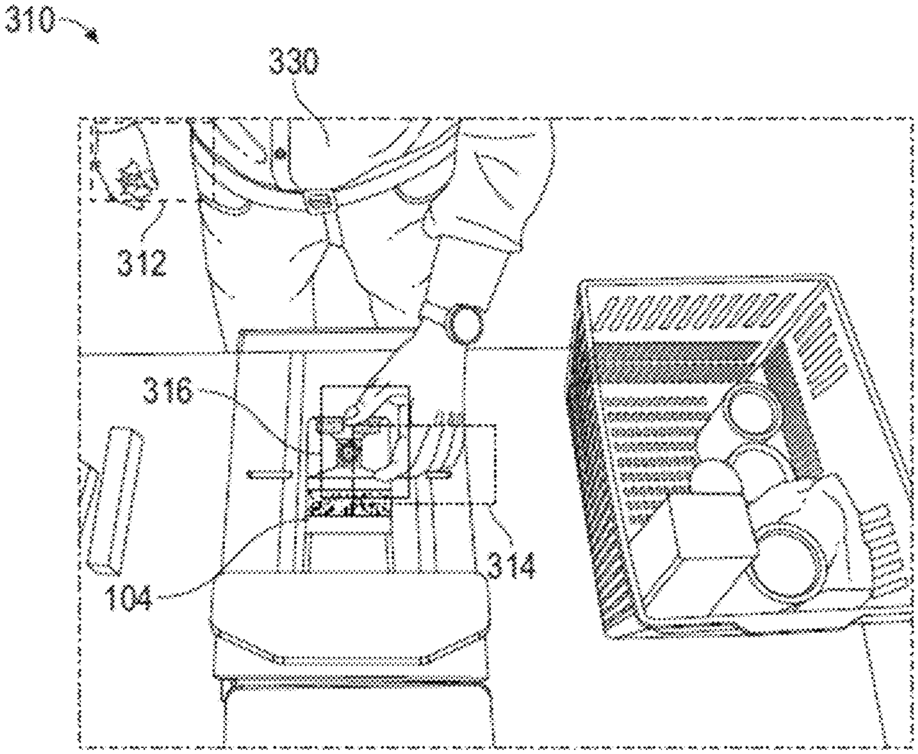
Figure 3C:
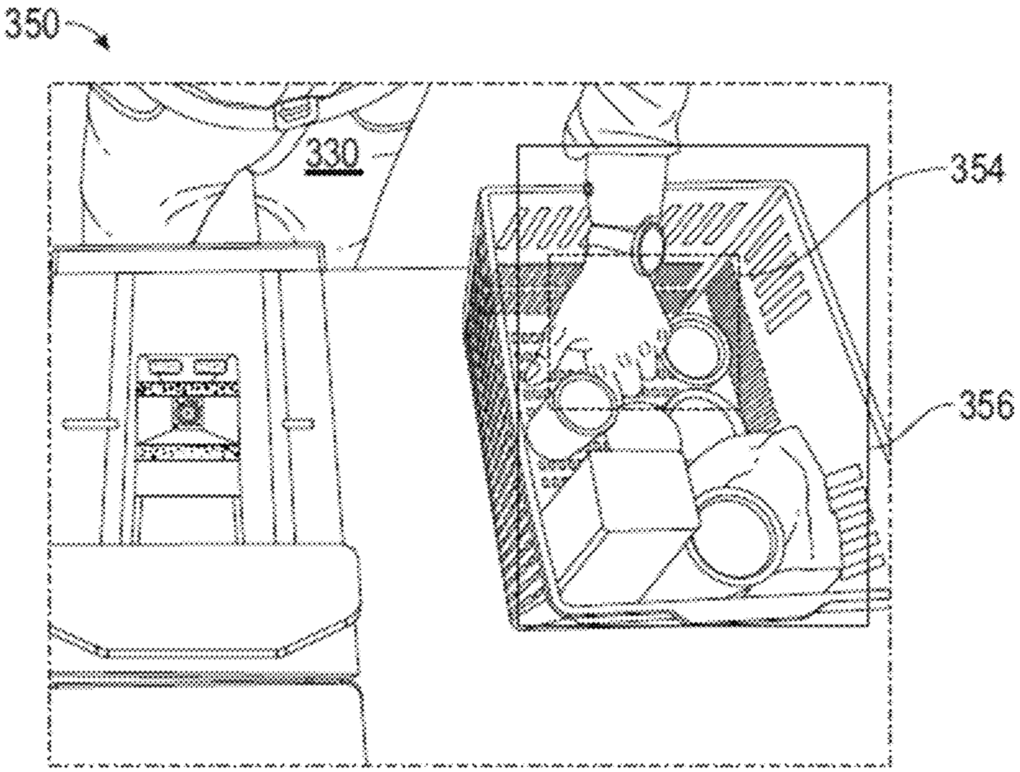
Figure 3D:
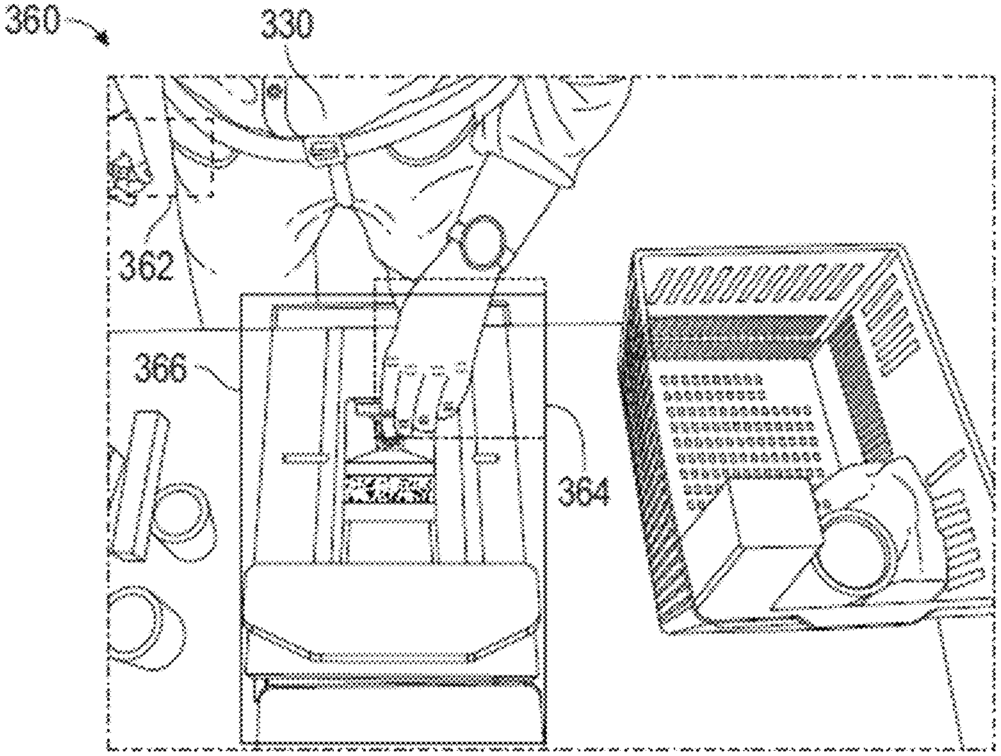

FIG. 2 is a block diagram illustrating one example data processing pipeline 200 implemented by software 126 of FIG. 1A, in embodiments. Data processing pipeline 200 includes an image preprocessing module 210, a hands and objects detection module 220, a code reading module 230, a hands and items tracking and filtering module 240, and a symbolic reasoning behavior classification module 250.

Image preprocessing module 210 receives video images 110 (e.g., top camera stream) from camera 106 and processes video images 110 using a custom background suppression model (BSM) 212 that generates a preprocessed output 215 that simplifies and improves operation of hands and objects detection module 220 and hands and items tracking and filtering module 240.

In some embodiments, when system 100 includes additional cameras (e.g., side cameras) and/or 3D sensors, data processing pipeline 200 may include an optional hands and items detection and tracking module 260 that receives and processes these additional streams 262 (e.g., other (side) camera streams) to generate additional information 265 to symbolic reasoning behavior classification module 250. Hands and items detection and tracking module 260 may implement functionality similar to hands and objects detection module 220 and hands and items tracking and filtering module 240.

Hands and objects detection module 220 detects hands and any connected objects present in preprocessed output 215, sending the identified hands and objects to filtering module 240 as hand-object data 225. Code reading module 230 may send code reading events 235 to hands and items tracking and filtering module 240. For example, code reading module 230 may receive code reading events from scanner 104 when scanner 104 successfully decodes machine-readable symbols of item 162 as it passes through an operational volume of scanner 104. Over successive frames of video images 110, hands and items tracking and filtering module 240 uses motion analysis algorithm 242 and frame to frame item reidentification algorithm 244 to generate movement data 245 that includes accumulated hand-items features with associated trajectories and code reading events 235.

Symbolic reasoning behavior classification module 250 processes movement data 245, which effectively includes detected spatio-temporal feature sequences, and additional information 265 from hands and items detecting and tracking module 260 when included, to generate customer behavior classification results 270 that are based on the customer's activities. For example, customer behavior classification results 270 define the customer's activities as good behavior or misbehavior according to, but not limited to, a predefined set of behaviors. This predefined set of behaviors may include one or more of regular scanning, out of scan volume, another item covering first item, thumb or fingers covering part or all of a machine-readable code of the item, machine-readable code replacement, and other behavior. In certain embodiments, for at least a subset of items (e.g., high value items), tracking and filtering module 240 detects a mismatch between a defined visual appearance of an item identified by code reading events 235 and the visual appearance of the item captured in video images 110. This mismatch indicates potential switching of the machine-readable symbols on the item.

In certain embodiments, data processing pipeline 200 may overlay bounding regions on video images 110 to indicate customer behavior classification results 270. For example, the bounding regions are positioned to indicate the identified features in the image, where the color of the bounding region indicates the determined customer behavior.

Detection Problems

Prior art scan avoidance detection systems for self-service POS terminals have problems with hand detection and further with hand and connected item interaction status classification. Even where the prior art is using advanced machine learning detection models, the prior art systems lack the ability to detect the customer's hands and reliably determine whether the hands are in contact with an item intended for scanning or not.

FIGS. 3A, 3B, 3C, and 3D show image recognition problems of prior art detection based on video images. FIGS. 3A, 3B, 3C, and 3D show four frames 300, 310, 350, and 360, respectively, from video of a customer 330 scanning items. Frames 300, 310, 350, and 360 are from different times during normal scanning (e.g., no attempted scan avoidance) of two different items by a customer 330. Recognition is illustratively shown in frames 300, 310, 350, and 360 as rectangles overlayed onto the areas containing the recognized object (e.g., hands and shopping items).

Frame 300 illustrates customer 330 picking up an item from a pickup area (e.g., pickup area 112 of FIG. 1A) and frame 310 illustrates customer 330 moving the item across a scanner (e.g., scanner 104), demonstrating good recognition of the customer's hands and of the item being held within the left hand of the customer. In frame 300, a right hand of customer 330 is recognized as not holding an item as indicated by a rectangle 302 and the customer's left hand is recognized, as indicated by rectangle 304, is holding an item indicated by rectangle 306 as not yet scanned. In frame 310, rectangle 312 indicates that the customer's right hand is recognized and rectangle 314 indicates the left hand of customer 330 is recognized, and rectangle 316 indicates the held item has not been scanned. In this example, rectangles 302, 304, 306, 312, 314, and 316 are correctly sized for the hands and item, indicating good recognition.

Frame 350 illustrates customer 330 picking up an item from the pickup area and frame 360 illustrates customer moving the item across the scanner; however, the prior art system demonstrates poor recognition of the item being held within the left hand of the customer. In frame 350, the right hand of customer 330 is not visible and left hand of customer 330 is recognized as indicated by rectangle 354; however, the recognized item, indicated by rectangle 356, is not recognized correctly since rectangle 356 includes the shopping basket and not an item being carried by the left hand. In frame 360, rectangle 362 indicates the right hand of customer 330 is recognized and rectangle 364 indicates the left hand of customer 330 is recognized; however, the recognized item, indicated by rectangle 366, is incorrectly recognized as rectangle 366 includes scanner 104. Frames 350 and 360 indicate the difficulty in prior art item recognition using 2D images.

Image Preprocessing Module

Where scene 3D information is unavailable, the present embodiments improve prior art solutions for scan avoidance detection by invoking a background suppression model 212 (BSM 212) within image preprocessing module 210 of FIG. 2. Advantageously, after background suppression model 212, preprocessed output 215 enables hands and objects detection module 220 and hands and items tracking and filtering module 240 to focus only on the relevant parts of video images 110 and not the entire scene.

Figure 4A:
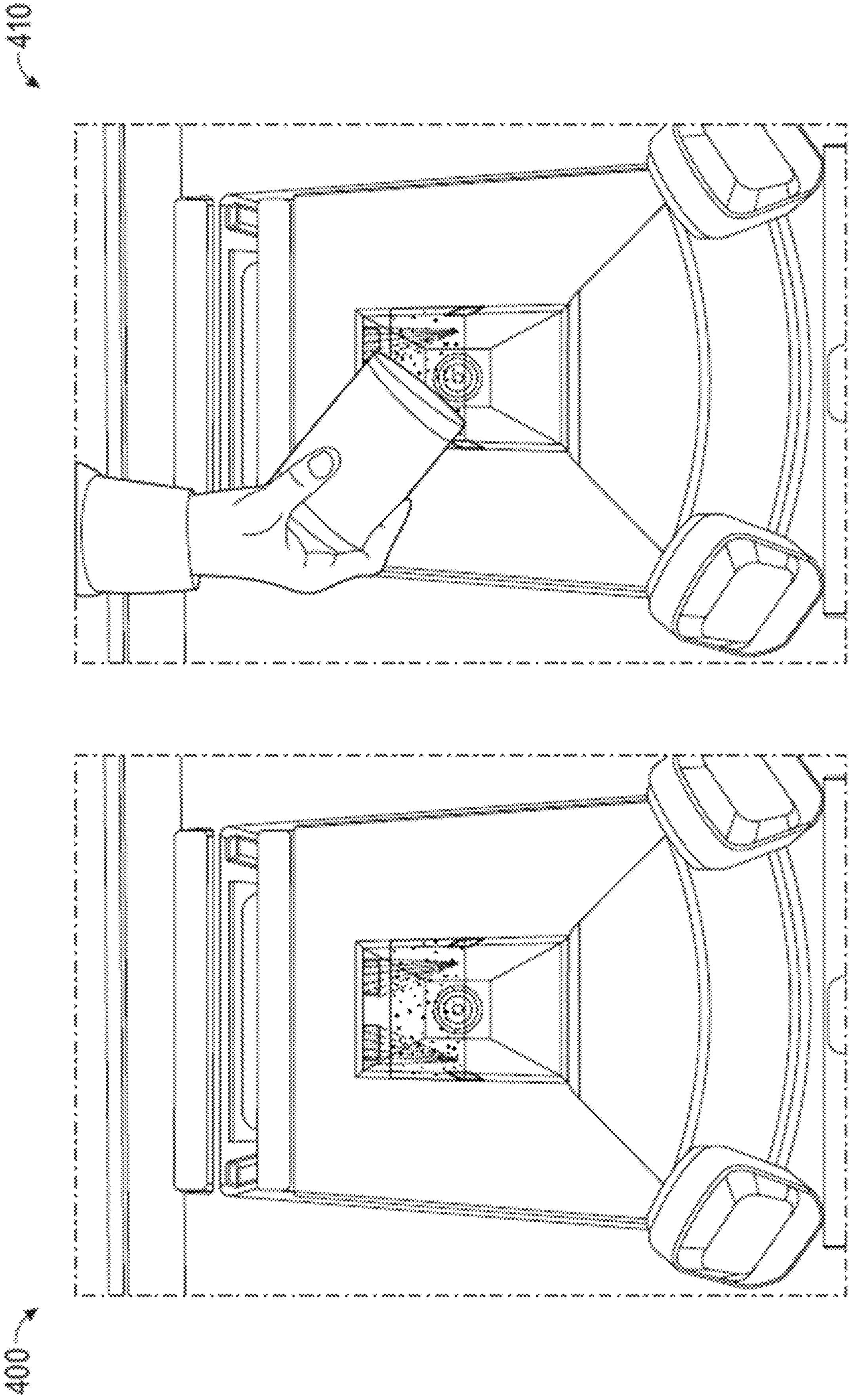
FIG. 4A shows a normal image of the operational area of the POS terminal of FIG. 1A without customer interact and an abnormal image of the operational area that includes customer interaction.

FIG. 4A shows a normal image 400 of operational area 108 of POS terminal 102 without customer interact and an abnormal image 410 of operational area 108 that includes customer interaction. Background suppression model 212 may include a pretrained neural network model that generates an output that describes visual features contained within the image of operational area 108. Accordingly, background suppression model 212 may also be referred to as an unsupervised background suppression model. Background suppression model 212 effectively defines differences between abnormal image 410 and normal image 400.

Figure 4B:
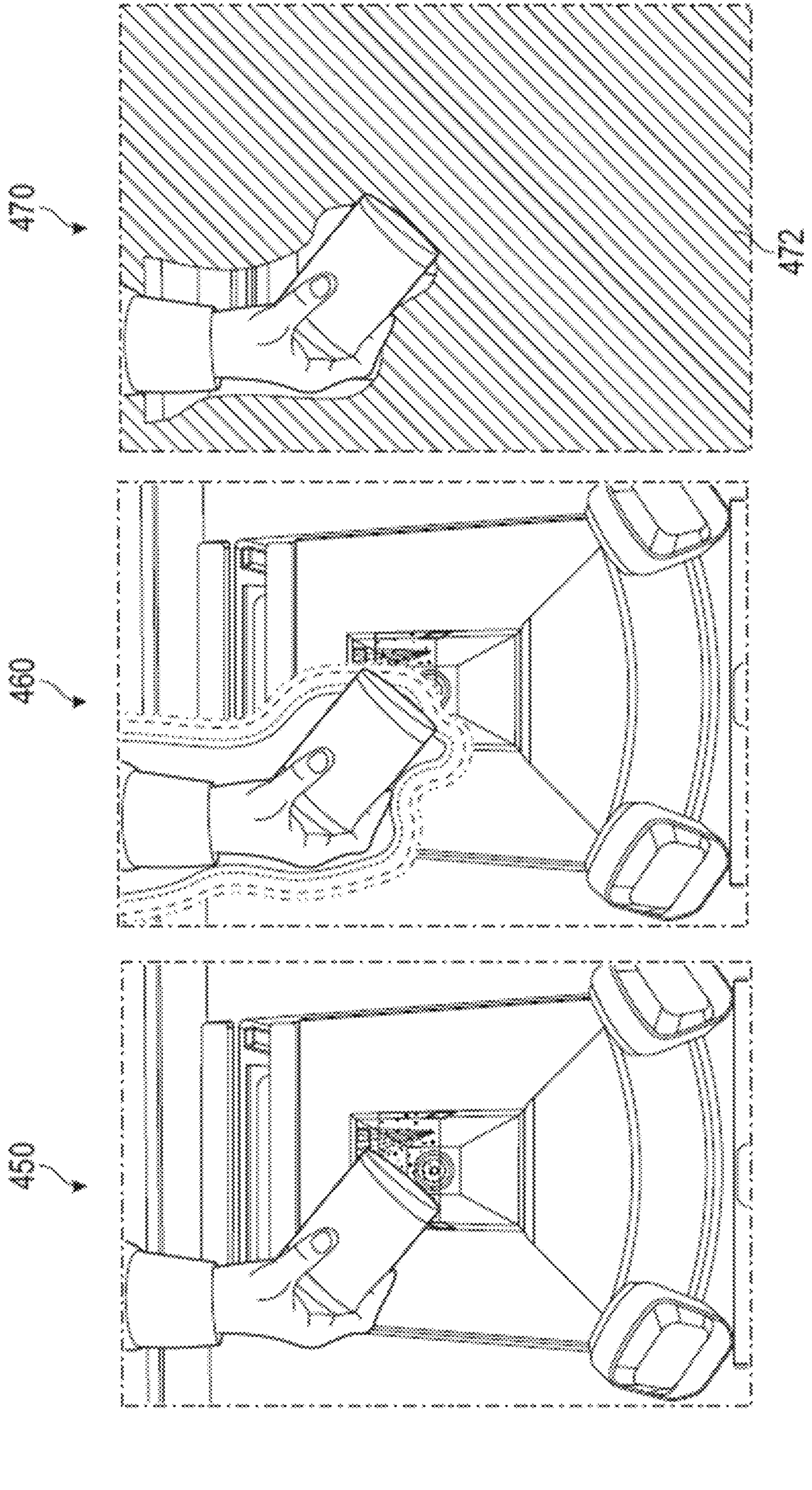
FIG. 4B shows example steps of unsupervised background suppression by background suppression model, in embodiments.

FIG. 4B shows example steps of unsupervised background suppression by background suppression model 212, in embodiments. Background suppression model 212 extracts the most relevant features from normal image 400 to generate a segmentation mask. The result, shown in the steps of FIG. 4B, highlight the capability of background suppression model 212 to generate a segmentation mask 472 that restricts the image information to include only the customer and item interactions within operational area 108 (e.g., considered an anomaly scenario).

Figure 5A:
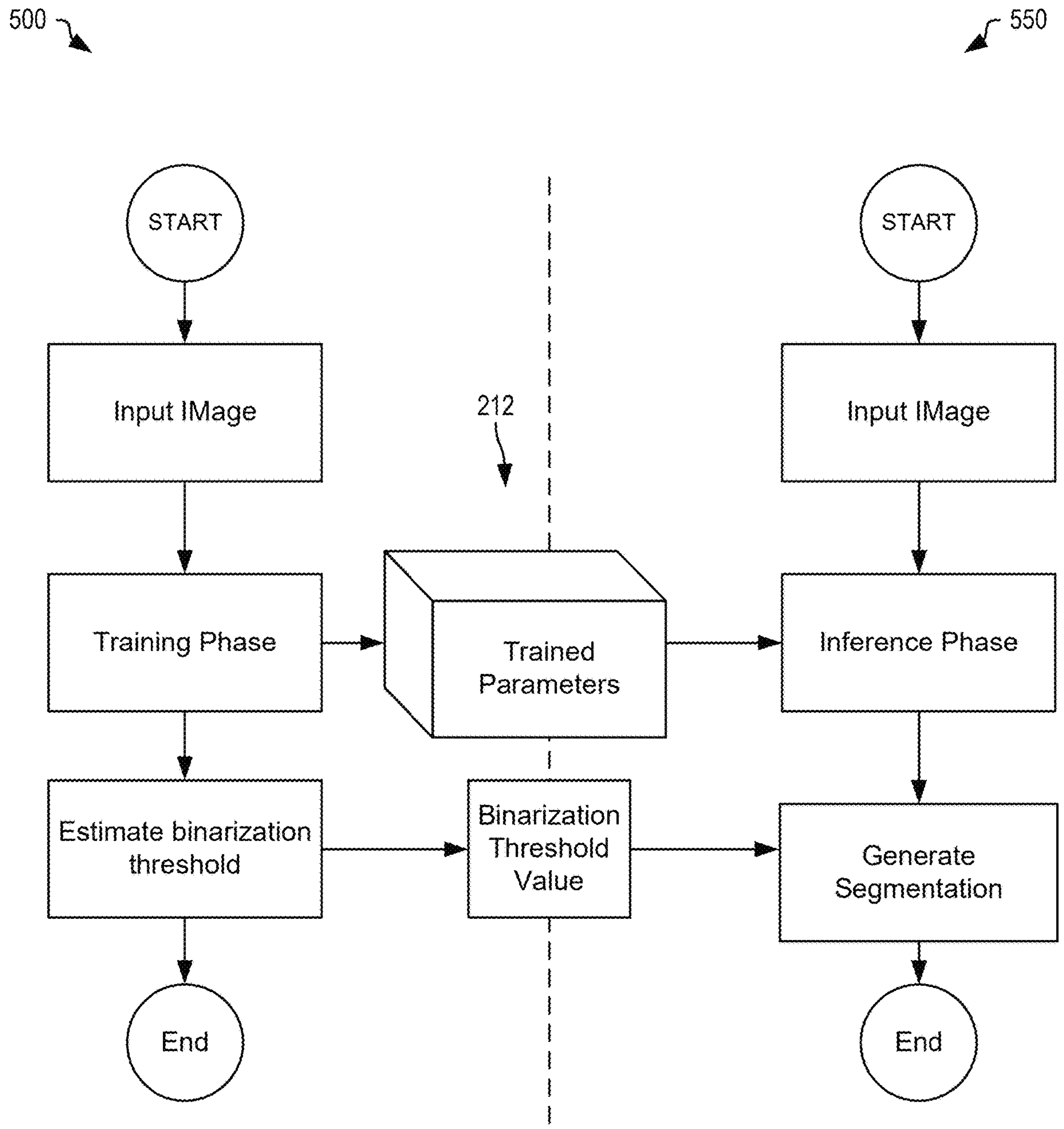
FIG. 5A is a block diagram illustrating an example workflow that provides an overview of the background suppression model of FIG. 2 for both a training phase and an inference phase, in embodiments.
Figure 5B:
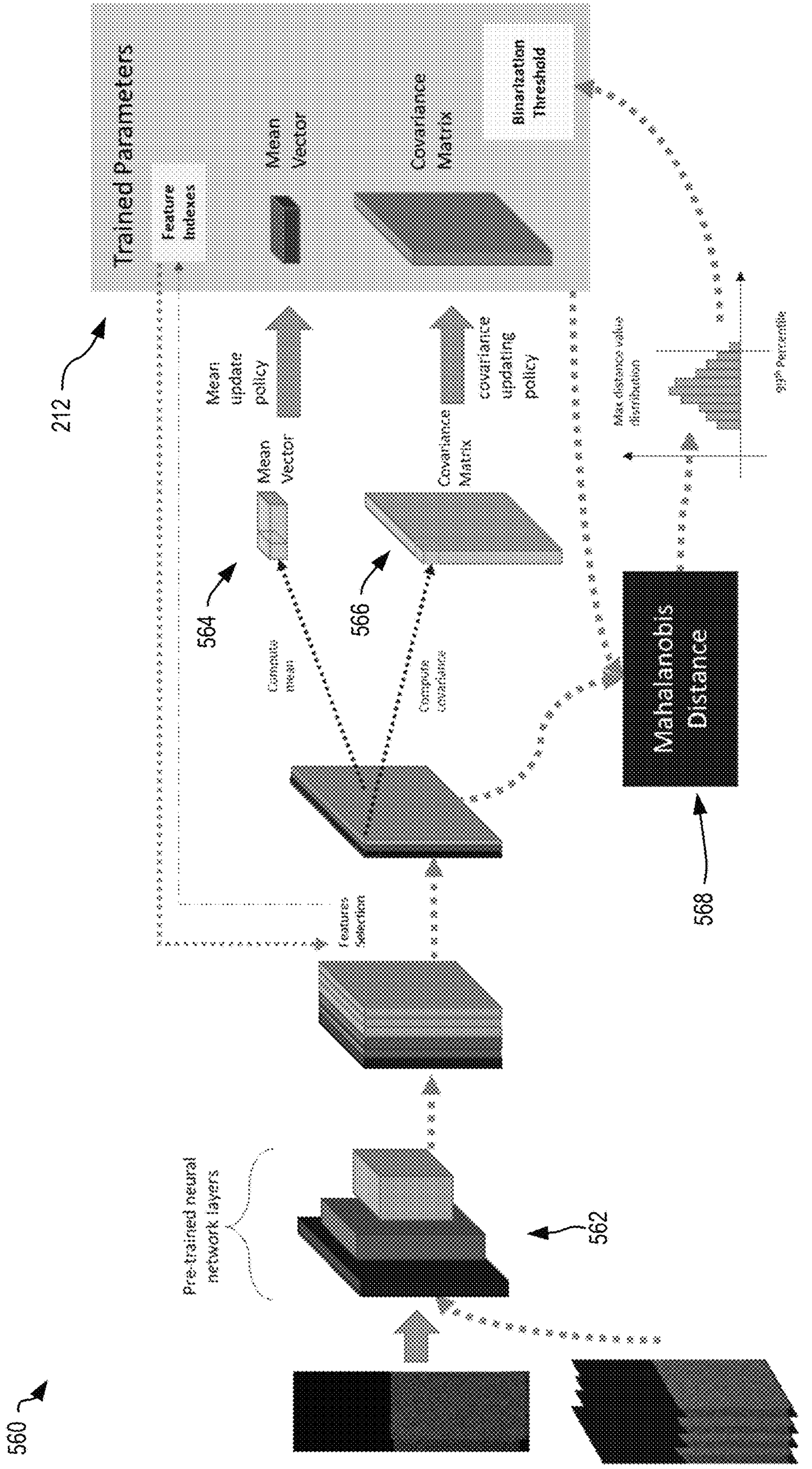
FIG. 5B is a schematic diagram illustrating example background suppression, in embodiments.

FIG. 5A is a block diagram illustrating an example workflow that provides an overview of background suppression model 212 of FIG. 2 for both a training phase 500 and an inference phase 550, in embodiments. FIG. 5B is a schematic diagram illustrating training phase 500 of FIG. 5A in further example detail. Training phase 500 generates an ensemble of summary features called "trained parameters" without the need to fine tune the pretrained model weights. This guarantees a brief model training time and reduces the computational hardware power required to implement inference phase 550.

In certain embodiments, N training images representing the normal scene background are collected, every image is divided into M rectangular patches, and for each patch relevant features are computed as embeddings using certain selected layers of a pretrained neural network 562. For every patch, multiple embeddings are collected using the N training images, and Gaussian distributions parameters are learned from these data as mean values (see mean vector 564) and covariances (see covariance matrix 566). These trained parameters represent/model the background signature.

At run time, during inference phase 550, given an input image, a similar process is used to compute the input image patch embeddings which are then compared with the trained Gaussian parameters and everything that deviates too much from these reference distributions (e.g., based on Mahalanobis distance 568) highlight an image patch/region that differs significantly from the training images, does not belong to the background, and therefore contributes to generate a segmentation mask of the foreground region as shown in FIG. 5A.

Symbolic Reasoning Behavior Classification Module

Analyzing human behavior within video images 110 presents a complex challenge, often necessitating a substantial amount of labeled data for training machine learning models. These models, which may include 3D Convolutional Neural Networks (CNNs), Recurrent Neural Networks (RNNs), (Bi)LSTMs, and Transformers, are designed to extract both spatial and temporal features. However, the availability of such labeled data is not always guaranteed. In light of the repetitive nature of scanning actions, symbolic reasoning behavior classification module 250 implements an alternative lightweight (e.g., requiring little computational power) solution that is based on symbolic reasoning. Specifically, symbolic reasoning behavior classification module 250 uses at least one well-tuned finite-state machine 252, or a knowledge graph, to interpret movement data 245 and there by classify behavior of customer 130.

Behavior of customer 130 is broken down into three fundamental primitives: a pick action, a scan action, and a drop action. The pick action occurs when a hand (or both hands) of customer 130 retrieves a shopping item from pickup area 112, establishing a connection between the hand and the item. The scan action involves customer 130 moving the item in front of scanner 104 (or simulate the action) to allow scanner 104 to read a machine-readable code on the item, while moving the item from pickup area 112 towards bagging area 114. The drop action occurs when the customer releases the item into bagging area 114.

To achieve accurate customer behavior classification, symbolic reasoning behavior classification module 250 analyzes the complete temporal sequence from the pick action initiation to the drop action completion. In a preferred embodiment, symbolic reasoning behavior classification module 250 uses finite-state machine 252 to implement symbolic reasoning to establish the primitive actions that define the visual scan activity, and classify the behavior of customer 130.

Figure 6:
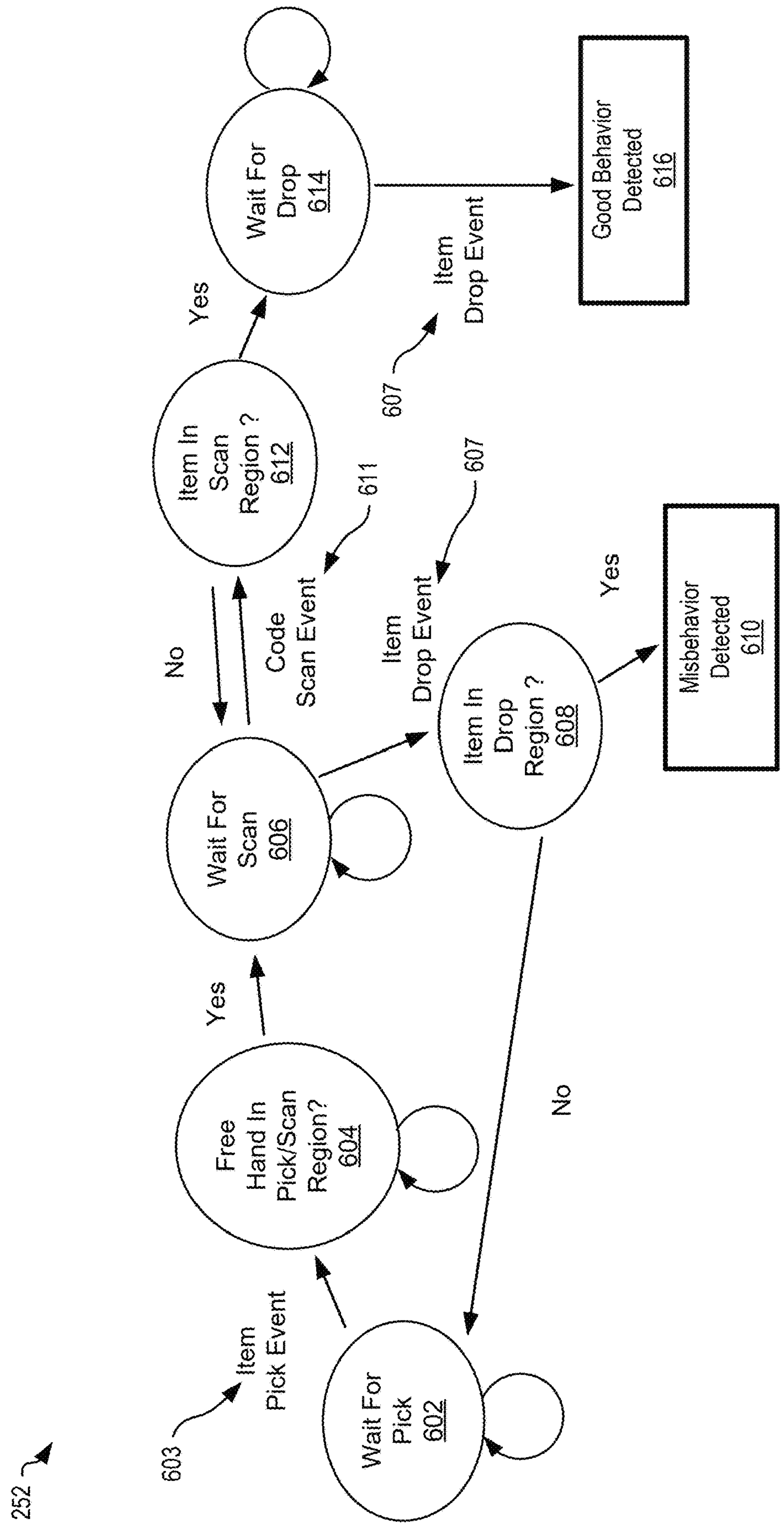
FIG. 6 shows one example of the finite-state machine of FIG. 2 for classifying behavior of the customer, in embodiments.

FIG. 6 shows one example of finite-state machine 252 for classifying behavior of customer 103, in embodiments. Finite-state machine 252 of FIG. 6 may include further states and transitions without departing from the scope hereof. For example, finite-state machine 252 may include states and transitions that manage corners cases, such as when the hand+item move outside the volume of operational area 108 (e.g., disappear from video images 110 when out of the field-of-view of camera 106). In certain embodiments, symbolic reasoning behavior classification module 250 implements multiple finite-state machines 252 to handle different mis-behaviors that may be attempted by customer 130 such that symbolic reasoning behavior classification module 250 is able to analysis of each mis-behavior. Symbolic reasoning behavior classification module 250 may implement a different finite-state machine 252 for each hand of the customer, for example.

In the example of FIG. 6, finite-state machine 252 includes a wait for pick state 602, a free-hand-in-region state 604, a wait for scan state 606, an item in drop region state 608, a misbehavior detected state 610, an item in scan region state 612, a wait for drop state 614, and a good behavior detected state 616. Key events for transitions in finite-state machine 252 include an item pick event 603 that occurs when data processing pipeline 200 detects the consumer's hand picking up an item 162 from pickup area 112, an item drop event 607 that occurs when the consumer's hand drops item 162 into bagging area 114, and a code scan event 611 that occurs when scanner 104 scans a machine-readable code of an item 162. As shown, misbehavior detected state 610 occurs when item 162 is dropped into bagging area 114 without a corresponding code scan event 611, whereas good behavior detected state 616 occurs when item 162 is dropped into bagging area 114 after a corresponding code scan event 611. In certain embodiments, misbehavior state 610 and good behavior state 616 may be indicated on video images 110 by overlay of one or more bounding regions (see rectangle 702, rectangle 704, and rectangle 706 of FIGS. 7A and 7B, for example), where the color or style of the bounding region indicates one of misbehavior state 610 and good behavior state 616 and/or other stages of detection in the behavior analysis.

Typical Primitive Actions and Activity Trajectories

FIGS. 7A-11 are images annotated by system 100 of FIG. 1A to illustrate example handling of a wide variety of customer behaviors (correct and malicious) at POS terminal 102, in embodiments.

Figure 7A:
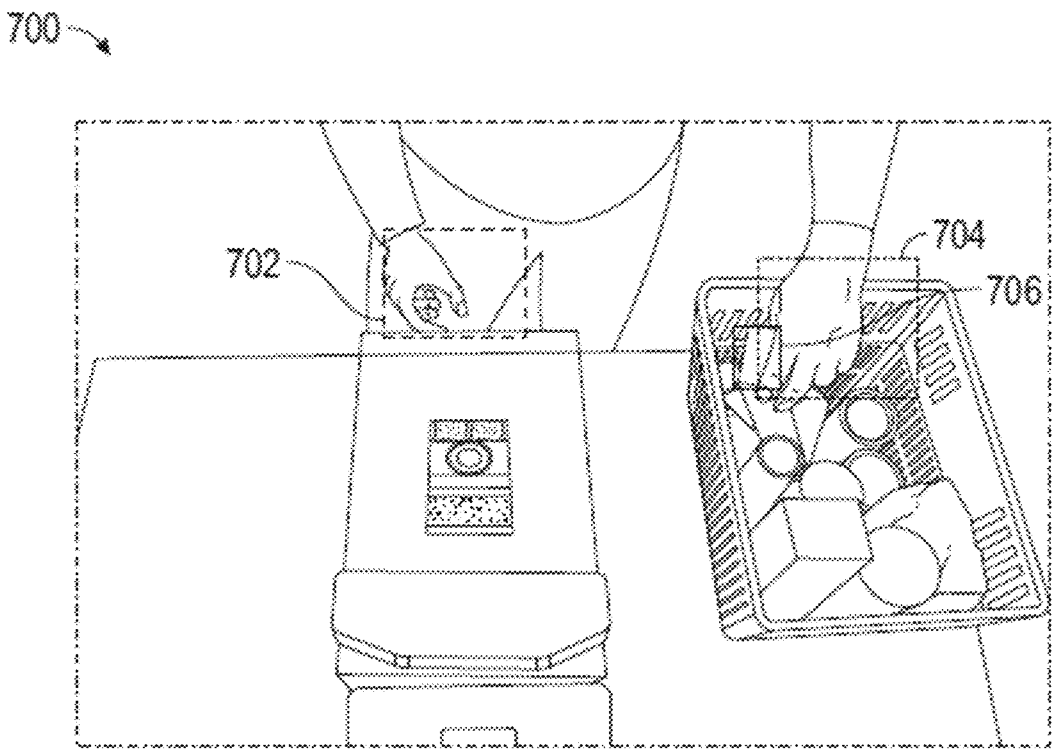
FIG. 7A is an image of a pick action where the customer's left hand picks an item from the pickup area, illustrating recognition of the left hand in a first rectangle, the right hand in second rectangle, and an unscanned item in a third rectangle, in embodiments.
Figure 7B:
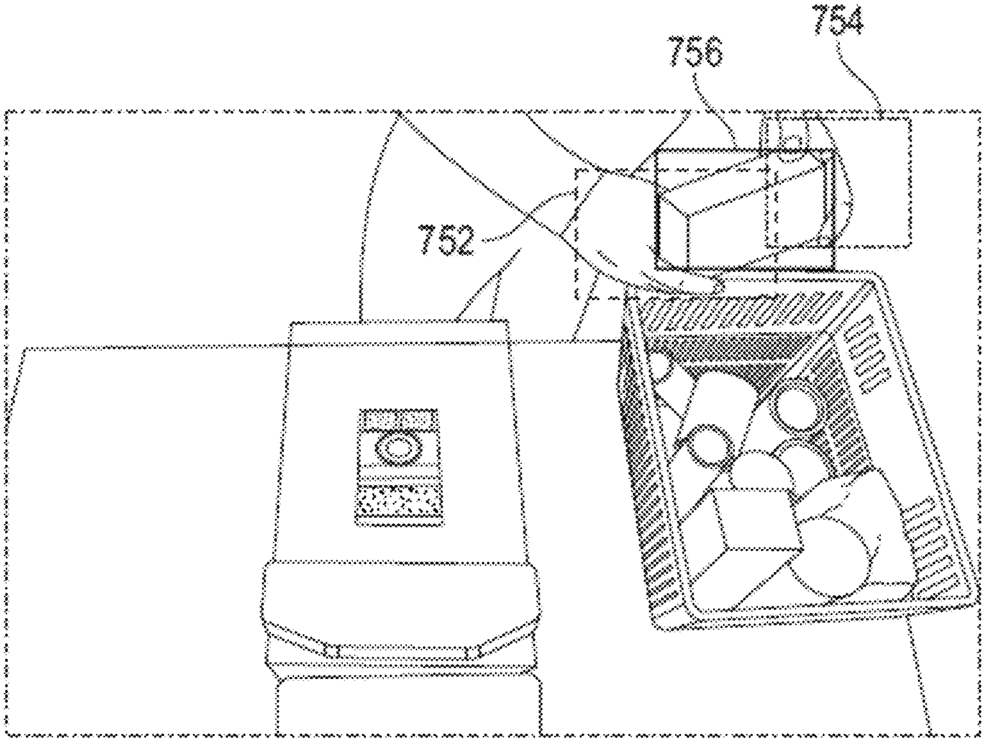
FIG. 7B is an image showing the customer changing the item from the left hand to the right hand after the pick action, illustrating recognition of the left hand in a first rectangle, the right hand in a second rectangle, and an unscanned item in a third rectangle.

FIG. 7A is an image 700 of a pick action where the customer's left hand picks an item from pickup area 112, illustrating recognition of the left hand in rectangle 702, the right hand in rectangle 704, and an unscanned item in rectangle 706. FIG. 7B is an image 750 showing the customer changing the item from the left hand to the right after the pick action, illustrating recognition of the left hand in rectangle 752, the right hand in rectangle 754, and an unscanned item in rectangle 756.

Figure 8A:
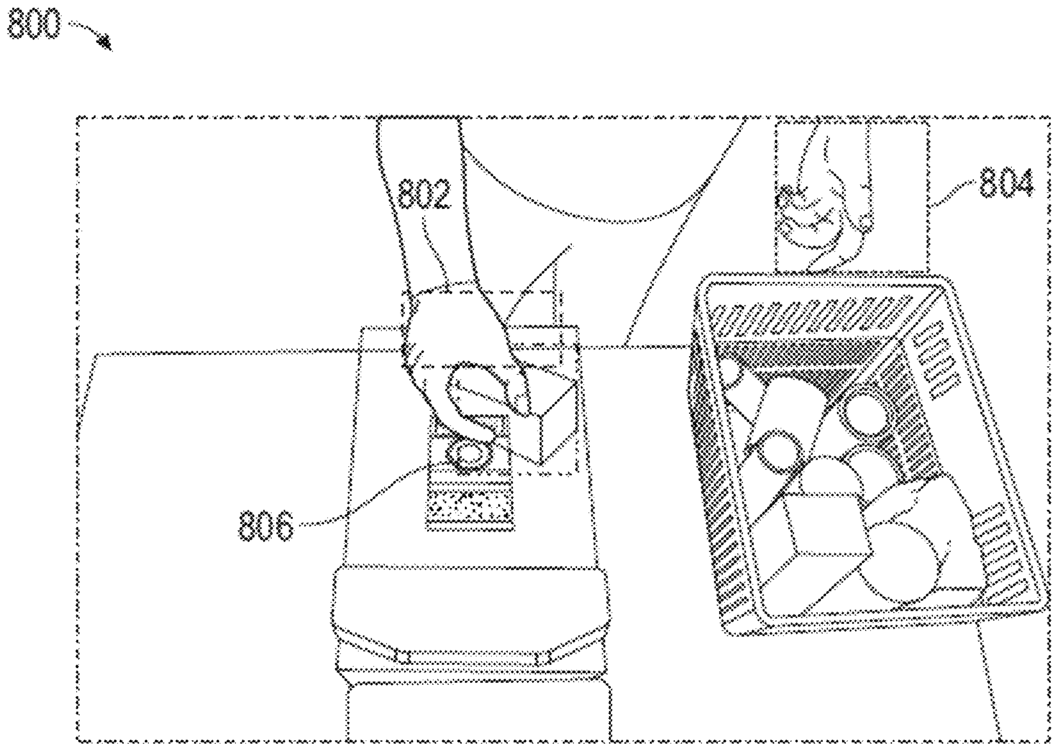
FIG. 8A is an image of a scan action of an item across the scanner of FIG. 1A, illustrating recognition of the customer's right hand in a first rectangle, the customer's left hand in a second rectangle, and the item in a third rectangle.
Figure 8B:
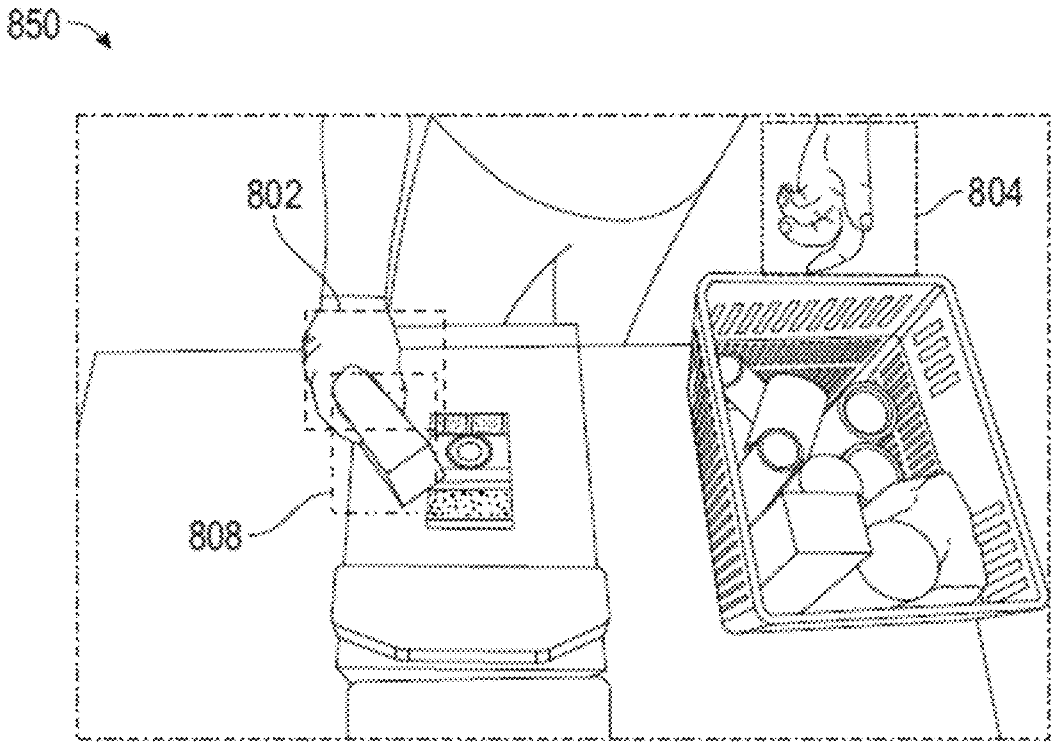
FIG. 8B is an image of the scan action illustrating recognition of the item being scanned by the scanner of FIG. 1A.

FIG. 8A is an image of a scan action of an item across scanner 104, illustrating recognition of the customer's right hand in rectangle 802, the customer's left hand in rectangle 804, and the item in rectangle 806, which indicates that the item is not yet scanned. FIG. 8B is an image 850 of the scan action illustrating recognition of the item being scanned by scanner 104, as indicated by rectangle 808.

Figure 9:
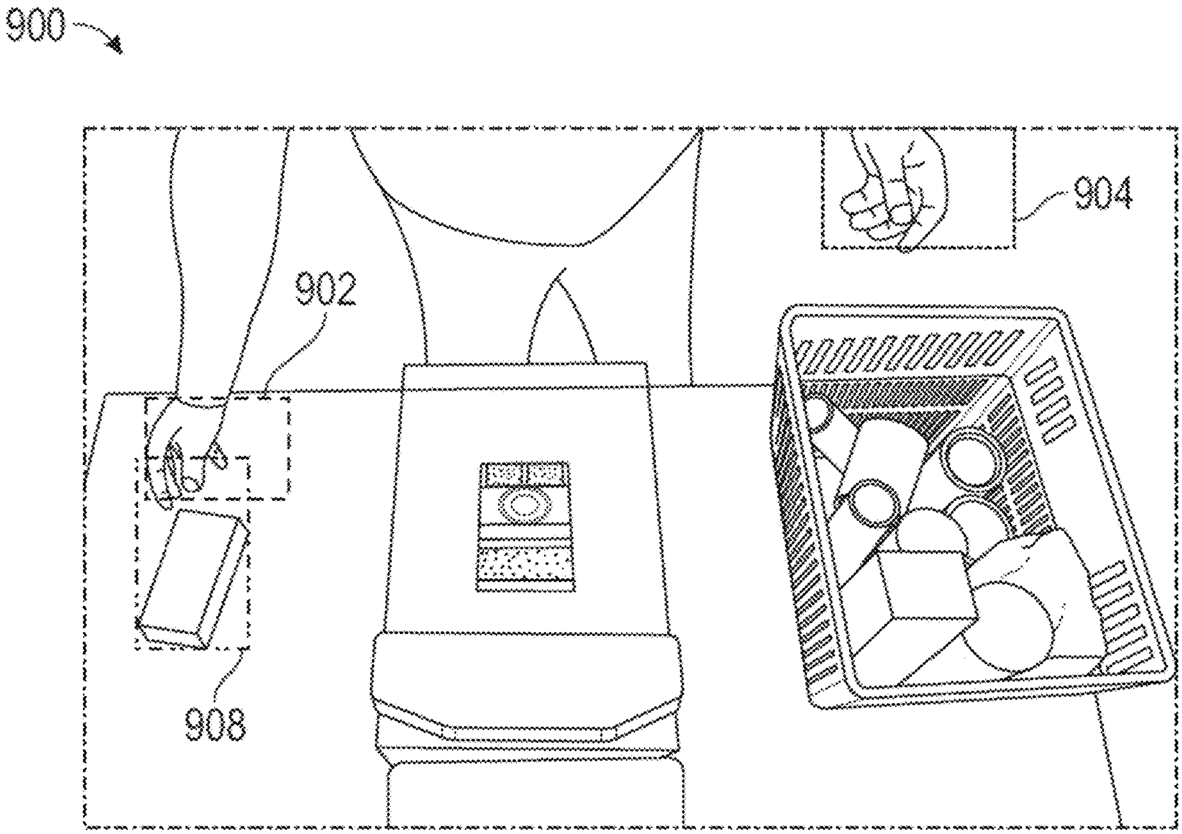
FIG. 9 is an image of a drop action, illustrating recognition of the customer's right hand in a first rectangle, the customer's left hand in a second rectangle, and the item in a third rectangle.

FIG. 9 is an image of a drop action, illustrating recognition of the customer's right hand in rectangle 902, the customer's left hand in rectangle 904, and the item in rectangle 908, which indicates that the item has been scanned. For example, system 100 receives an indication of a successful scan from scanner 104 (or another component of POS terminal 102) when a machine-readable code of an item is read.

Figure 10A:
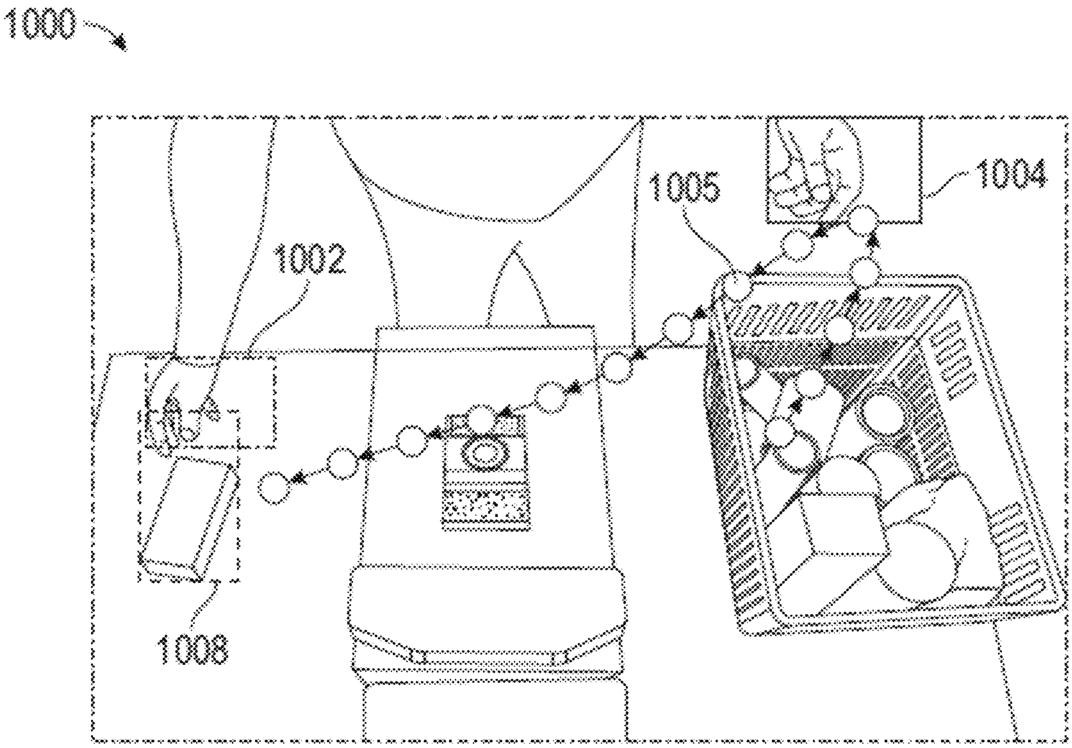
FIG. 10A is an image illustrating a recognized right hand indicated by a first rectangle, a recognized left hand indicated by a second rectangle, and a scan trajectory that resulted in a successful scan.

FIG. 10A is an image 1000 illustrating a recognized right hand indicated by rectangle 1002, a recognized left hand indicated by rectangle 1004, and a scan trajectory 1005 that resulted in a successful scan, since rectangle 1008 indicates the item and that is successfully scanned. Scan trajectory 1005 is added to illustrate the path of the item from pickup area 112, across scanner 104, and to bagging area 114, where the path allowed scanner 104 to successfully scan the machine-readable code on the item.

Scan Avoidance Activity & Trajectory Example

Figure 10B:
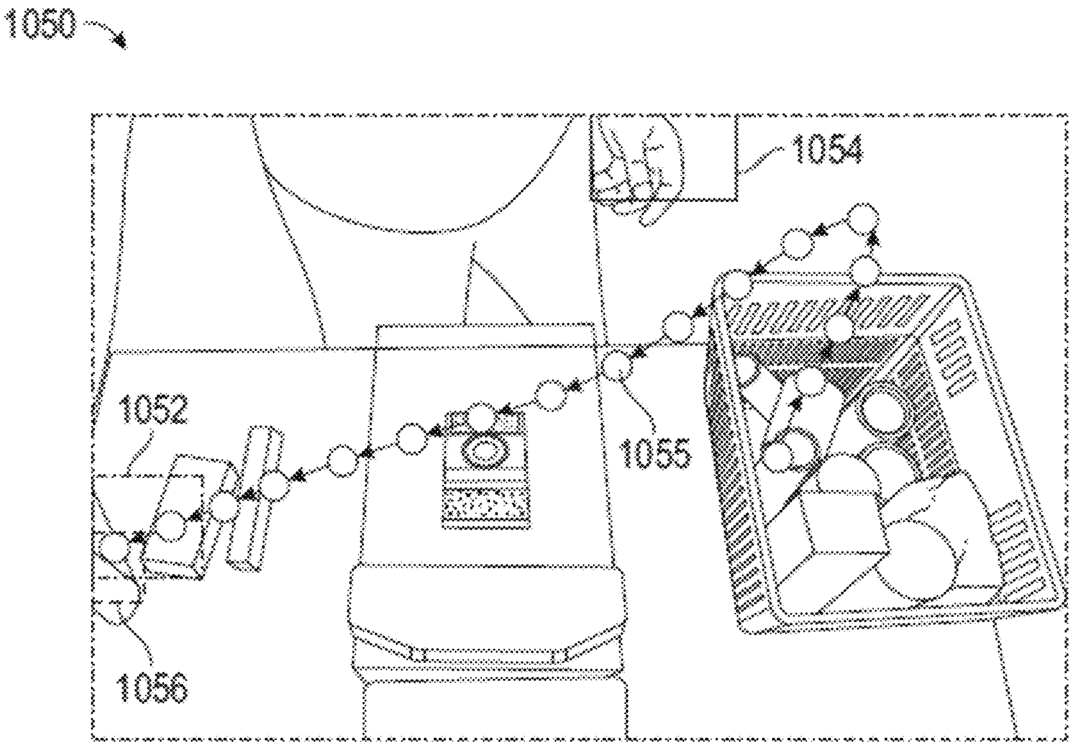
FIG. 10B is an image illustrating a recognized right hand indicated by a first rectangle, a recognized left hand indicated by a second rectangle, and a scan trajectory that resulted in an unsuccessful scan.

FIG. 10B is an image 1050 illustrating a recognized right hand indicated by rectangle 1052, a recognized left hand indicated by rectangle 1054, and a scan trajectory 1055 that resulted in an unsuccessful scan, as indicated by rectangle 1056. Scan trajectory 1055 is added to illustrate the path of the item from pickup area 112, across scanner 104, and to bagging area 114, where the path did not allow scanner 104 to successfully scan the machine-readable code on the item.

Figure 11A:
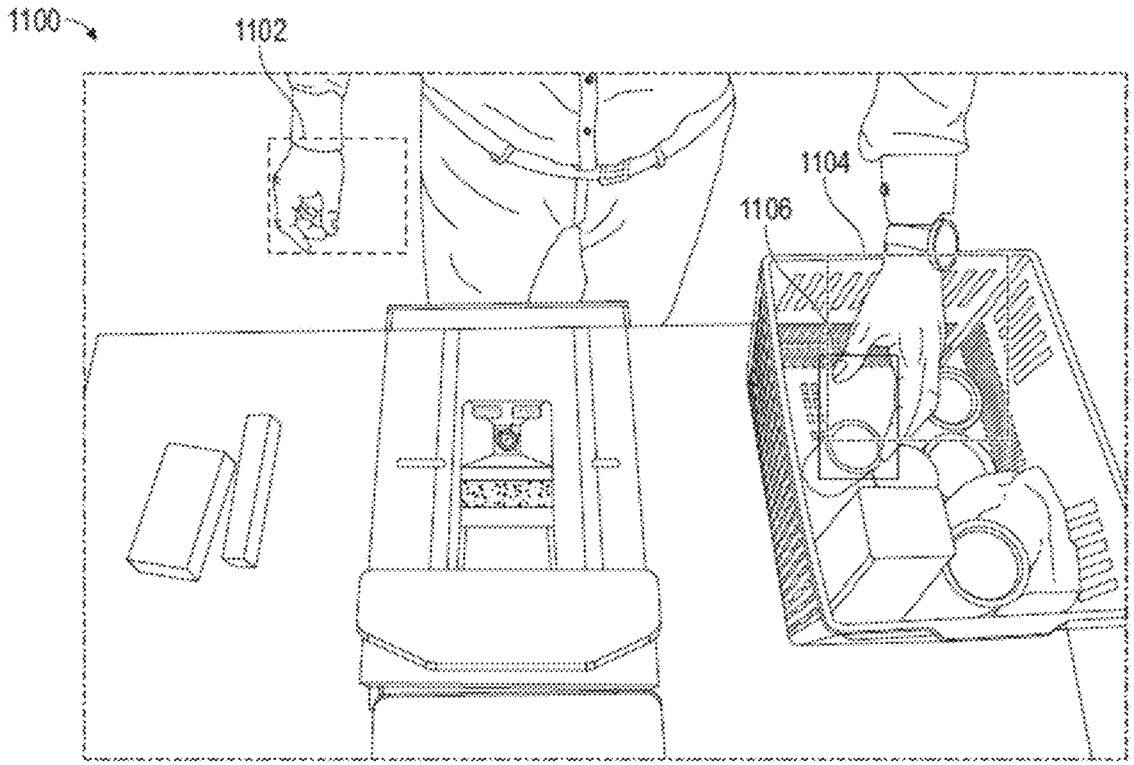
FIGS. 11A and 11B are images illustrating the customer using fingers to hide a machine-readable symbol on the item to prevent it from being scanned correctly by the scanner of FIG. 1A.
Figure 11B:

FIGS. 11A and 11B are images 1100 and 1150 illustrating the customer using fingers to hide a machine-readable code on the item to prevent it from being scanned correctly by scanner 104. As shown in FIG. 11B, while holding the item, the customer's fingers cover at least part of the machine-readable symbols 1152 (e.g., a barcode) such that scanner 104 is unable to read the symbols when the item is passed over the scanner. Accordingly, although system 100 identifies the hands and item, as indicated by rectangles 1102, 1104, and 1106, system 100 does not receive confirmation from POS terminal 102 that a machine-readable code was read as the item was moved across the scanner, and therefore system 100 assumes that the machine-readable code of the item was been hidden.

Beside the basic actions illustrated by FIGS. 7A-11B, there are virtually infinite behaviors the customer may exhibit during a self-checkout session. For example, the customer may exhibit one or more of dual hand single item scanning, scanning two items side by side, scan avoidance by out of volume trajectories, and so on.

Figure 12A:
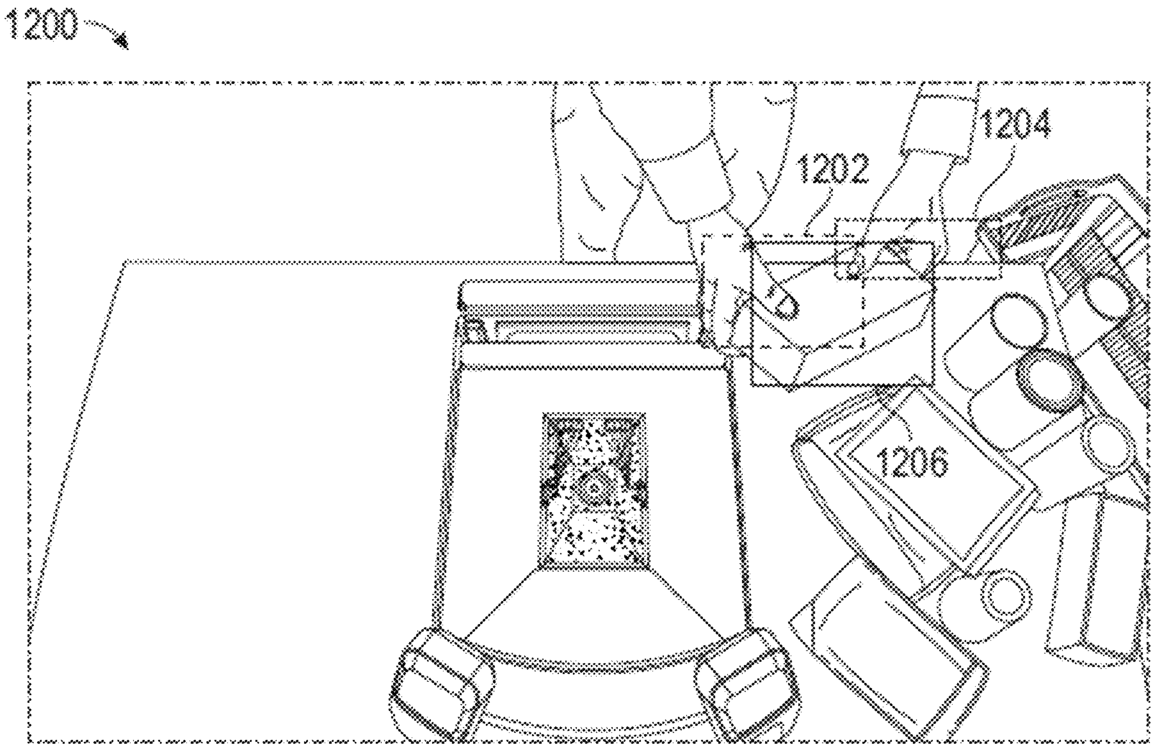
FIG. 12A is an image of a pick action where the customer uses two hands to pick up an item from the pickup area of FIG. 1A.
Figure 12B:
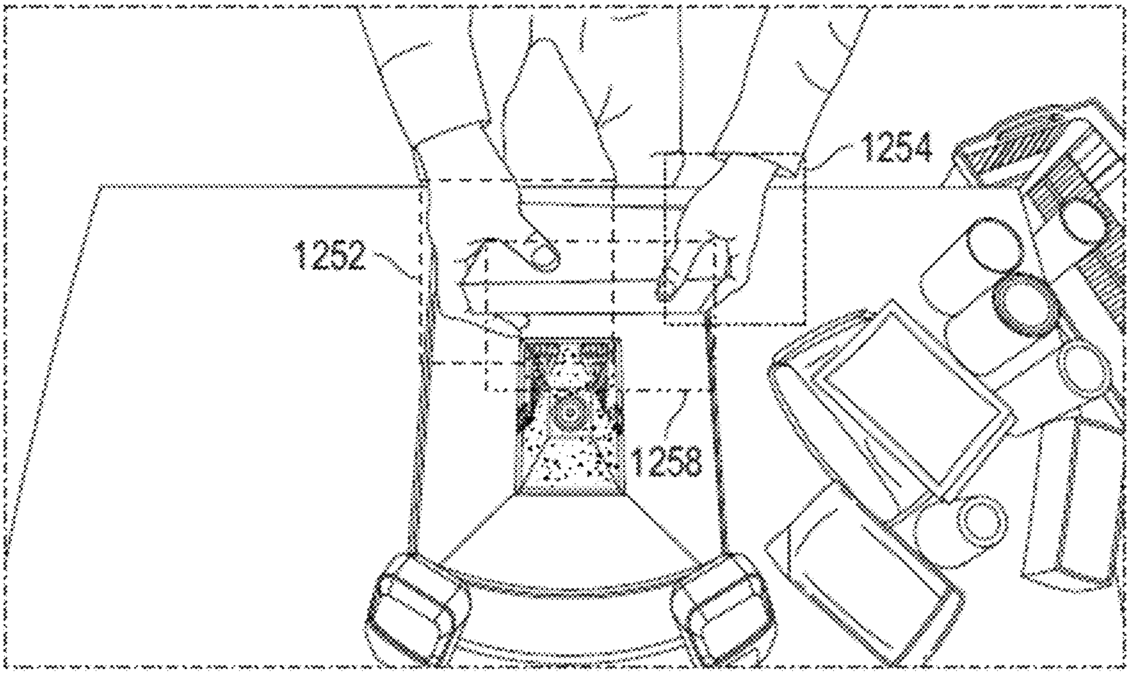
FIG. 12B is an image of a scan action where the customer uses two hands to move the item across of scanner of FIG. 1A.
Figure 13A:
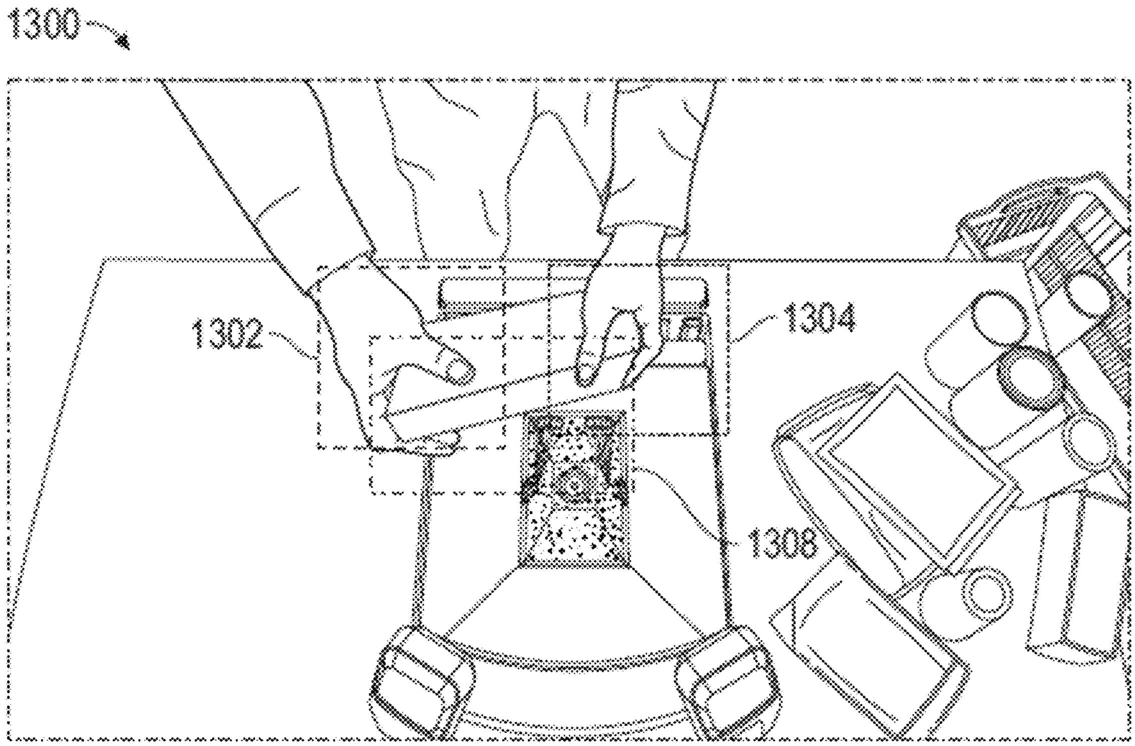
FIG. 13A is an image showing continued movement of the item passed scanner of FIG. 1A and illustrating recognition, by system, of the customer's left hand as indicated by a first rectangle, the right hand as indicated by a second rectangle, and the successfully scanned item as indicated by a third rectangle.
Figure 13B:
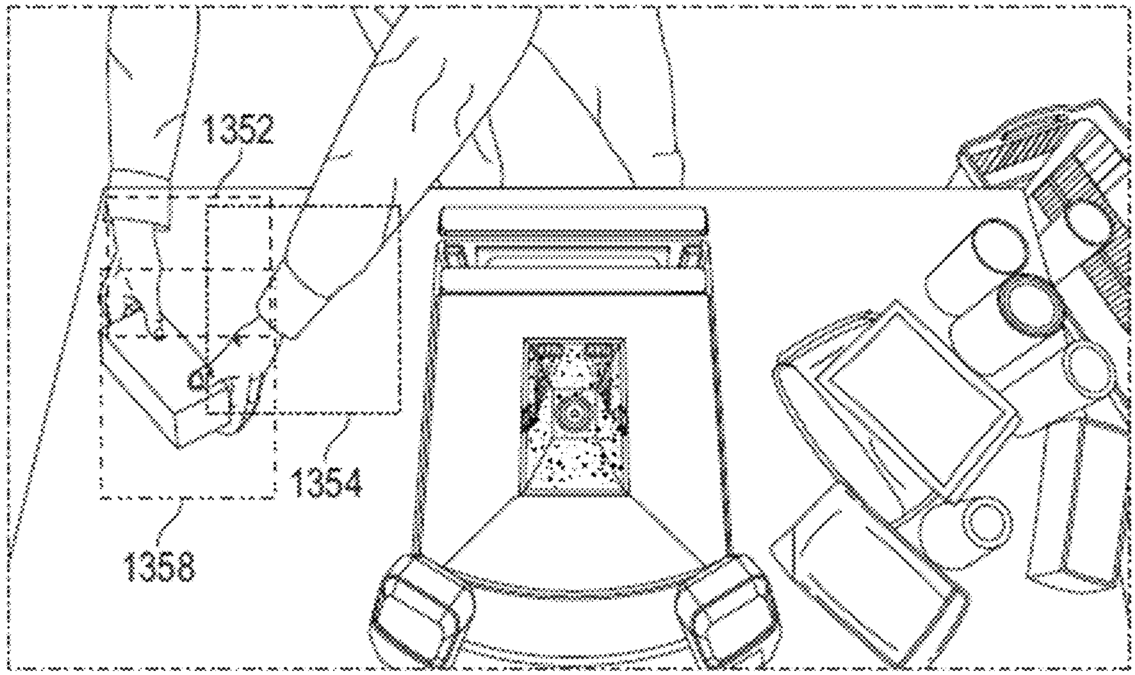
FIG. 13B is an image of a drop action performed by the customer using two hands to place the item in the bagging area of FIG. 1A.

FIG. 12A-13B illustrate tracking of dual-hand single item scanning, in embodiments. FIG. 12A is an image 1200 of a pick action where the customer uses two hands to pick up and items from pickup area 112. System 100 recognizes the customer's right hand as indicated by rectangle 1202, the left hand as indicated by rectangle 1204, and the unscanned item as indicated by rectangle 1106. FIG. 12B is an image 1250 of a scan action where the customer uses two hands to move the item across of scanner 104. System 100 recognizes the customer's right hand as indicated by rectangle 1252, the left hand as indicated by rectangle 1254, and the successfully scanned item as indicated by rectangle 1258. FIG. 13A is an image 1300 showing continued movement of the item passed scanner 104 and illustrating recognition, by system 100, of the customer's right hand as indicated by rectangle 1302, the left hand as indicated by rectangle 1304, and the successfully scanned item as indicated by rectangle 1308. FIG. 13B is an image 1350 of a drop action performed by the customer using two hands to place the item in bagging area 114. System 100 recognizes the customer's right hand as indicated by rectangle 1352, the left hand as indicated by rectangle 1354, and the successfully scanned item as indicated by rectangle 1358.

Figure 14A:
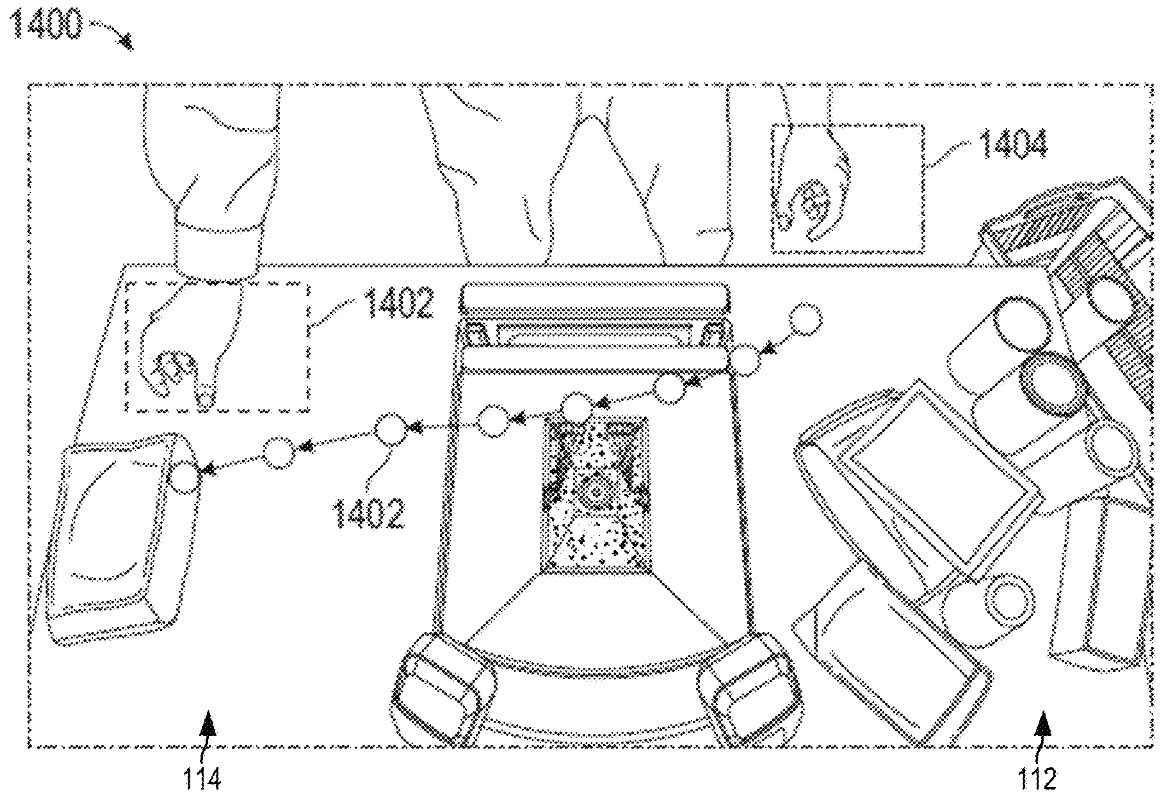
FIG. 14A is an image showing a dual hand single item scanning activity trajectory, in embodiments.

FIG. 14A is an image 1400 showing a dual hand single item scanning activity trajectory 1405, in embodiments. System 100 recognizes the customer's right hand as indicated by rectangle 1402, the left hand as indicated by rectangle 1404. Image 1400 specifically illustrates an example drop action of the item in bagging area 114 after the item has been passed above scanner 104 during the self-checkout process. Once the item has been dropped in bagging area 114, the item is no longer tracked and therefore has no indicating rectangle.

Figure 14B:
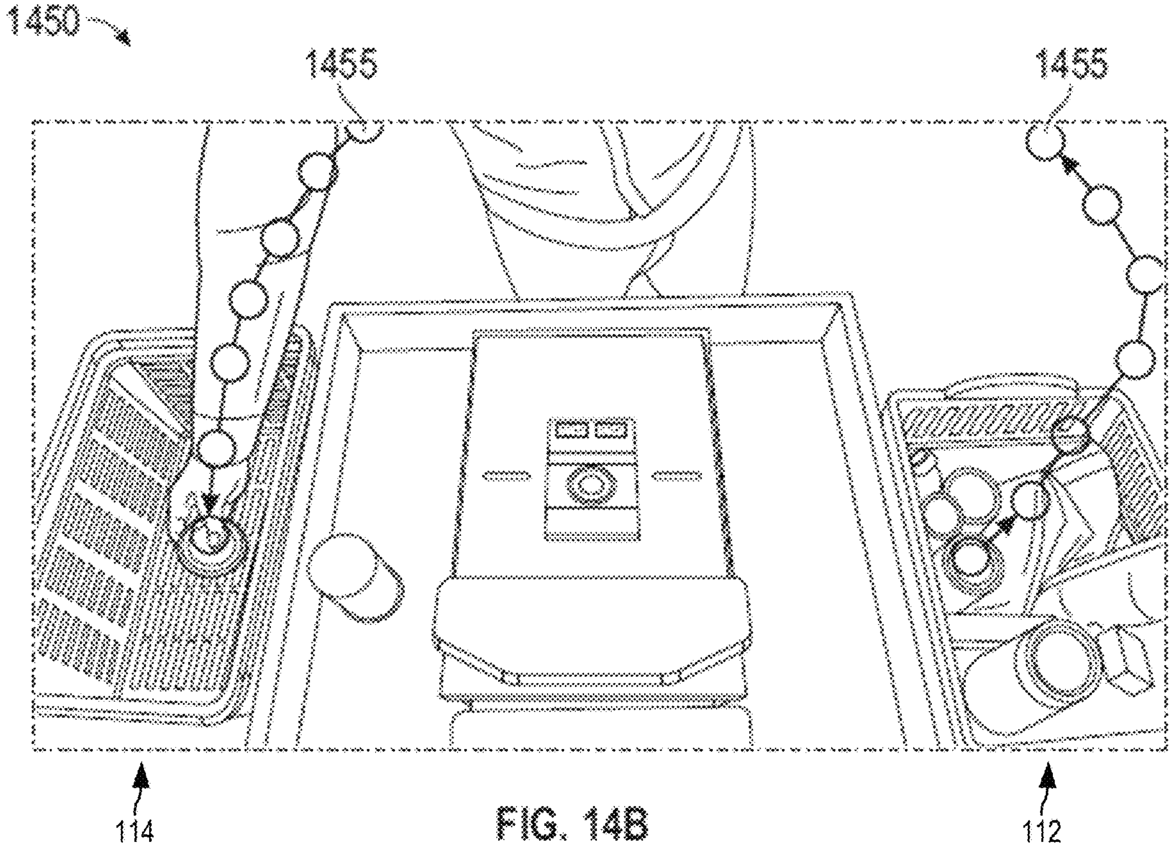
FIG. 14B is an image showing a scanning activity trajectory that is outside the volume of the operational area of FIG. 1A.
Figure 15A:
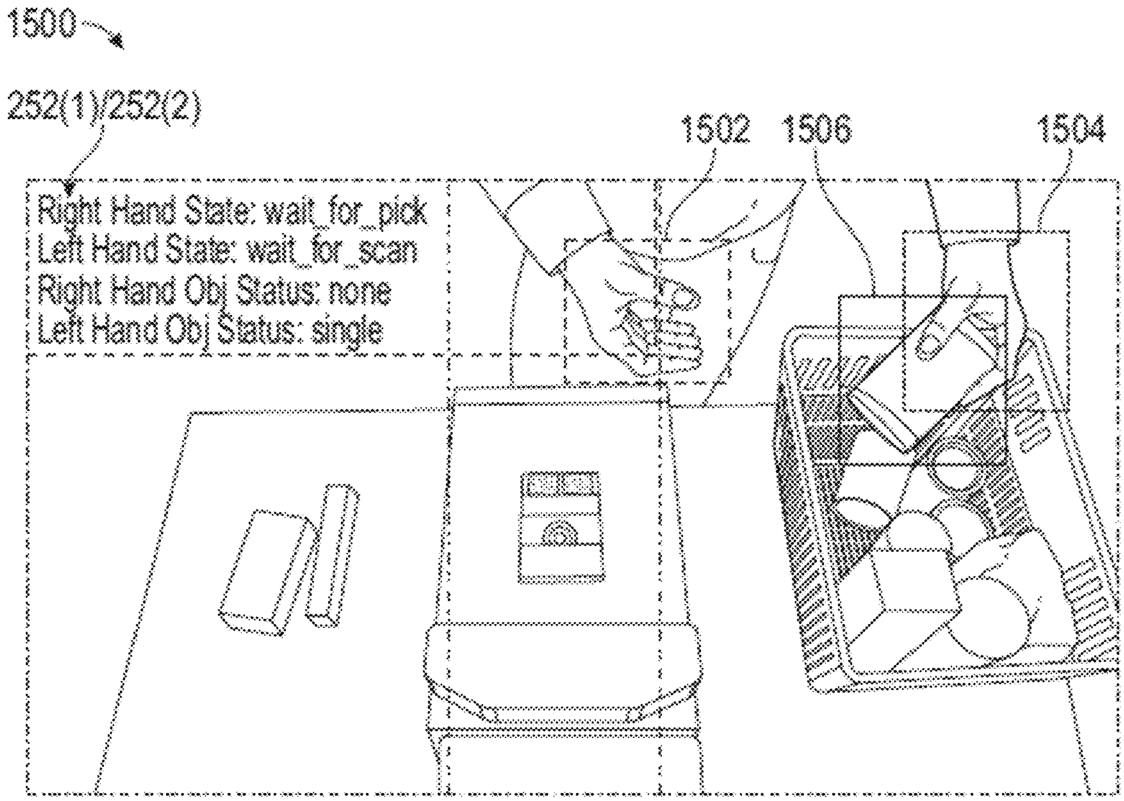
FIGS. 15A-15I are images showing a current state of two independent finite-state machines of the symbolic reasoning behavior classification module of FIG. 2 during example customer activity, in embodiments.
Figure 15B:
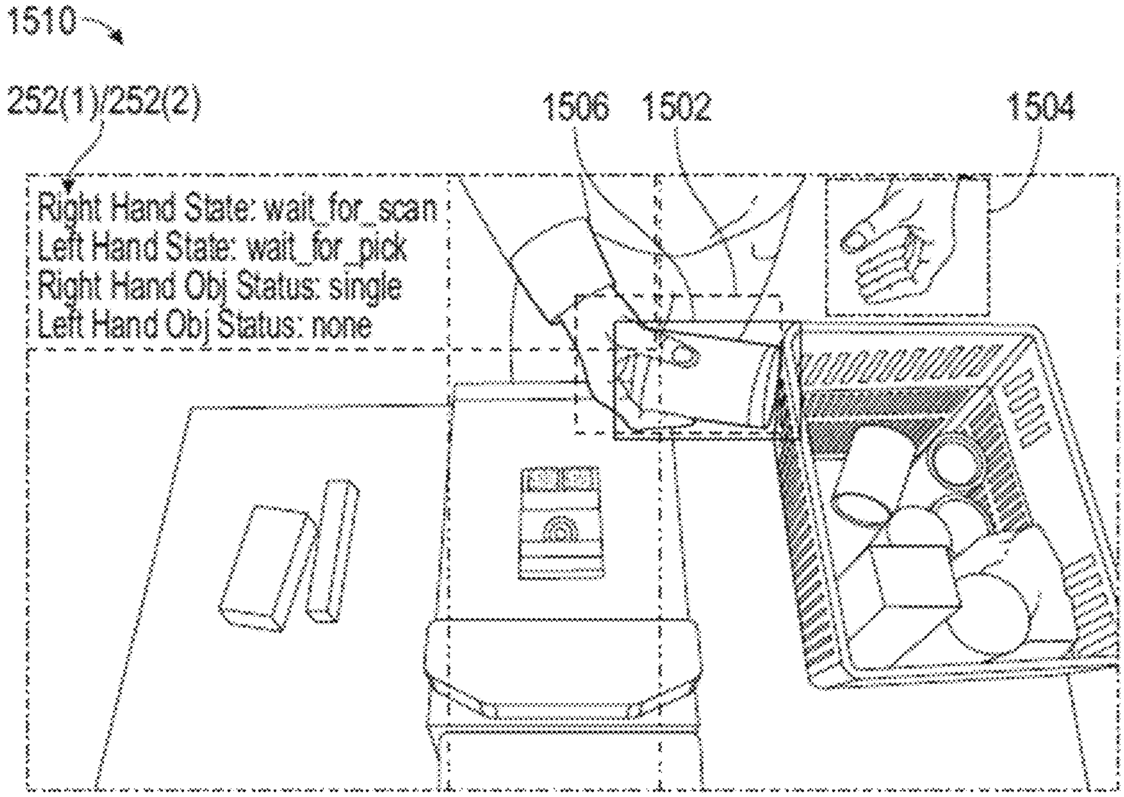
Figure 15C:
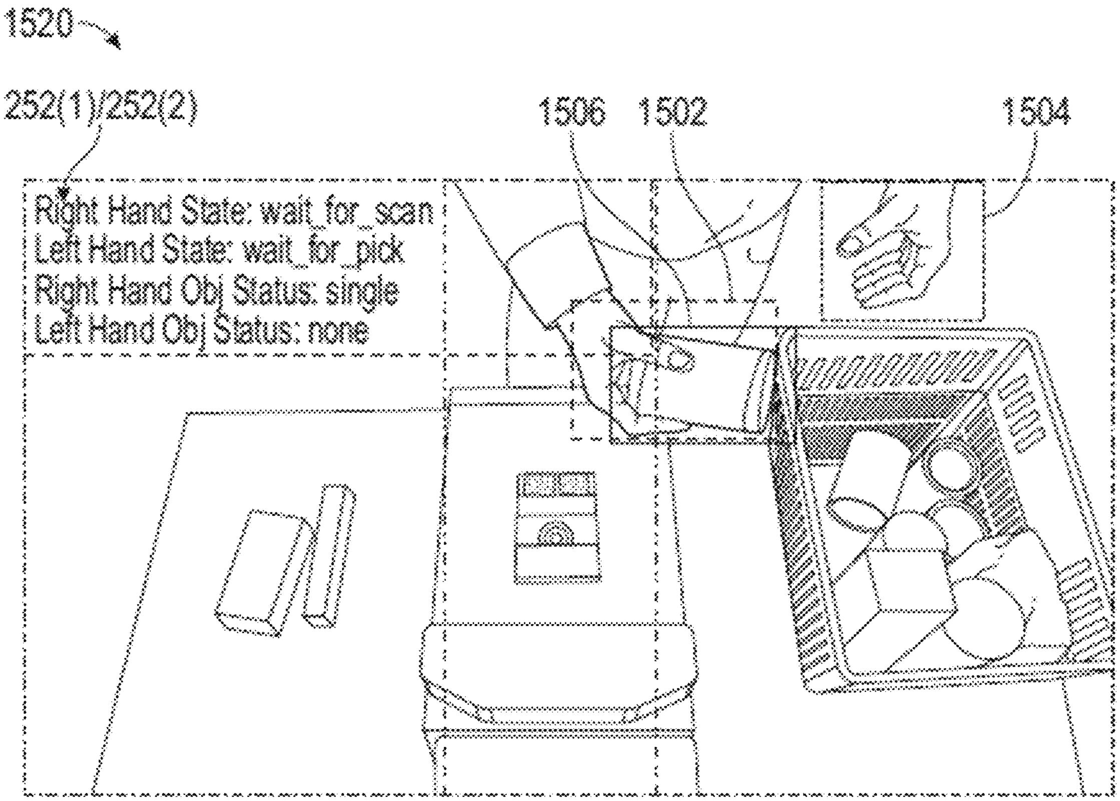
Figure 15D:
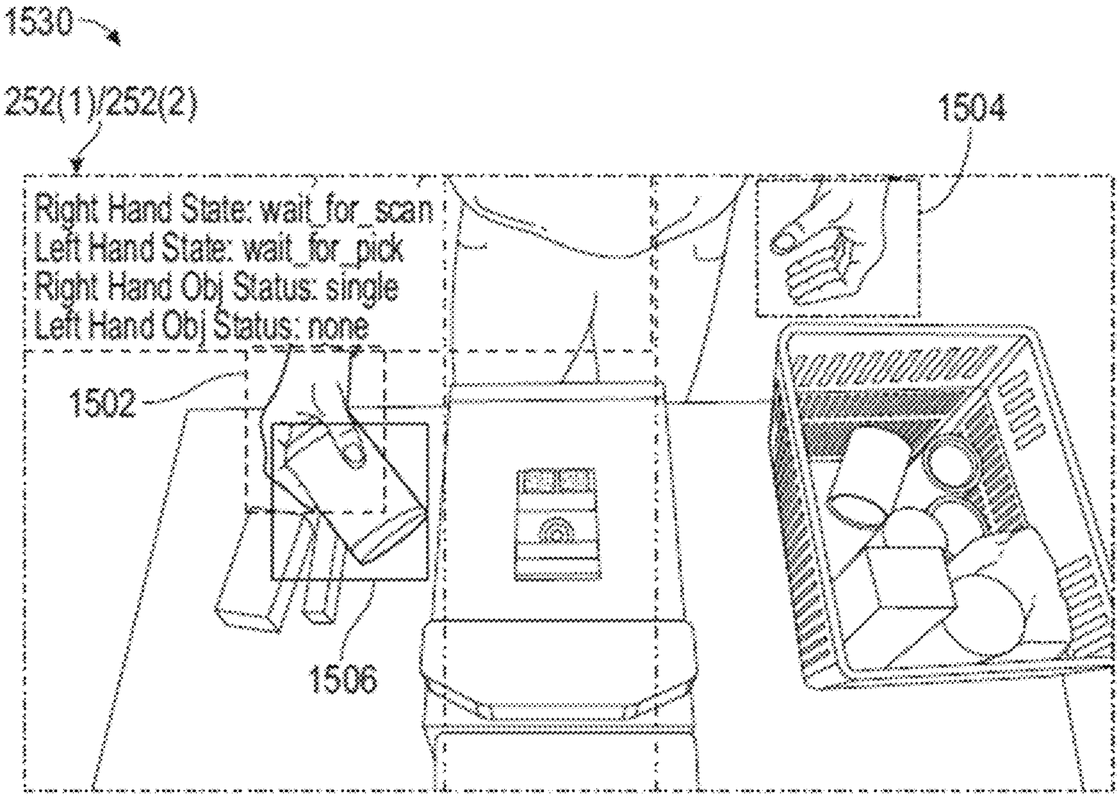
Figure 15E:
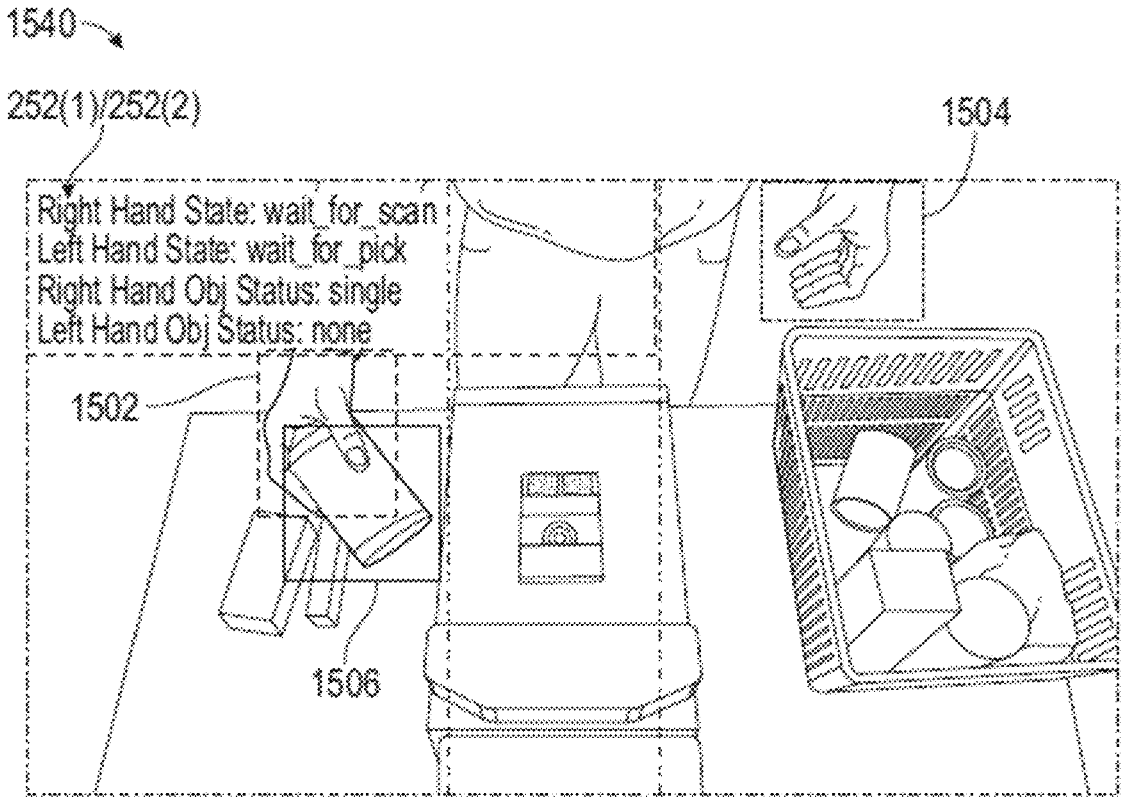
Figure 15F:
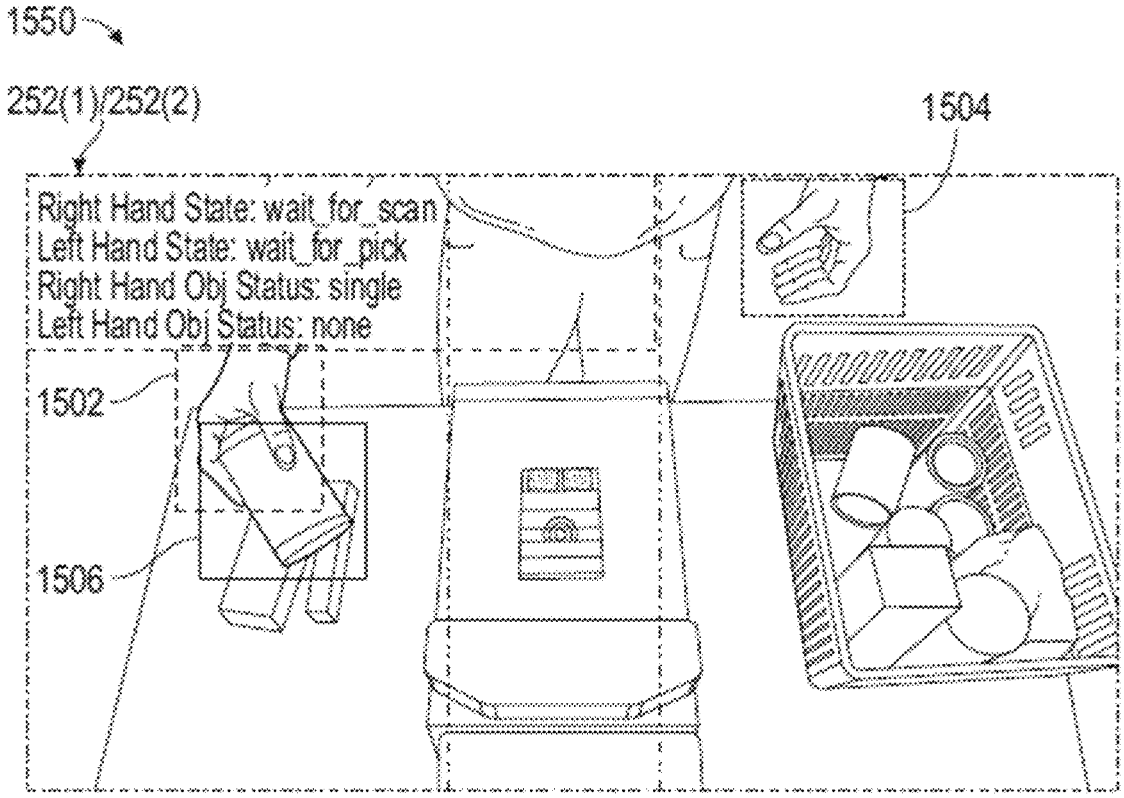
Figure 15G:
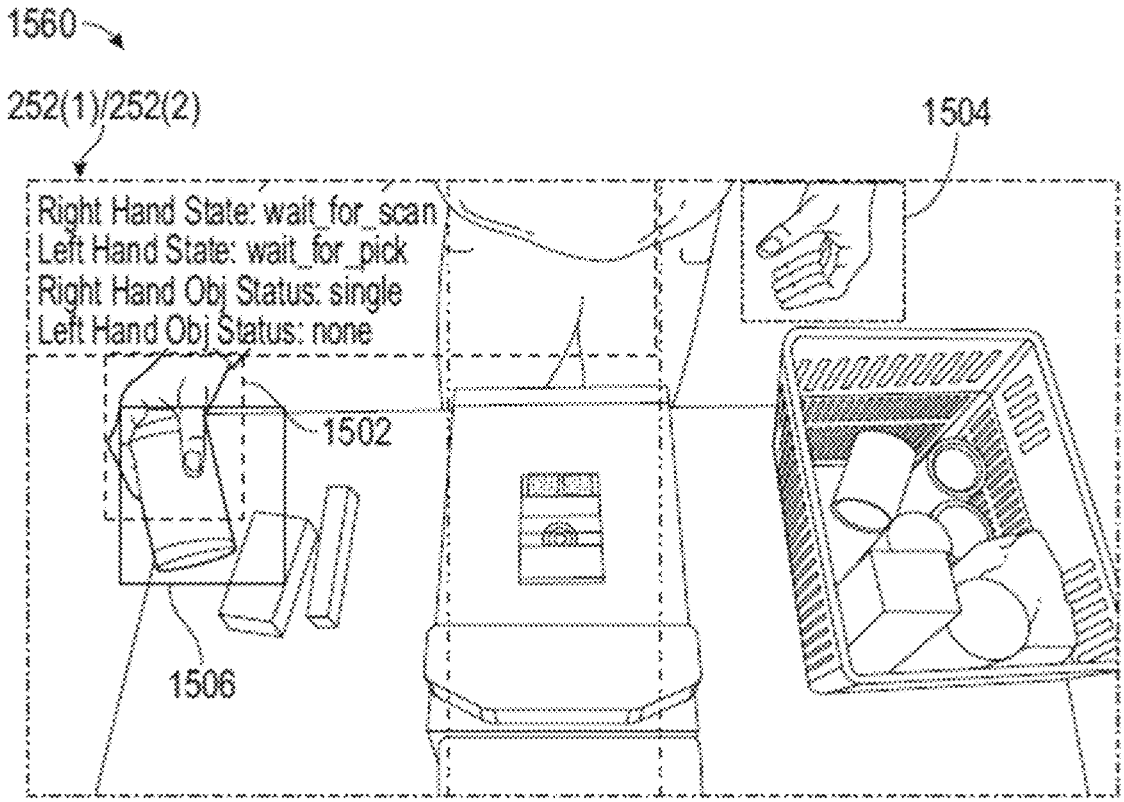
Figure 15H:
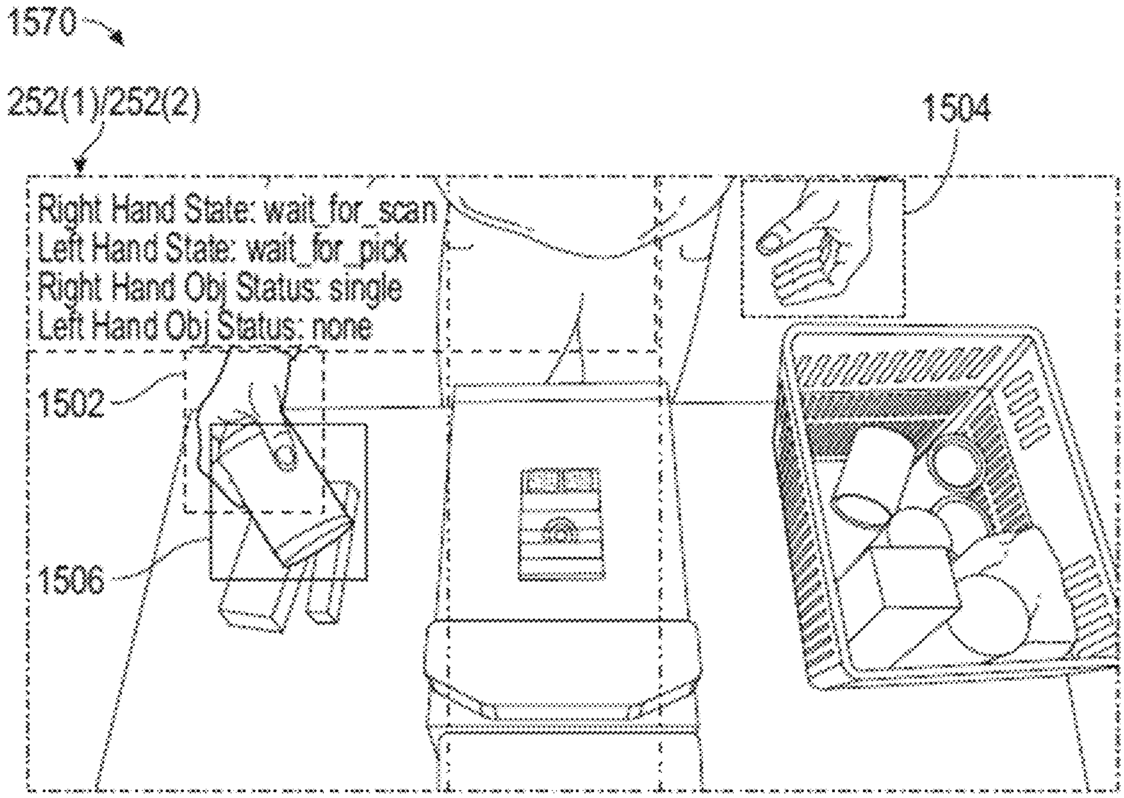
Figure 15I:
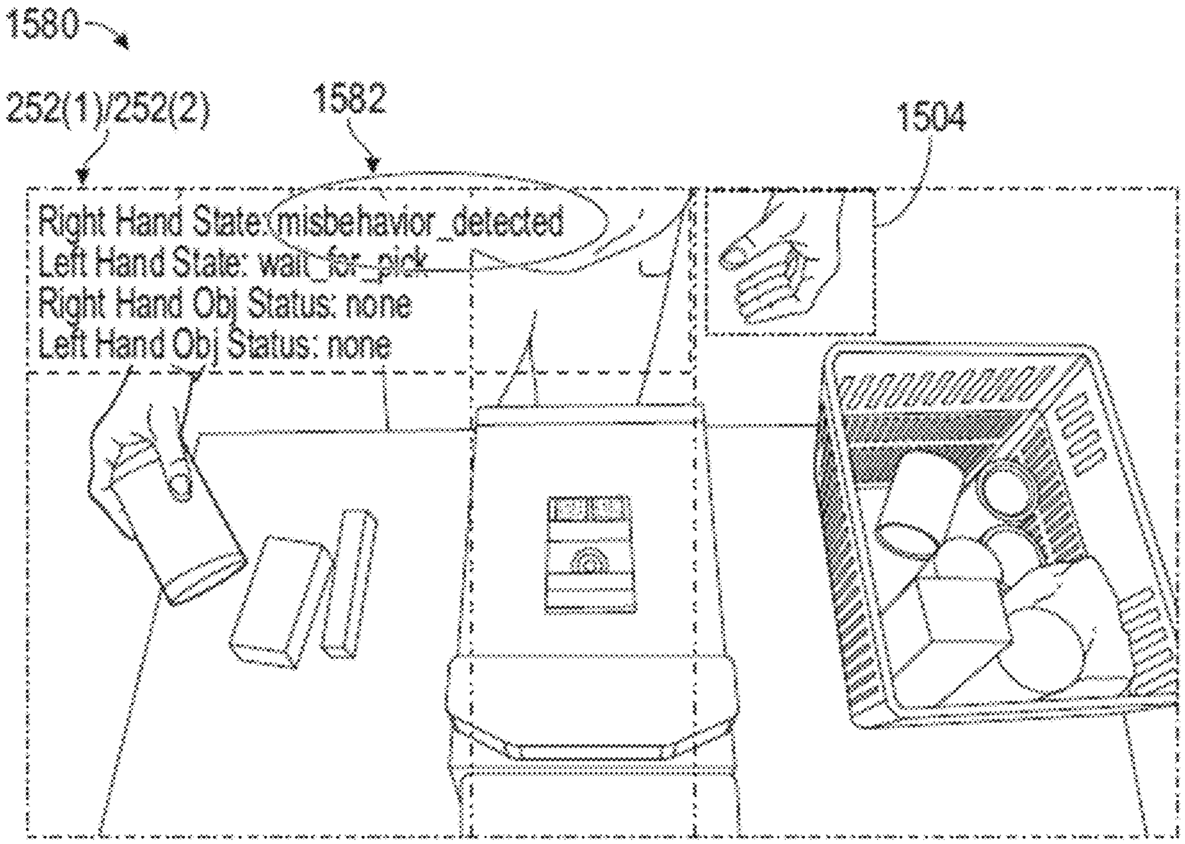

FIG. 14B is an image 1450 showing a scanning activity trajectory 1455 that is outside the volume of operational area 108. Although the item is moved outside the volume of operational area 108, the item is still tracked by system 100.

Visual Scan State Machine States Transitions Examples

FIGS. 15A-15I are images showing a current state of two independent finite-state machines 252(1) and 252(2) of symbolic reasoning behavior classification module 250 of FIG. 2 during example customer activity, in embodiments. In the images of this example, rectangle 1502 indicates recognition of the right hand, rectangle 1504 indicates recognition of the left hand, and rectangle 1506 indicates recognition of an unscanned item being held. A first of the two finite-state machines 252 is named left hand state and a second of the finite-state machines is named right hand state. The images 1500, 1510, 1520, 1530, 1540, 1550, 1560, 1570, and 1580 of FIGS. 15A-15I, respectively, are a chronological sequence that illustrate movements made by the customer during scan of one item. The displayed status of finite-state machines 252(1) and 252(2) illustrate how symbolic reasoning behavior classification module 250 visually tracks events that occur within video images 110 during the customer activity. For example, image 1500 shows the left hand of the customer pick an item from pickup area 112 causing the left hand finite-state machine to have a state of wait_for_scan, and the right hand finite-state machine to remain at a state of wait_for_pick. Image 1510 shows the customer transfer the item from the left hand to the right hand causing the right hand finite-state machine to transition to wait_for_scan and the left hand finite-state machine to transition back to wait-for-pick, since it no longer holds the item.

Images 1520 and 1530 show the customer using the right hand to move the item across scanner 104; however, scanner 104 does not report a successful scan of the item and therefore the right hand finite-state machine remains at the wait_for_scan state and rectangle 1506 indicating the item indicate the item as unscanned. Images 1540, 1550, 1560, and 1570 show the right hand of the customer hovering near bagging area 114 without dropping the item. Accordingly, the right hand finite-state machine remains at the wait_for_scan state. Image 1580 shows the customer moving the right hand and the item out of the volume of operational area 108 (e.g., out of the field-of-view of camera 106 and this out of video images 110) causing the object status for the right hand to indicate no associated object and the right hand finite-state-machine to transition to misbehavior_detected as indicated by arrow 1582.

When the customer drops the item in bagging area 114, finite-state machine 252 (of the hand carrying the object) infers a good behavior when the item was correctly scanned prior to the drop action or a misbehavior when the item was not correctly scanned prior to the drop action. In the activity of these images, the customer is misbehaving by hiding the machine-readable code with fingers and system 100 readily detect the misbehavior as shown in image 1580.

Figure 16:
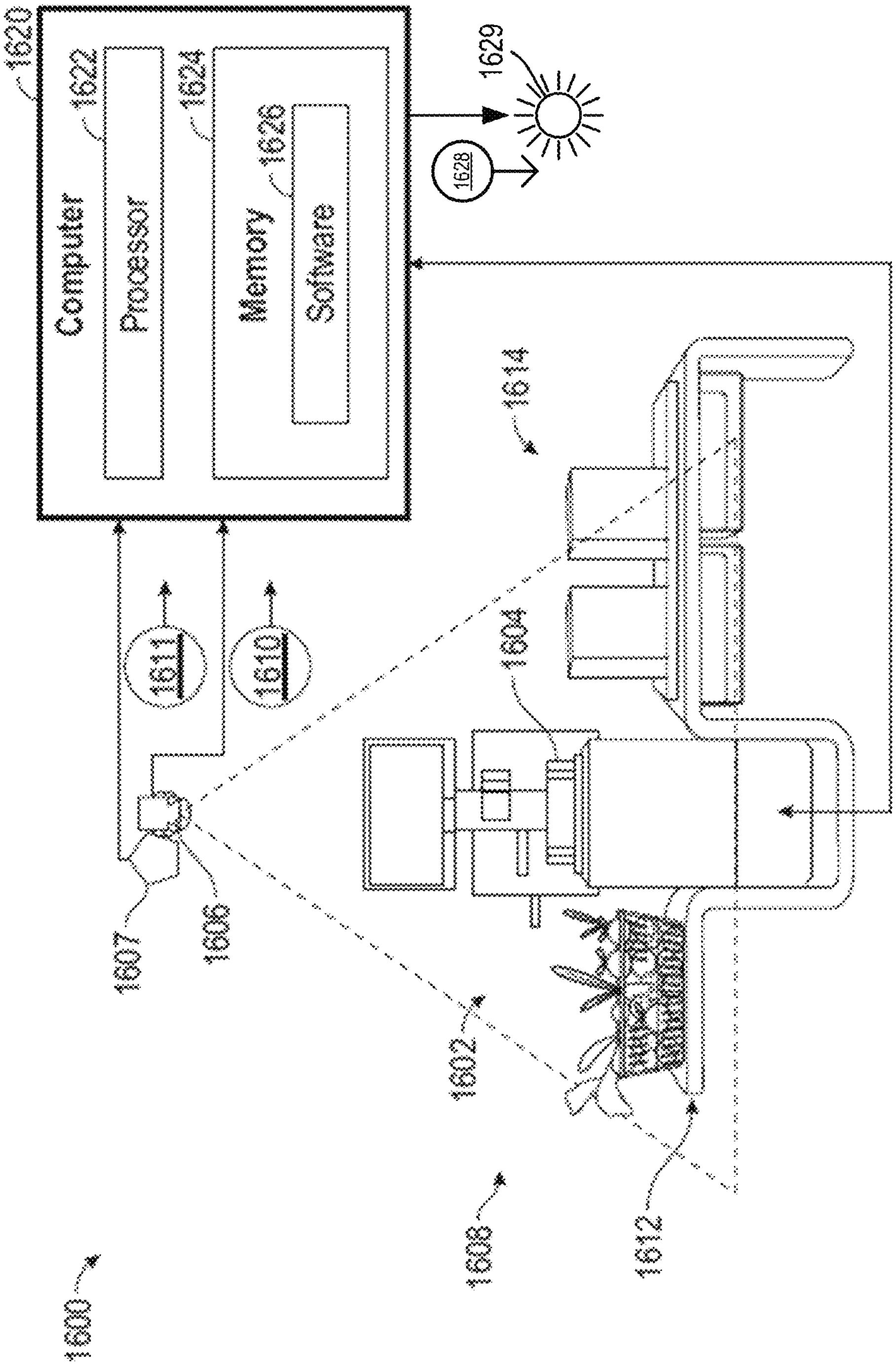
FIG. 16 is a schematic diagram illustrating one example lightweight system for detecting scan avoidance behavior to prevent loss in retail, in embodiments.

3D Robust Hand-Object Interaction State Classification for Loss Prevention Applications FIG. 16 is a schematic diagram illustrating one example lightweight system 1600 for detecting scan avoidance behavior to prevent loss in retail, in embodiments. System 1600 is similar to system 100 and includes a self-service point-of-sale terminal 1602 (POS terminal 1602) with a scanner 1604 for scanning machine-readable code (e.g., barcodes, QR codes, etc.) on labels of items being purchased. System 1600 also includes a camera 1606 positioned above self-service point-of-sale terminal 1602 to have a field-of-view that includes an operational area 1608 of POS terminal 1602. System 1600 further includes a 3D sensor 1607 that may be collocated with camera 1606 and that continually captures depth data 1611 of operational area 1608. Operational area 1608 includes a pickup area 1612 where items are placed prior to scanning and a bagging area 1614 where items are places after scanning.

System 1600 also includes a computer 1620 with a processor 1622 and memory 1624 storing software 1626 that includes machine-readable instructions that are executable by processor 1622 to implement functionality of system 1600 as described herein. System 1600 operates similarly to system 100, described above, but has additional enhancements that further reduce false positives and false negatives. Particularly, software 1626 includes improvement to hand-item detection and association.

When scan avoidance is identified, software 1626 generates an alert 1628 such that security personnel at the retail store may perform a post checkout control of the customer's basket against the transaction (e.g., receipt). Alert 1628 may identify POS terminal 1602 and may include details of a current transaction at POS terminal 1602. In some embodiments, the alert 1628 may suspend the transaction prior to payment, to perform checkout control prior to fully completing the transaction via payment. The checkout control may be at the self-service POS terminal 1602 for the store personnel to check the customer's basket against the transaction log recorded by the POS terminal 1602, after which the transaction may be fully completed upon being cleared by store personnel.

Alert 1628 may be one or more of a discreet message (e.g., text, notification, etc.) to security personnel at the retail store, a light 1629, possibly flashing, at POS terminal 1602, a barrier near POS terminal 1602 that closes to direct the customer to a security control area, and so on. A type of alert 1628 may be selected based on the type and location of the retail store, for example.

Figure 17:
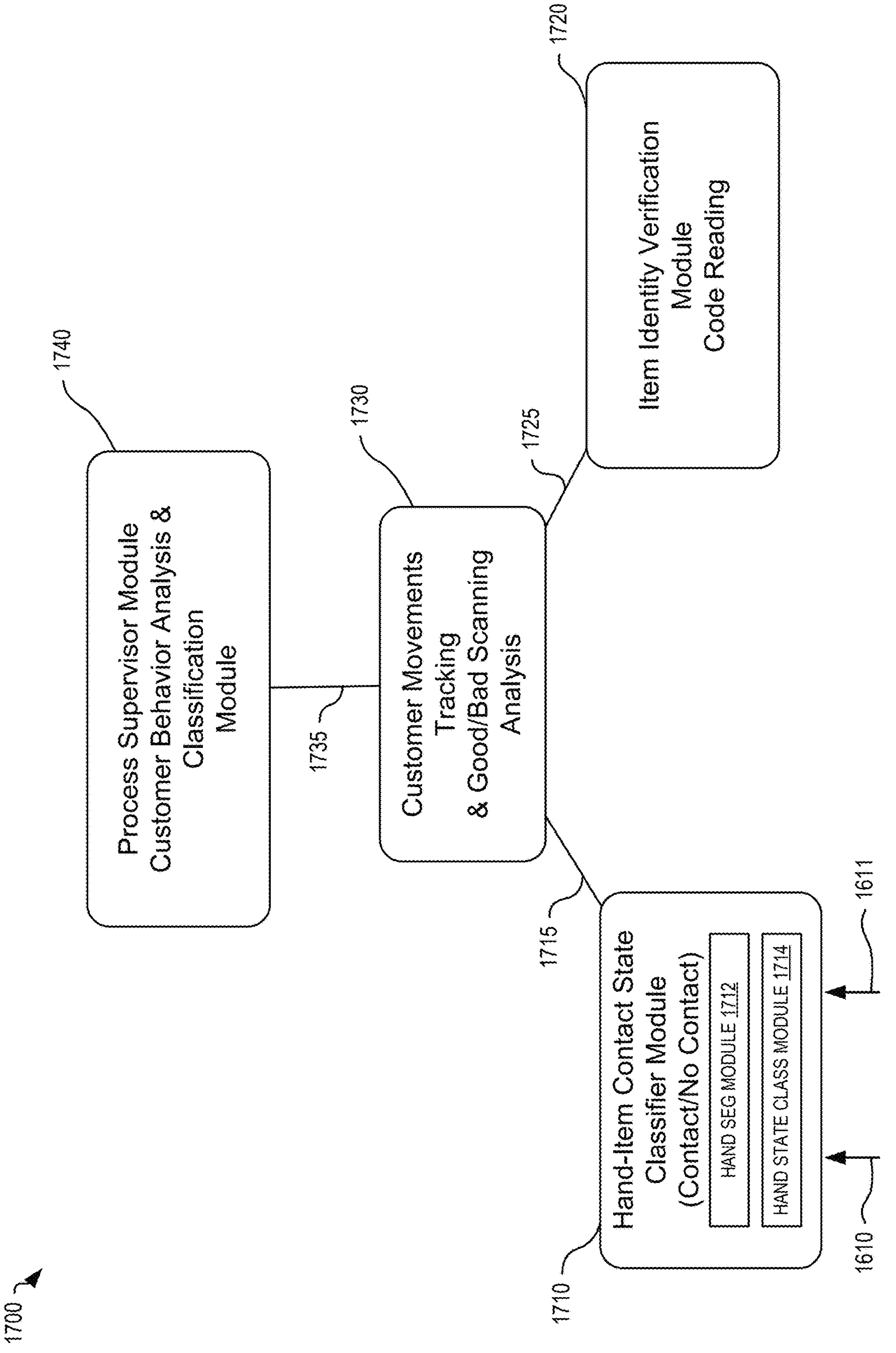
FIG. 17 is a data flow diagram illustrating one example data processing pipeline implemented by the software of FIG. 16, in embodiments.

FIG. 17 is a data flow diagram illustrating one example data processing pipeline 1700 implemented by software 1626 of FIG. 16, in embodiments. Data processing pipeline 1700 includes a hand-item contact state classifier module 1710 that feeds hand-item data 1715 to a customer movement tracking and good/bad scanning analysis module 1730. Hand-item contact state classifier module 1710 includes a hand segmentation module 1712 and a hand state classification module 1714. Analysis module 1730 also receives item identity verification data 1725 from an item identity verification module 1720 that may interface with scanner 1604. For example, item identity verification data 1725 may indicate an item being scanned by scanner 1604. Analysis module 1730 sends tracking data 1735 to a process supervisor module 1740 that implements customer behavior analysis and classification.

Hand-item contact state classifier module 1710 receives both video images 1610 from camera 1606 and depth data 1611 from 3D sensor 1607. Hand-item contact state classifier module 1710 processes this data together to determine detect the customers hands and items and/or objects position near the hands. Particularly, through use of depth data 1611, hand-item contact state classifier module 1710 reliably determines whether an item detected near the customer's hand should be associated together. For example, where the customer's hand appears over the item within both video images 1610, but depth data 1611 indicates that the depth of the item is not neat the depth of the hand, hand-item contact state classifier module 1710 determines that the item is not associated with the hand. Advantageously, by integrating both video images 1610 and depth data 1611 of operational area 1608, hand-item contact state classifier module 1710 reliable detect hand-item interaction (e.g., defined by hand-item data 1715).

One or both of camera 1606 and 3D sensor 1607 may be positioned at other locations without departing from the scope hereof. System 1600 may also include multiple camera 1606 and/or multiple 3D sensors 1607 without departing from the scope hereof. 3D sensor 1607 may represent one or both of a 3D stereo camera equipped with structured light extended stereo capabilities, and a time-of-flight (TOF) camera. In certain embodiments, depth data 1611 is inferred 3D scene data derived from a machine learning model that processes a 2D color image (e.g., video images 1610) of operational area 1608 and generates depth data 1611. Advantageously, hand-item contact state classifier module 1710 accurately classifies the hand/item contact state. Analysis module 1730 uses hand-item data 1715 and item identity verification data 1725 (e.g., code reading results or absence thereof) obtained from scanner 1604 (or self-service point-of-sale terminal 1602) to reliably analyze actions of the customer at self-service point-of-sale terminal 1602.

Figure 18:
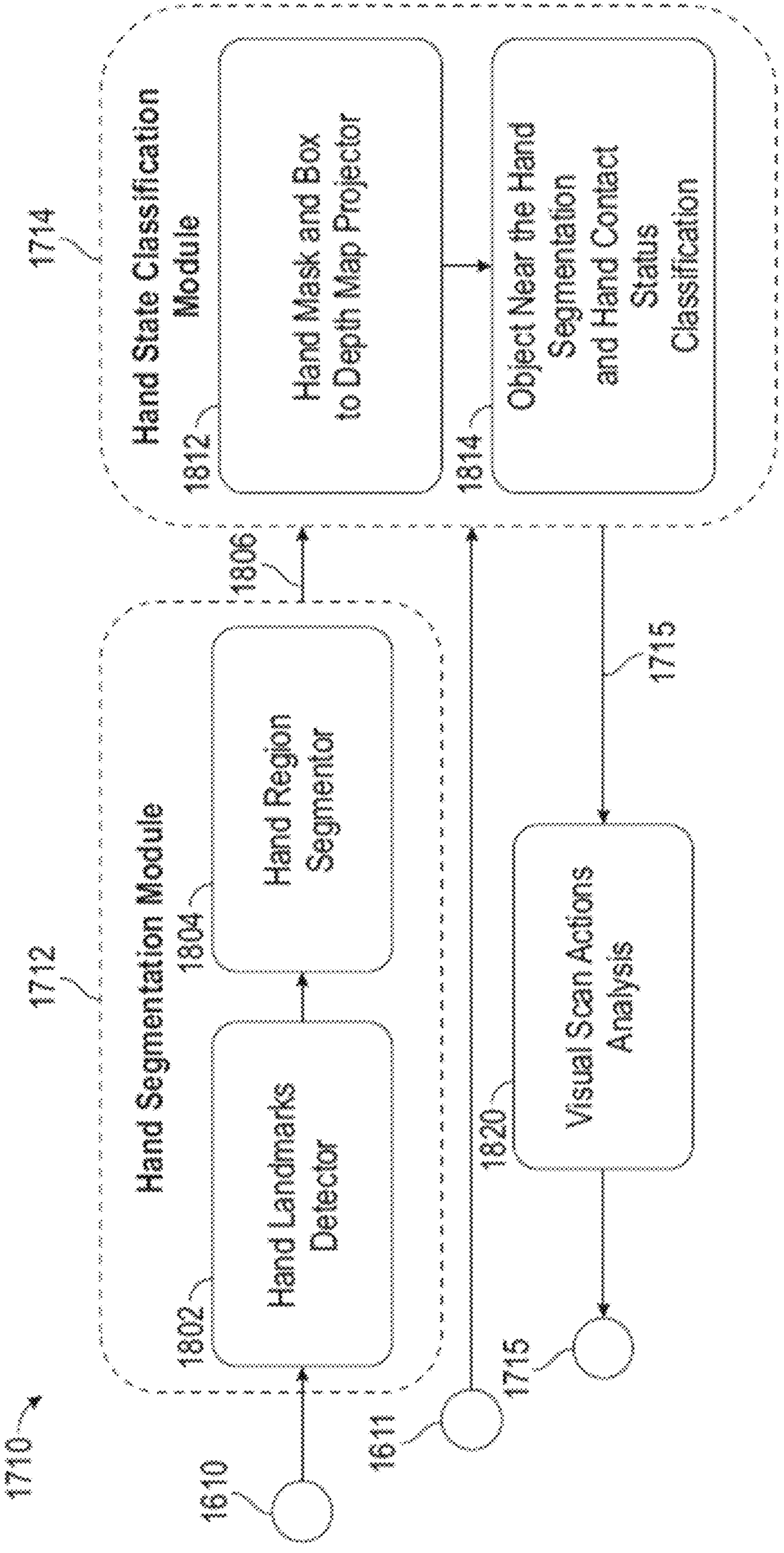
FIG. 18 shows the hand-item contact state classifier module of FIG. 17 in further example detail, in embodiments.

FIG. 18 shows hand-item contact state classifier module 1710 of FIG. 17 in further example detail, in embodiments. Hand segmentation module 1712 includes a hand landmarks detector 1802 and a hand region segmentor 1804 that cooperate to generate hand segmentation mask 1806 that is used by hand state classification module 1714.

Hand state classification module 1714 includes a hand mask and box to depth map projector 1812 and an object near the hand segmentation and hand contact status classification module 1814.

Hand Segmentation Module

For each frame of video images 1610, hand segmentation module 1712 detects hands (e.g., hands of the customer) and then segments the hand region(s) within the frame. Hand segmentation module 1712 invoked hand landmarks detector 1802 to detects hands in the frame and invokes hand region segmentor 1804 to segment the hand region in the frame and obtain precise hand contours. Hand region segmentor 1804 may also highlight any potential hand-item contact area for subsequent analysis.

Hand segmentation module 1712 implements at least one of two possible approaches for hand segmentation. In a first approach, hand segmentation module 1712 implements a complete hand segmentation model that focuses only on hand segmentation, defining detailed boundaries of the hands within the frame. In a second approach, hand segmentation module 1712 implements multistage processing pipelines that integrates hand landmarks detector 1802 with hand region segmentor 1804 that combines flexibility and ease of use. FIGS. 17 and 18 shows an embodiment that implements the second approach.

In certain embodiments, hand landmarks detector 1802 is provided, at least in part, from the Mediapipe Google library. Hand region segmentor 1804 implements a subsequent step based on morphological and logical operations to generate hand segmentation mask 1806 that defines a hand location and pose detector (such as the one provided by Mediapipe.

Given the hand bounding box and landmarks detected by hand landmarks detector 1802, hand state classification module 1714 applies segmentation, where through morphological and logical operators, the hand skeleton landmarks are expanded to form the hand region segmentation.

Figure 19:
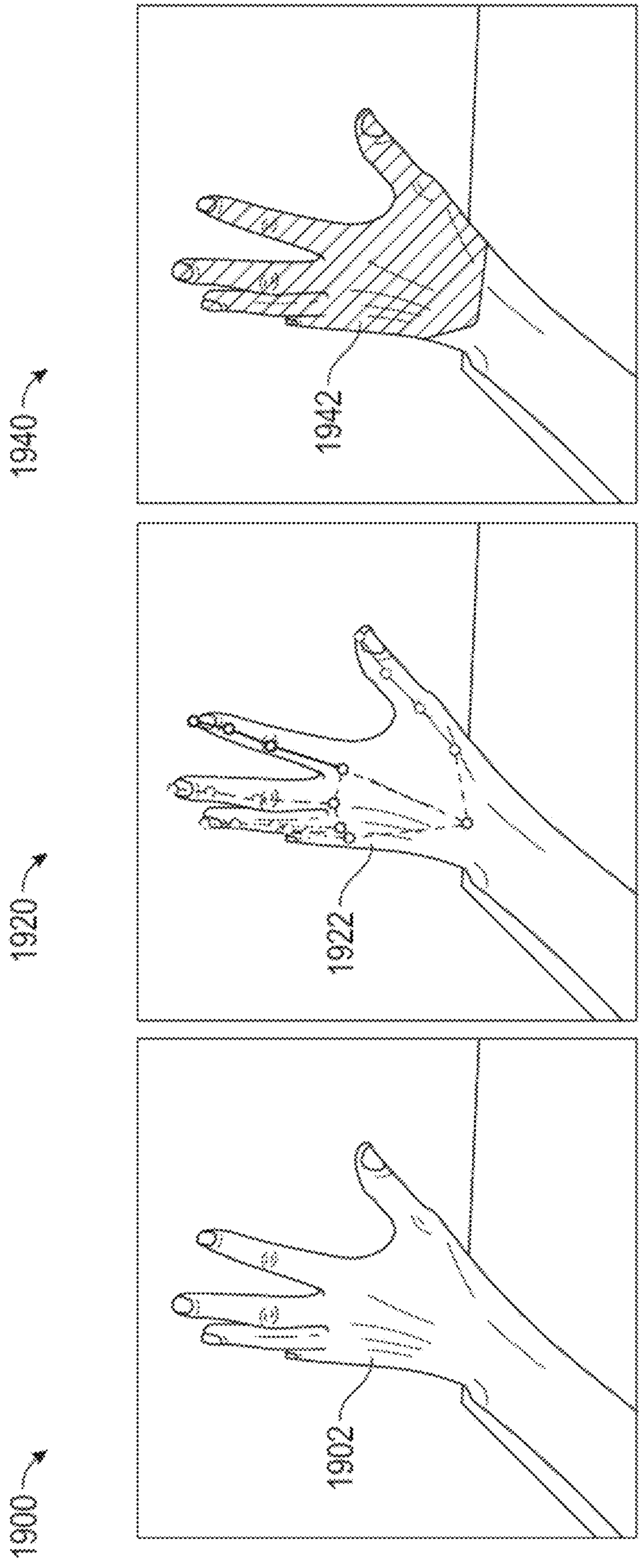
FIG. 19 shows an image of a hand, the image overlayed with hand landmarks detected by the hand landmarks detector of FIG. 18, and the image overlayed by hand segmentation generated by the hand region segmentor of FIG. 18, in embodiments.

FIG. 19 shows three images 1900, 1920, and 1940 of a hand 1902, where image 1920 is overlayed with hand landmarks 1922 detected by hand landmarks detector 1802 of FIG. 18, and image 1940 is overlayed by hand segmentation 1942 generated by hand region segmentor 1804 of FIG. 18, in embodiments.

Figure 20:
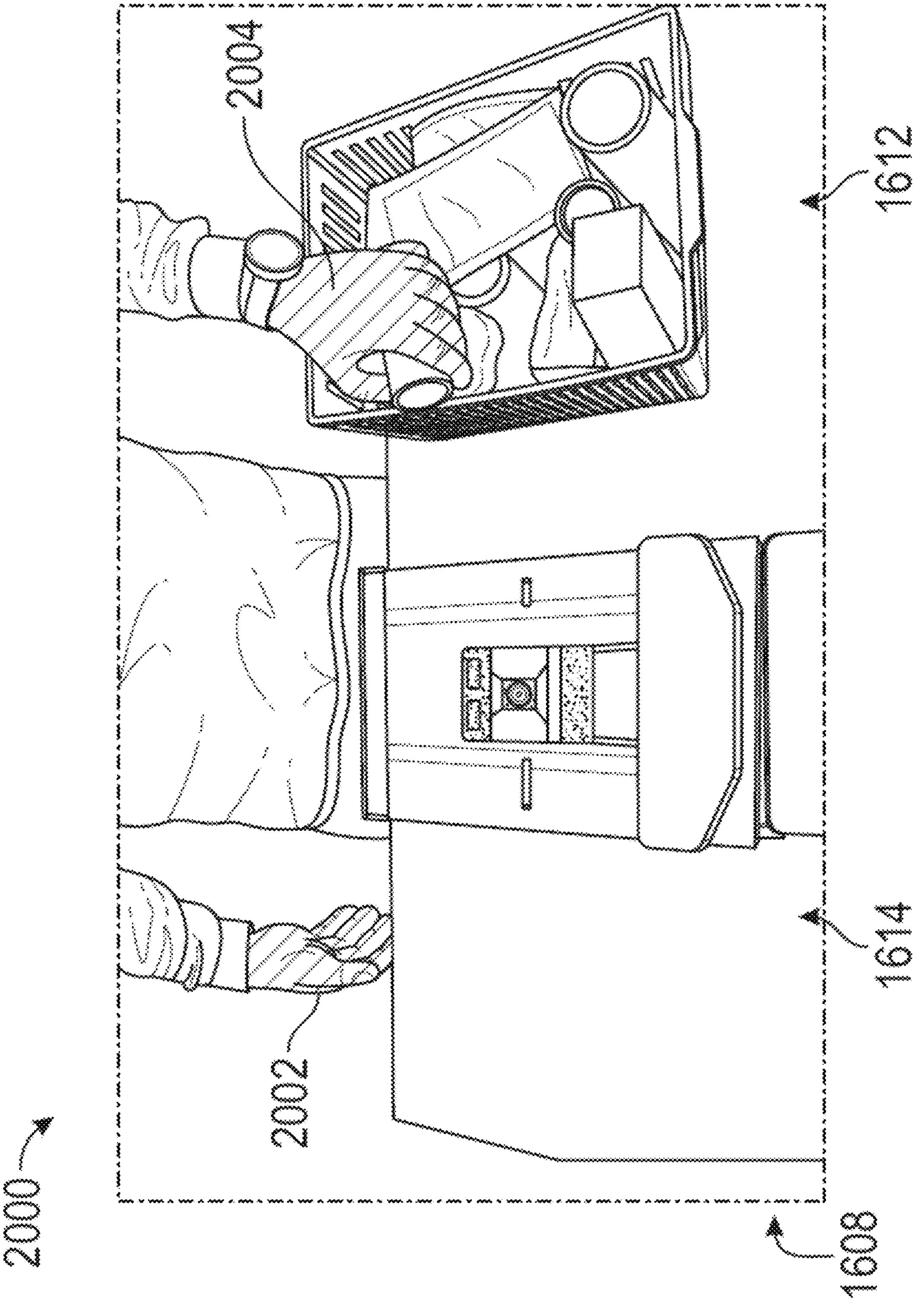
FIG. 20 is an image of an operational environment illustrating a segmented right hand and a segmented left hand, in embodiments.

FIG. 20 is an image 2000 of an operational environment (e.g., operational area 1608 of FIG. 16) illustrating a segmented right hand 2002 and a segmented left hand 2004, in embodiments. Image 2000 illustrates that hand segmentations functions reliably in a typical self-checkout scene.

Hand State Classification Module

Figure 21:
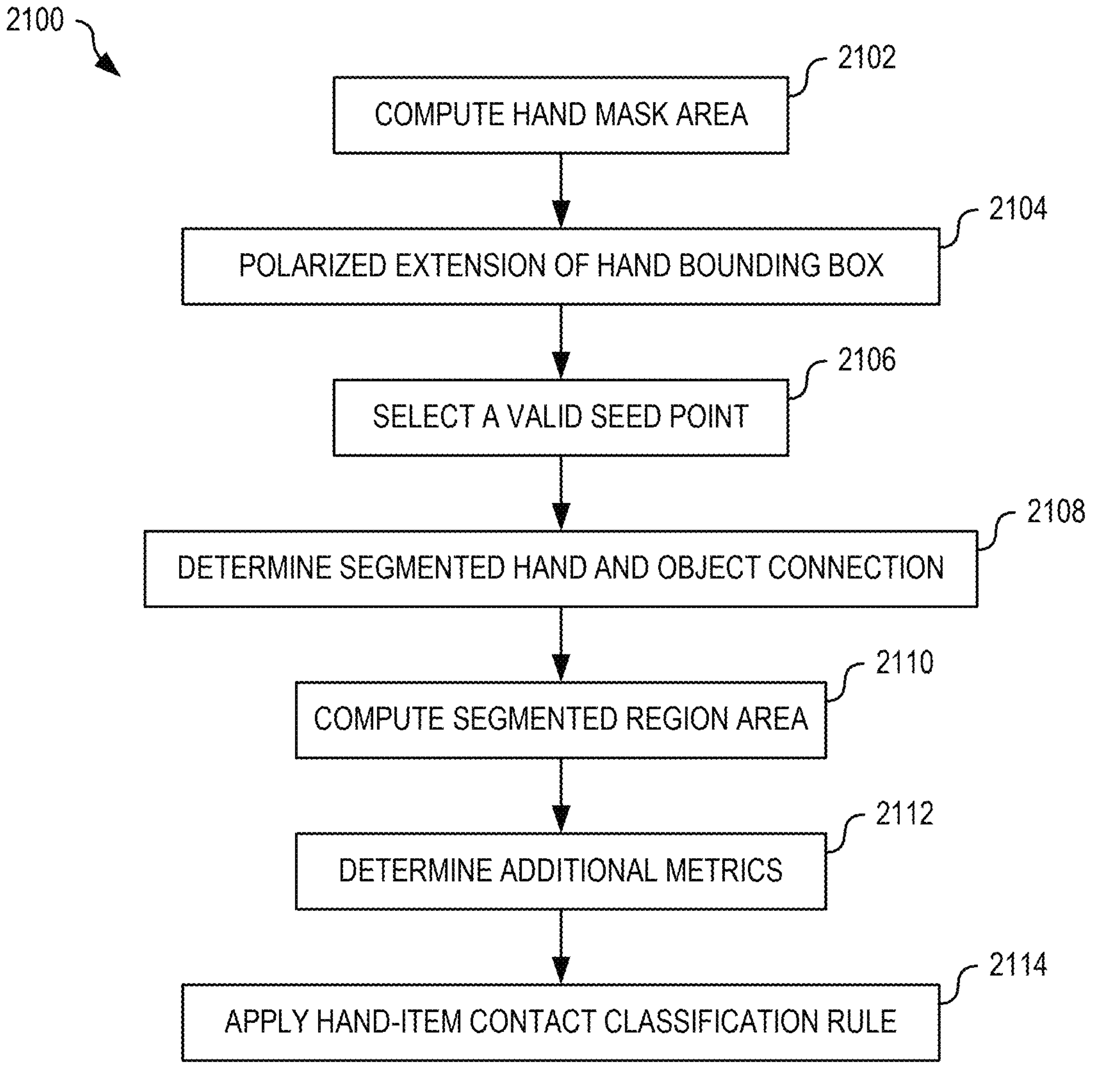
FIG. 21 is a flowchart illustrating one example method for determining hand-item contact based on the hand segmentation mask generated by the hand segmentation module of FIG. 17, in embodiments.
Figure 22A:
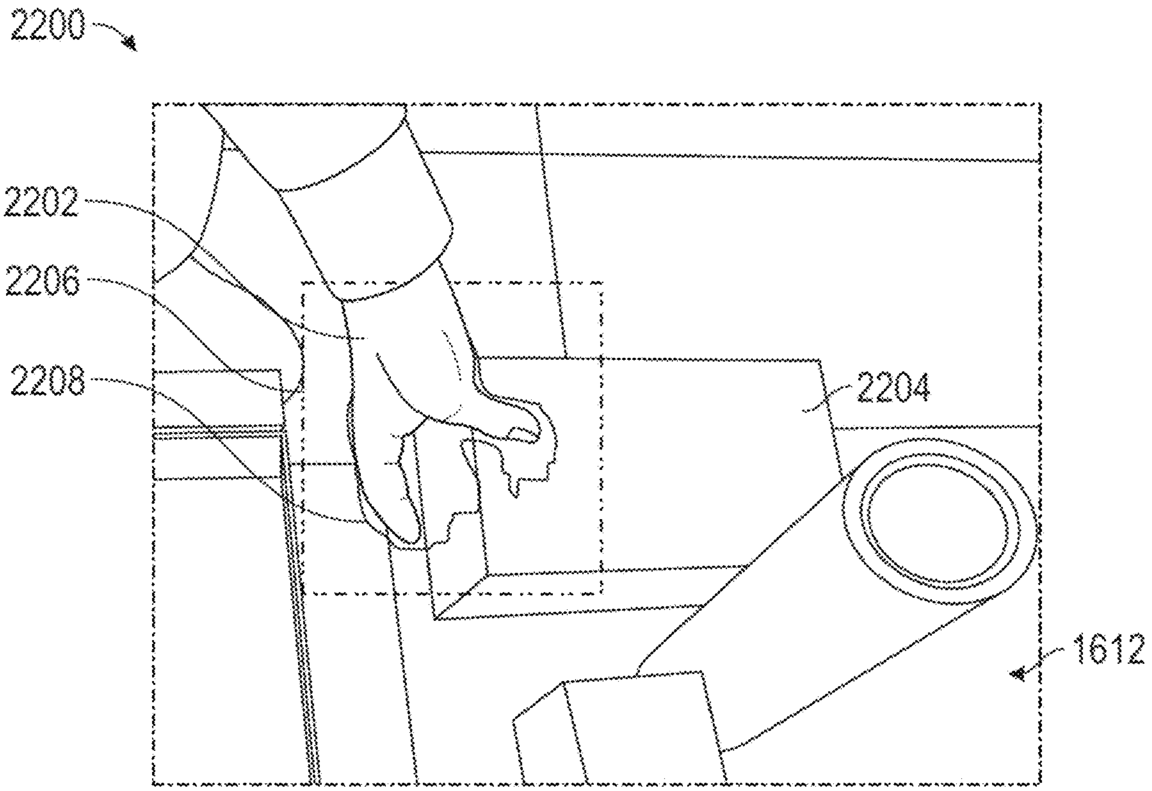
FIGS. 22A, 22B, and 22C show images illustrating the method of FIG. 21, in embodiments.
Figure 22B:
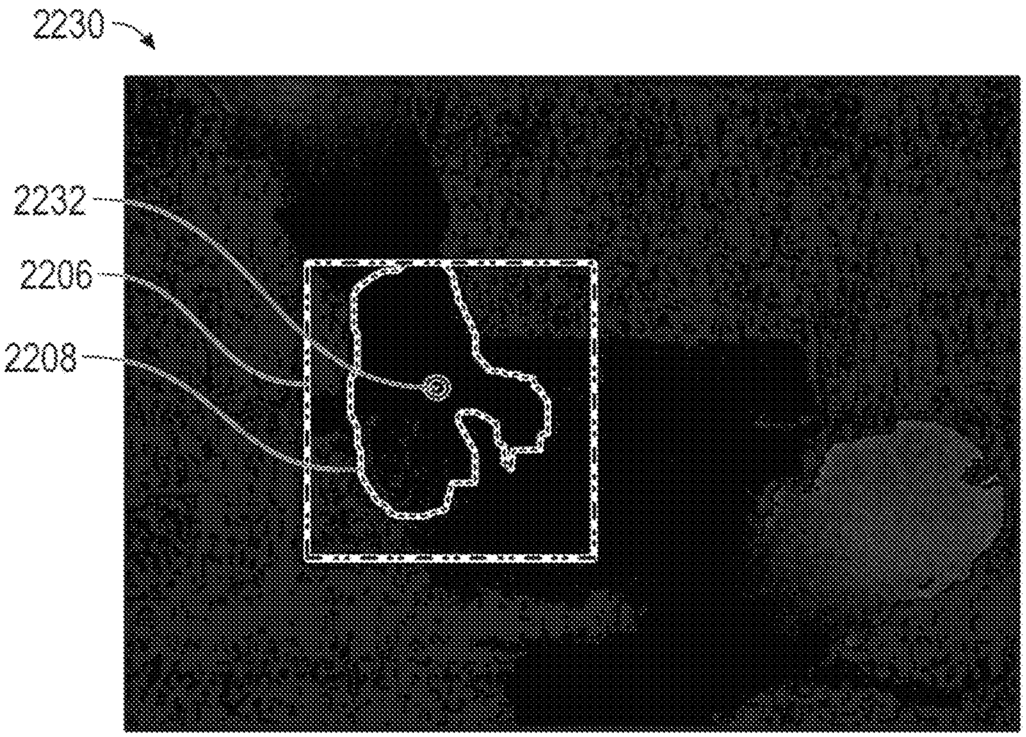
Figure 22C:
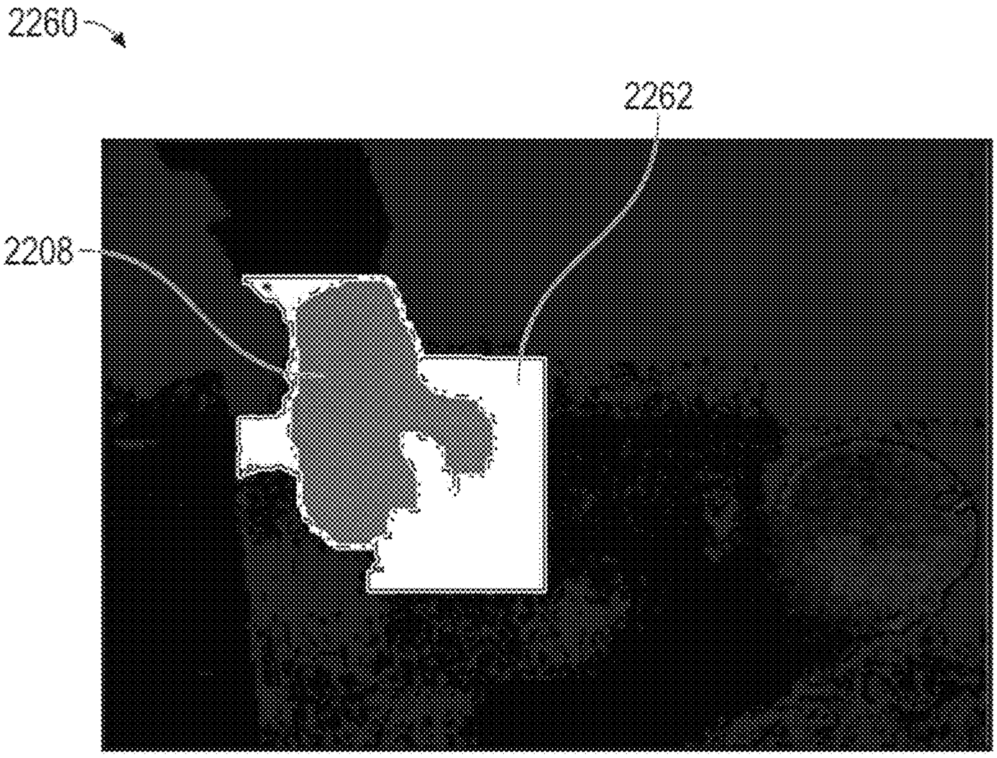

FIG. 21 is a flowchart illustrating one example method 2100 for determining hand-item contact based on hand segmentation mask 1806 generated by hand segmentation module 1712 of FIG. 17, in embodiments. Method 2100 is implemented in hand state classification module 1714 of FIG. 17, for example. FIGS. 22A, 22B, and 22C show images 2200, 2230, and 2260, respectively, illustrating method 2100 of FIG. 21, in embodiments. FIGS. 21, 22A, 22B, and 22C are best viewed together with the following description.

Image 2200 shows a right hand 2202 of the customer picking up an item 2204 from pickup area 1612, where hand 2202 is indicated by a bounding region 2206 and a segmentation mask outline 2208. Bounding region 2206 is shown as a rectangle in this example, but may be any shape without departing from the scope hereof. Bounding region 2206 defines an area of image 2200 that includes right hand 2202 of the customer. Image 2230 is a depth map overlayed by bounding region 2206 and segmentation mask outline 2208 and further illustrating a seed point 2232. Seed point 2232, positioned within segmentation mask outline 2208 (e.g., inside the hand) is used by a region growing algorithm/process as a starting point. The region growing algorithm/process evaluates position and depth data of surrounding pixels to detect pixels that are connected with seed point 2232 in 3D space and thereby determine whether or not right hand 2202 is in contact (e.g., very close in both position and depth) with item 2204. Particularly, bounding region 2206 is displayed in a first color (e.g., green) to indicate the contact of right hand 2202 with item 2204. Image 2260 shows a polarized extension 2262 of segmentation mask outline 2208. For this region growing step applied on the depth map, bounding region 2206 serves to limit the max region growing extent (which may not be necessary), and image 2260 shows segmentation mask outline 2208 and polarized extension 2262 limited to bounding region 2206.

In block 2102, method 2100 computes a hand mask area, which represents the region occupied by the hand. In one example of block 2102, hand mask and box to depth map projector 1812 calculates an area of segmentation mask outline 2208.

In block 2104, method 2100 generates a polarized extension of the hand bounding box. In one example of block 2104, hand state classification module 1714 extends bounding region 2206 to form polarized extension 2262, focusing on the area near the fingers. Polarized extension 2262 ensures that potential hand-object interactions are accounted for.

In block 2106, method 2100 selects a valid seed point. In one example of block 2106, hand state classification module 1714 defines seed point 2232 within segmentation mask outline 2208 based on a center of gravity of the contour of the segmentation mask outline 2208, if it is a valid seed point. In block 2108, method 2100 determines a segmented hand and object connection. In one example of block 2108, hand state classification module 1714 applies a region-growing process to segment both the hand and any connected object (if present). Particularly, hand state classification module 1714 enforces two critical constraints: spatial proximity, where the segmented region should be close to the seed point, and depth proximity, where the depth information from the registered depth map guides the segmentation process.

In block 2110, method 2100 computes a segmented region area. In one example of block 2110, hand state classification module 1714 determines the area of polarized extension 2262, which includes the hand and any connected object.

Block 2212 is optional. If included, in block 2212, method 2100 determines additional metrics for item segmentation. For example, to further refine the item segmentation (if an object is connected to the hand), hand state classification module 1714 may analyze the local depth map histogram and apply thresholding to the depth map depth histogram.

In block 2114, method 2100 applies at least one hand-item contact classification rule. In one example of block 2114, based on the hand and hand+connected object areas, hand state classification module 1714 applies the following classification rule: if the hand region area is significantly smaller than the hand+connected object area (e.g., by a factor of 1.3, where the factor is dependent upon the application specific setup), assume that the hand is carrying an item. Conversely, if hand state classification module 1714 determines that the areas are too close, hand state classification module 1714 infers that no item is connected to the hand, and the hand is empty (e.g., not carrying any item).

Advantageously, method 2100 ensures reliable hand-object contact state classification, which is crucial for self-checkout systems and other applications.

Figure 23A:
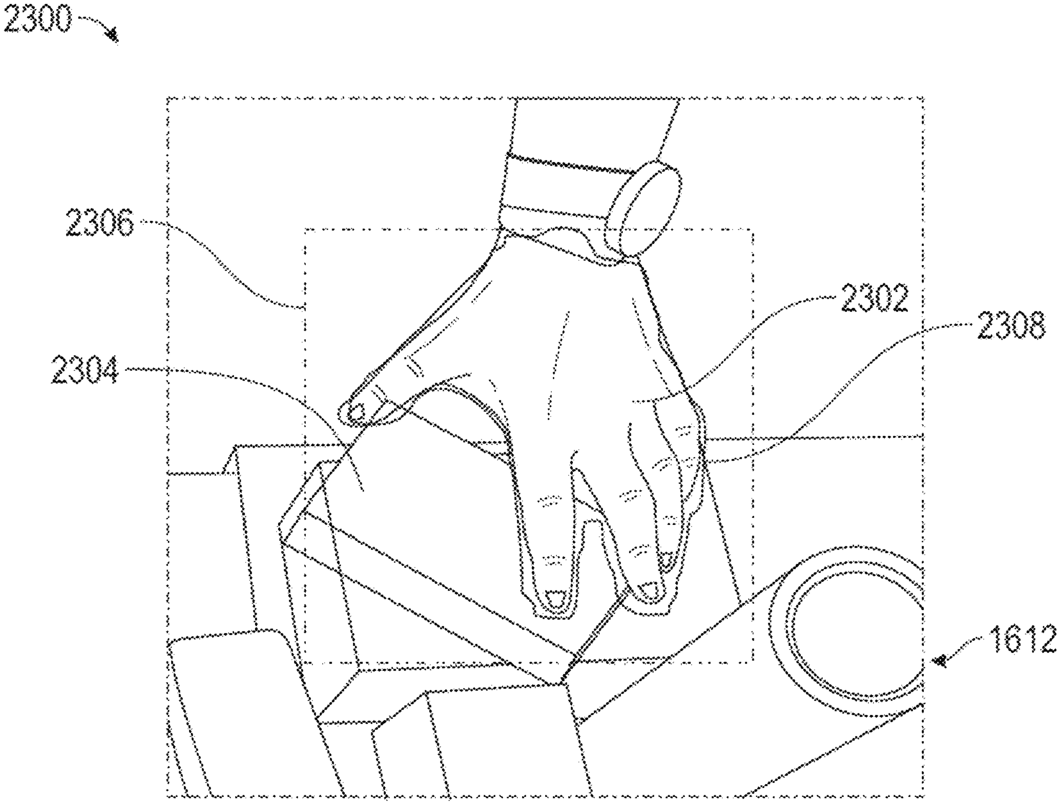
FIGS. 23A, 23B, and 23C show images illustrating a further example of the method of FIG. 21.
Figure 23B:
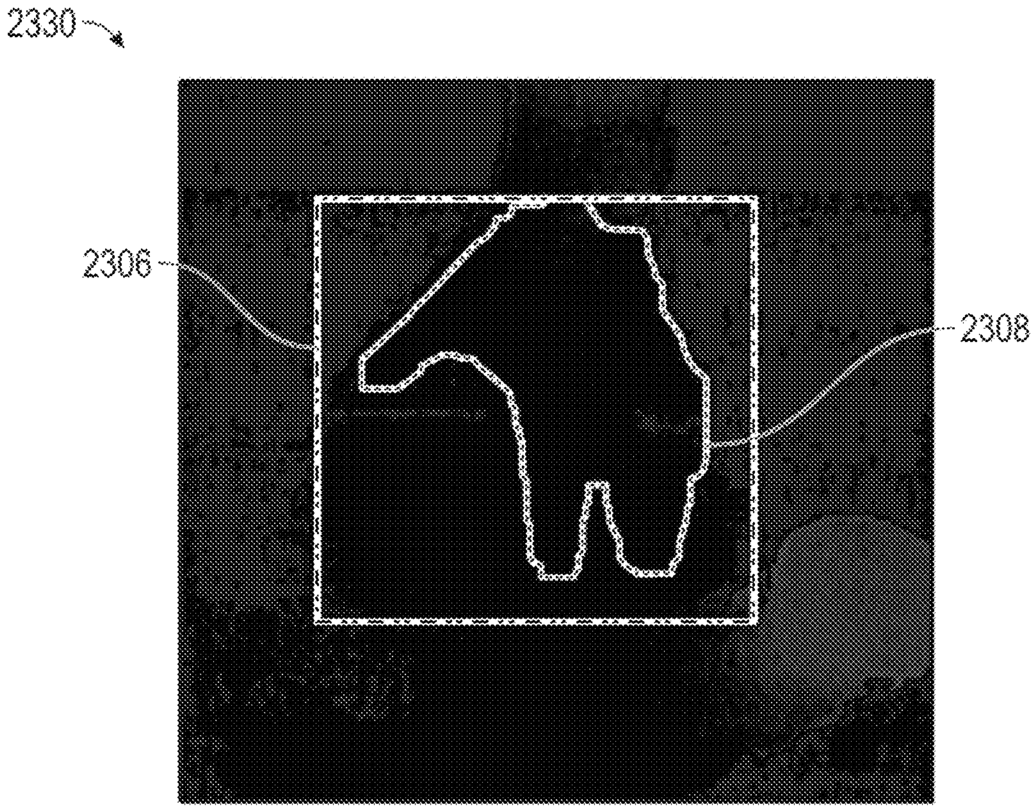
Figure 23C:
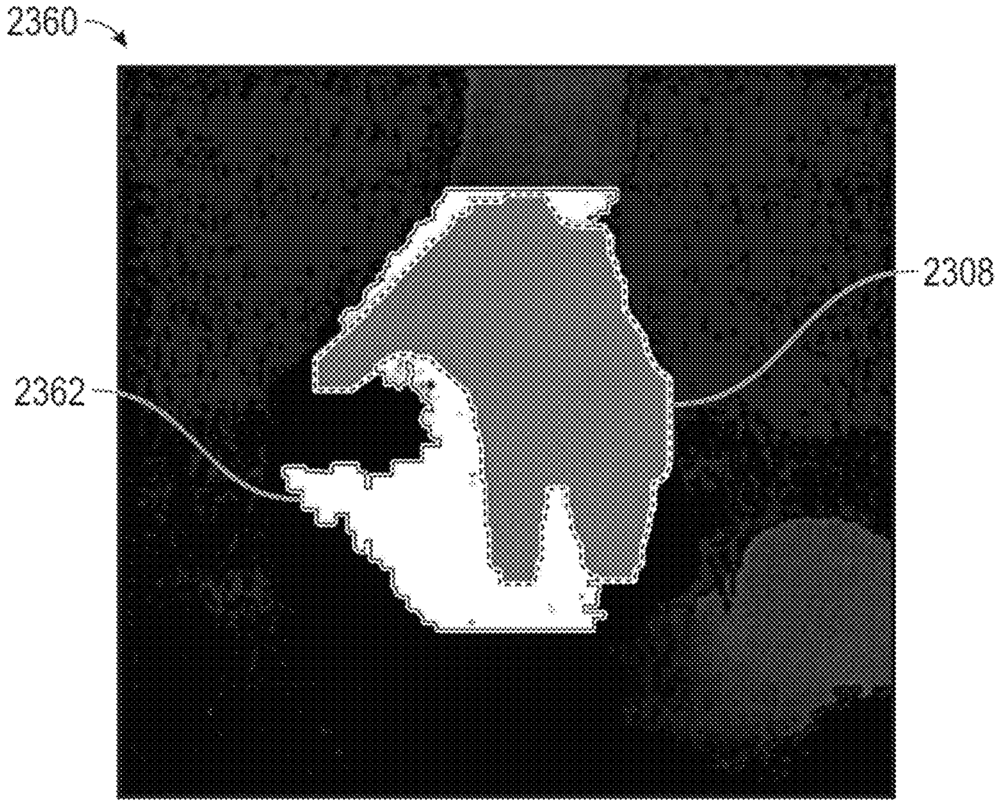

FIGS. 23A, 23B, and 23C show images 2300, 2330, and 2360, respectively, illustrating a further example of method 2100 of FIG. 21, where image 2300 shows a left hand 2302 of a customer moving an item 2304 from pickup area 1612. Hand 2302 is indicated by a bounding region 2306 and a segmentation mask outline 2308. Bounding region 2306 is shown as a rectangle in this example, but may be any shape without departing from the scope hereof. Bounding region 2306 defines an area of image 2300 that includes left hand 2302 of the customer. Image 2330 is a depth map overlayed by bounding region 2306 and segmentation mask outline 2308, where bounding region 2306 is displayed in a first color (e.g., green) to indicate the contact of right hand 2302 with item 2304. Image 2360 shows a polarized extension 2362 of segmentation mask outline 2308.

Figure 24A:
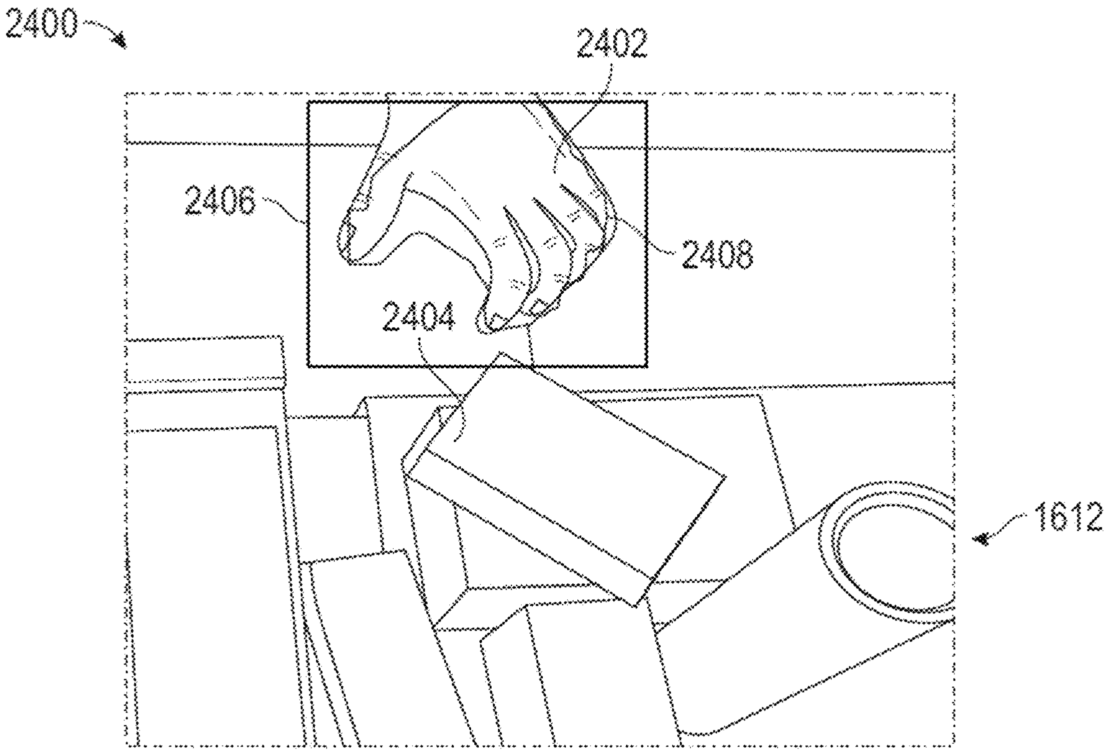
FIGS. 24A, 24B, and 24C show images illustrating a further example of the method of FIG. 21.
Figure 24B:
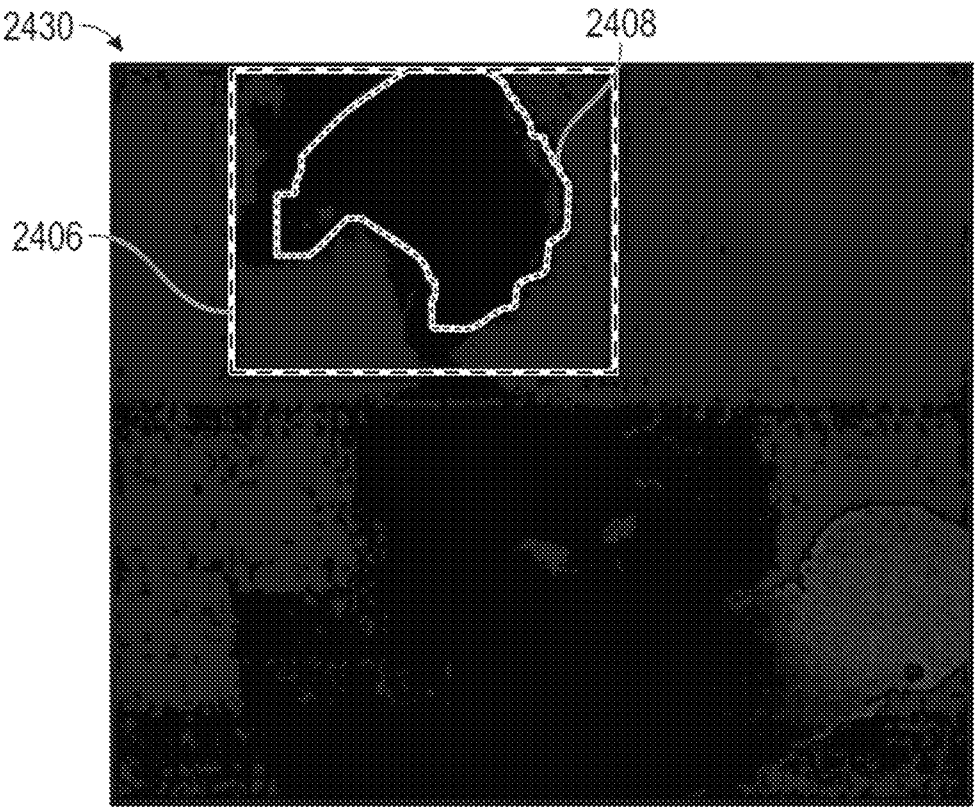
Figure 24C:
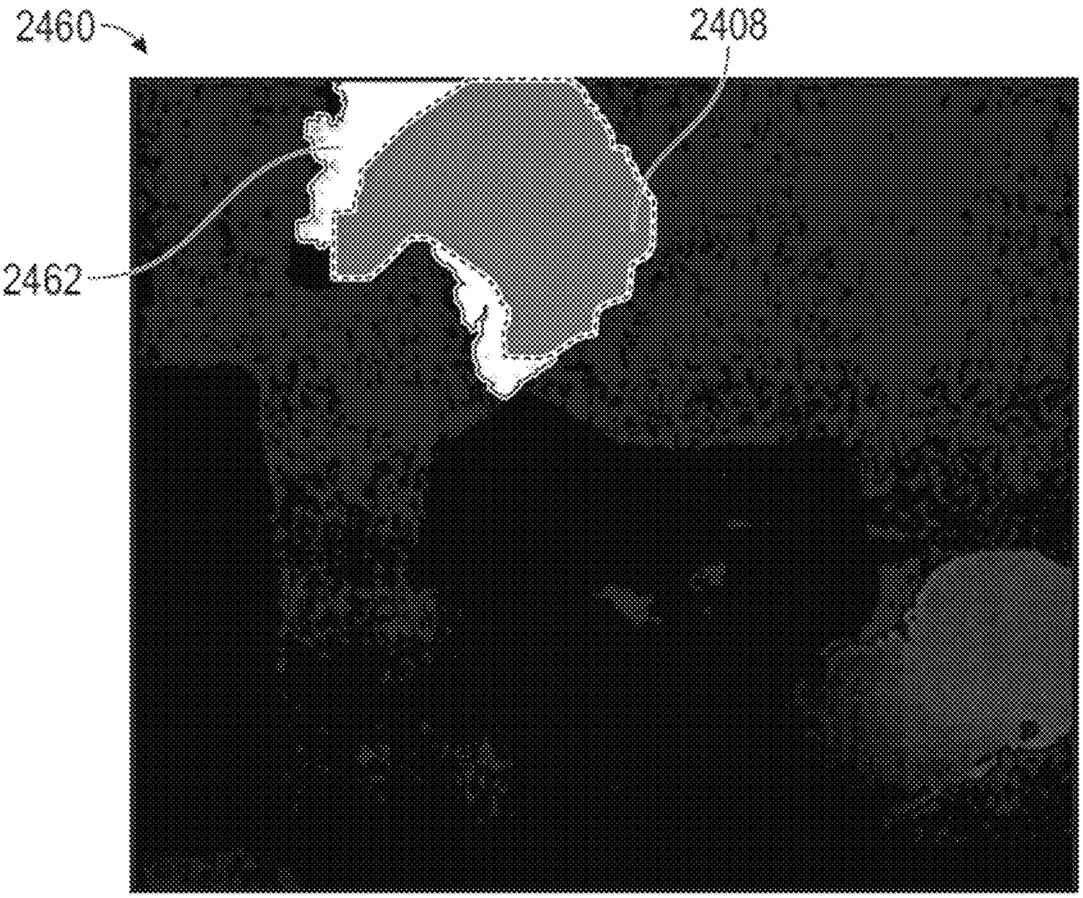

FIGS. 24A, 24B, and 24C show images 2400, 2430, and 2460, respectively, illustrating a further example of method 2100 of FIG. 21, where a left hand 2402 of a customer is not interacting with any item (e.g., item 2404). Hand 2402 is indicated by a bounding region 2406 and a segmentation mask outline 2408. Bounding region 2406 is shown as a rectangle in this example, but may be any shape without departing from the scope hereof. Bounding region 2406 defines an area of image 2400 that includes left hand 2402 of the customer. Image 2430 is a depth map overlayed by bounding region 2406 and segmentation mask outline 2408, where bounding region 2406 is displayed in a second color (e.g., yellow) to indicate that hand 2402 is not in contact with any item. Image 2460 shows a polarized extension 2462 of segmentation mask outline 2408 that does not include any item.

Method 2100 classifies the state of the hand contact with an object during a typical visual scan action, from the pick action in the pick region to the drop action in the drop region even without the need or capability to explicitly detect the objects in the scene. Further, method 2100 correctly classifies the state of the hand when not in contact with any object during a typical hand hovering over the scan region action.

Additional 3D Scene Information Advantages for Scan Avoidance Applications

The availability of 3D scene information (e.g., depth data 1611 from 3D sensor 1607) allows system 1600 to use other analysis techniques, such as 3D background suppression, object in contact with hand size/volume analysis, and implicit detection and validation of the hand-attached object during the visual scanning action without the need for explicit object detection.

Figure 25:
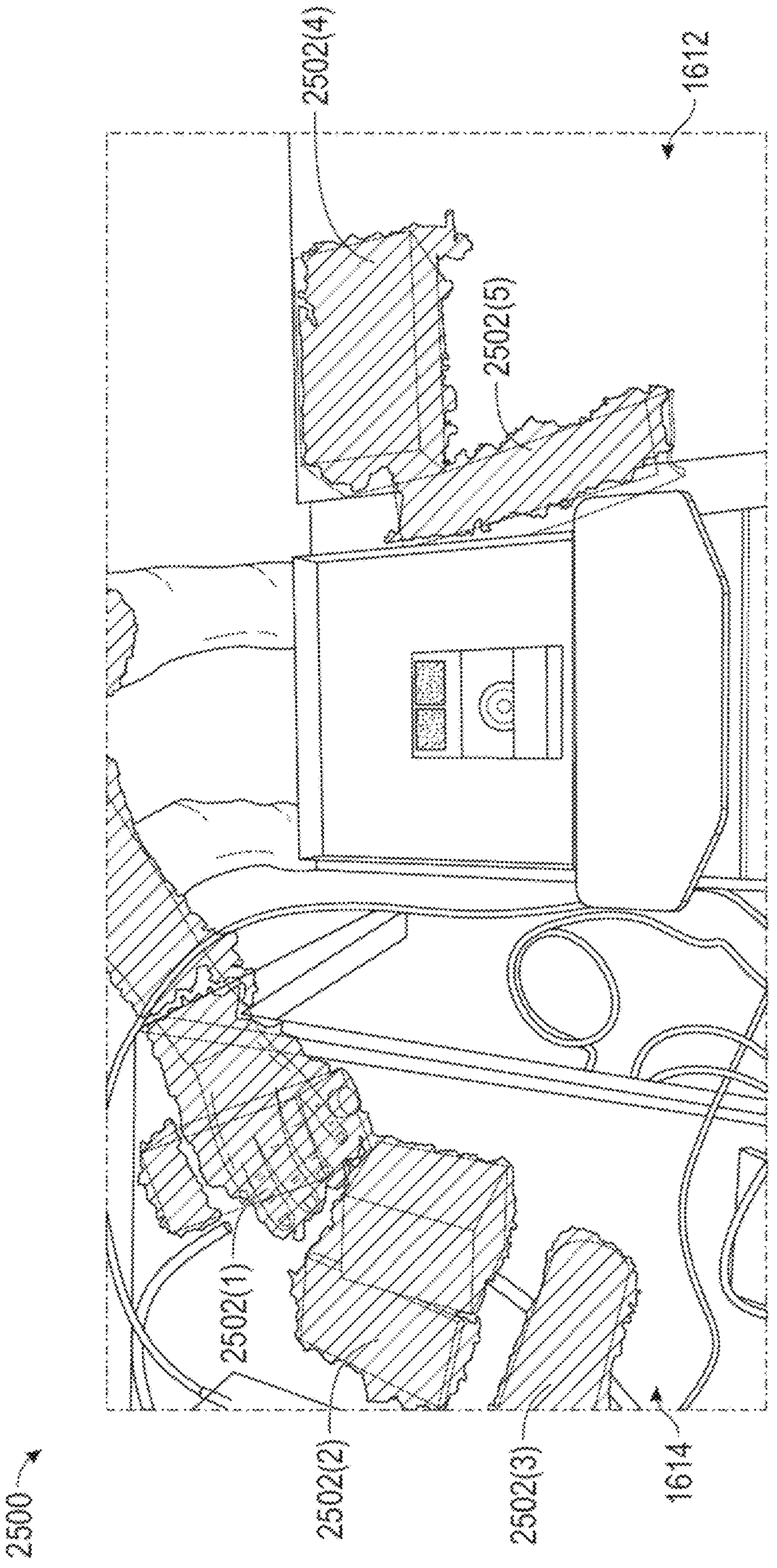
FIG. 25 is an image illustrating example 3D background suppression applied to a self-checkout scene, in embodiments.

FIG. 25 is an image 2500 illustrating example 3D background suppression applied to a self-checkout scene, in embodiments. 3D background suppression may be implemented in hand-item contact state classifier module 1710. Background suppression based on 2D video images 1610 is applied as a first preprocessing step on (e.g., similar to background suppression model 212 of image preprocessing module 210 of FIG. 2). 3D background suppression is based on depth data 1611 and is performed immediately after depth data 1611 is received and before any further processing. Particularly, 3D background suppression generates masks 2502 that cause items in pickup area 1612 and bagging area 1614 to stand out clearly from the background. The masks 2405 provide localization that enables additional data analysis. In this example, mask 2502(1) corresponds to a left hand of the consumer, and masks 2502(2)-(5) correspond to items within placed in pickup area 1612 and bagging area 1614. Masks 2502 provide localization that enables more reliable object counting in pick-and-drop regions and better support for scan avoidance analysis.

Masks 2502 and the localization improve size/volume analysis of objects in contact with hand, which supports transaction policies related to specific products such as cheap and guarded items. Size/volume analysis of an item allows system 1600 to detect machine-readable symbols switching behaviors (e.g., where a nefarious customer attaches a barcode from a cheaper item to a more expensive item). For example, system 1600 may determine a machine-readable symbols and item mismatch when the machine-readable symbols (read by scanner 1604) indicates a small item, whereas the size/volume analysis indicates a big item is presented to scanner 1604. Accordingly, size/volume analysis complements matching of machine-readable symbols and item appearance and improve detection of machine-readable symbols switching. Masks 2502 and the localization facilitate implicit detection and validation of the hand-attached object during the entire "visual scanning" action without the need for an explicit object detector.

By leveraging a robust hand detection and segmentation module based on both video images 1610 (e.g., color images) and depth data 1611, hand-item contact state classifier module 1710 effectively tracks the hand and any connected item within the scene. The absence of a complex, explicit, agnostic object detection module is compensated by the implicit validation that occurs when hand-item contact state classifier module 1710 recognizes the hand's connection to an item occupying a specific region in space. The correlation between the hand trajectory (including the connected item) and the self-checkout scanner's machine-readable code reading (or lack thereof) provides valuable insights for classifying user "visual scan" actions as either: (a) legitimate behavior, or (b) bad behavior. Legitimate behavior is when the item is moved from pickup area 1612 to bagging area 1614 and is correctly scanned by scanner 1604 such that it is added to the shopping list and bill. The legitimate behavior aligns with expected self-checkout procedures. The bad behavior occurs when the item is moved from pickup area 1612 to bagging area 1614 without being scanned by scanner 1604, such that it is not added to the transaction list. This behavior indicates intentional or unintentional scan avoidance. By collecting and analyzing this user action classification data, surveillance staff may effectively manage any issues according to company policies. It's a smart approach to ensure the integrity of self-checkout systems, enhance overall efficiency, and thereby, reducing profit losses.

To further illustrate the power of the depth map feature in enriching the system analysis, FIGS. 26A-29B each show one example visual image and a corresponding example depth map illustrating scan and drop actions characteristic of consumer behavior during a self-checkout procedure. Since camera 1606 is positioned above self-service point-of-sale terminal 1602 (e.g., looking down on operational area 1608), the visual image alone makes it difficult to discern whether the hand is touching the item of above the item. Depth data 1611 provides valuable height information (e.g., the shading in the depth map images) that allow the height of the hand and the height of the object to be compared. Depth data 1611 enables system 1600 to determine whether or not the consumer's hand is in contact (e.g., near in 3D space) with an item. In certain embodiments, hand-item contact state classifier module 1710 and/or hand state classification module 1714 apply a region growing algorithm to depth data 1611 to determine hand/item contact as described above; however, other techniques could be applied to classify hand-object proximity/contact without departing from the scope hereof.

Figure 26A:
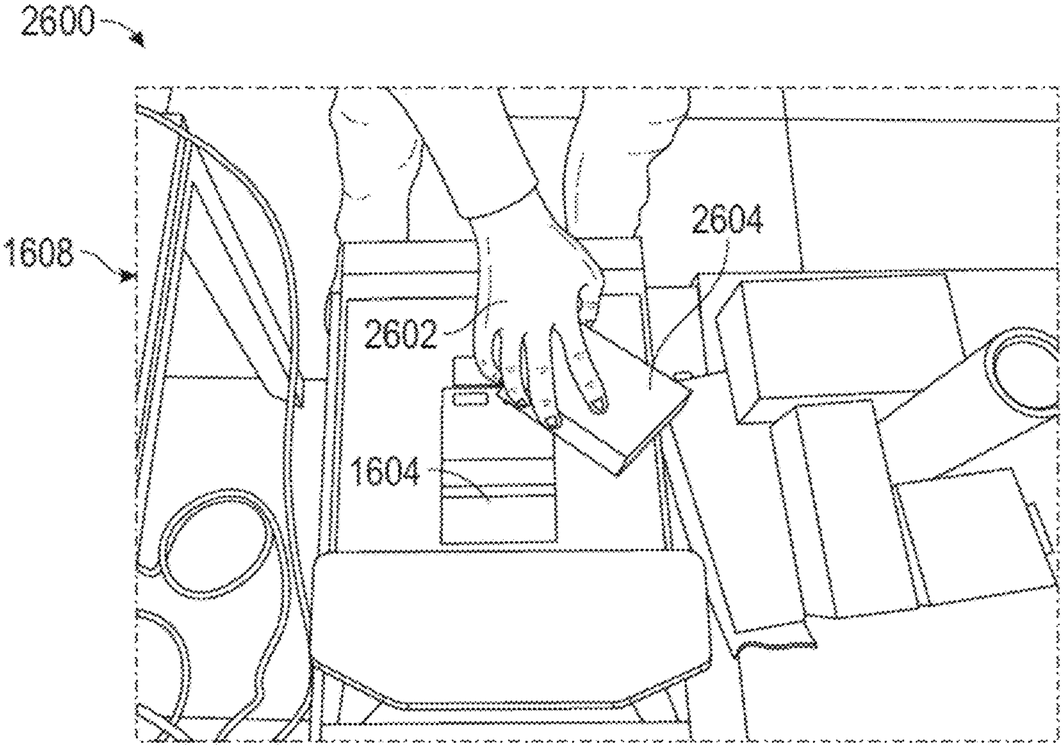
FIGS. 26A and 26B show a visual image illustrating a hand transporting an item across the scanner of FIG. 16 and a corresponding depth map of the operational area.
Figure 26B:
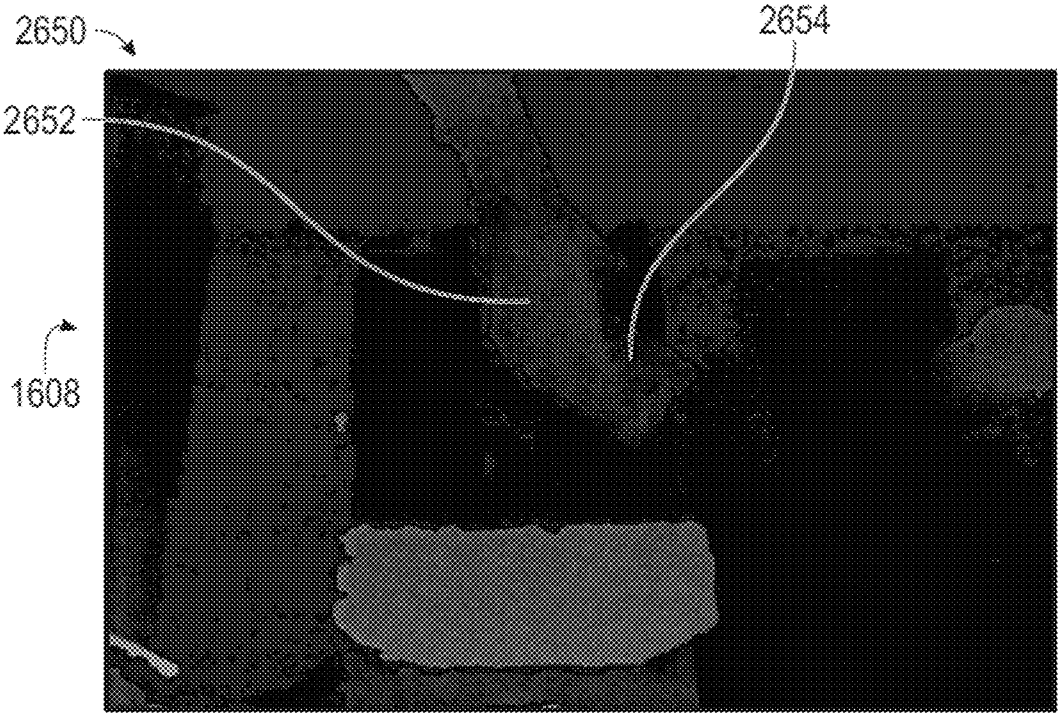

FIGS. 26A and 26B show a visual image 2600 and a corresponding depth map 2650 of operational area 1608 that show a hand 2602 transporting an item 2604 across scanner 1604. Depth map 2650 provides depth data, illustrated by shading intensity, that is positionally aligned with visual image 2600. Accordingly, visual image 2600 and depth map 2650 may be analyzed together to better discern when item 2604 is being carried by hand 2602. For example, when corresponding depth map 2650 indicates that hand 2602 and item 2604 are at similarly depths, hand 2602 may be determined to be carrying item 2604.

Figure 27A:
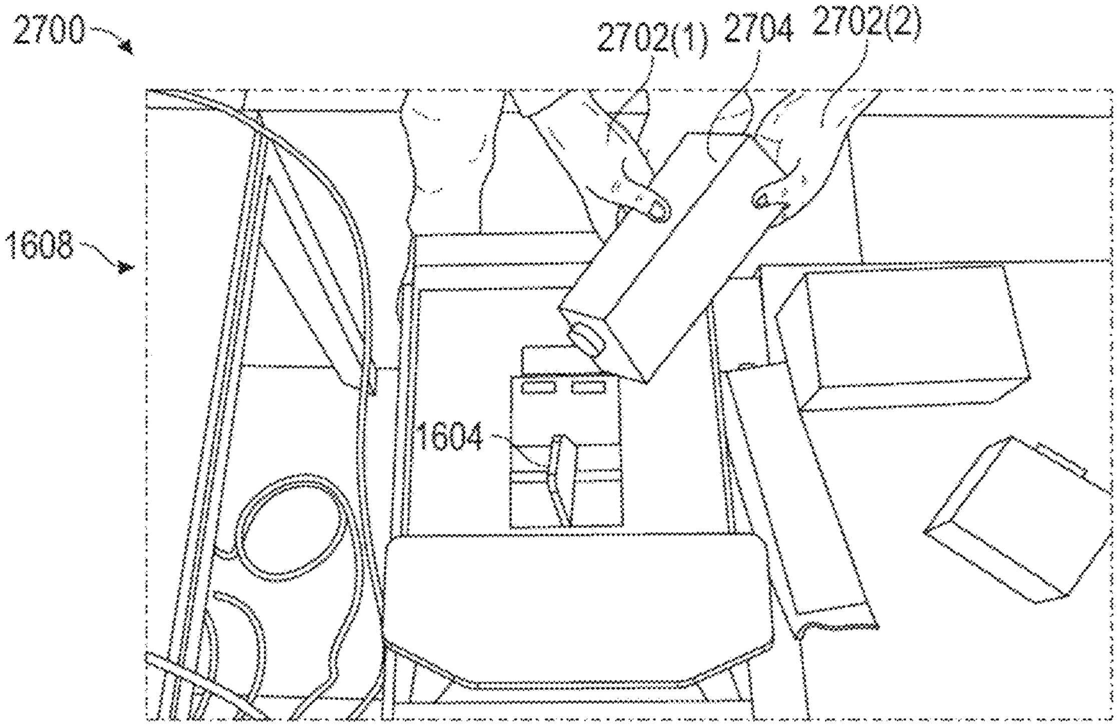
FIGS. 27A and 27B show a visual image and a corresponding depth map of two hands transporting an item through the operational area of FIG. 16.
Figure 27B:
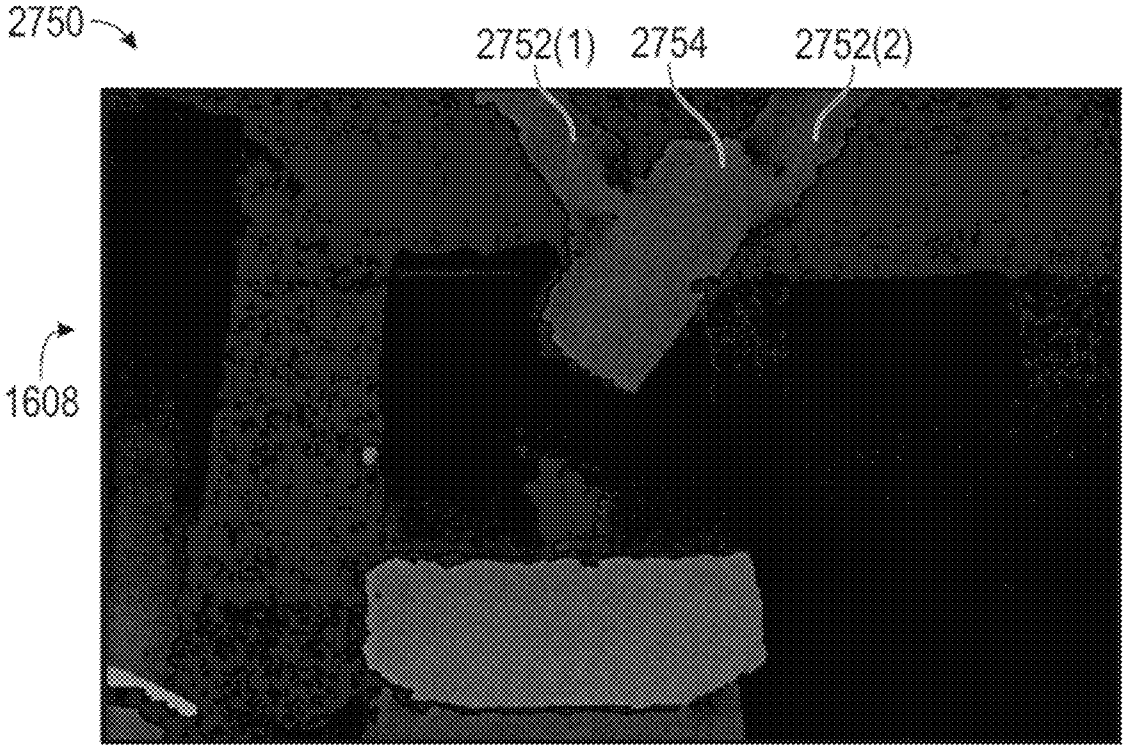

FIGS. 27A and 27B show a visual image 2700 and a corresponding depth map 2750 of two hands 2702(1) and 2702(2) transporting an item 2704 through operational area 1608. Depth map 2750 provides depth data, illustrated by shading intensity, that is positionally aligned with visual image 2700. Accordingly, visual image 2700 and depth map 2750 may be analyzed together to better discern that item 2704 is being carried by both hands 2702(1) and 2702(2).

Figure 28A:
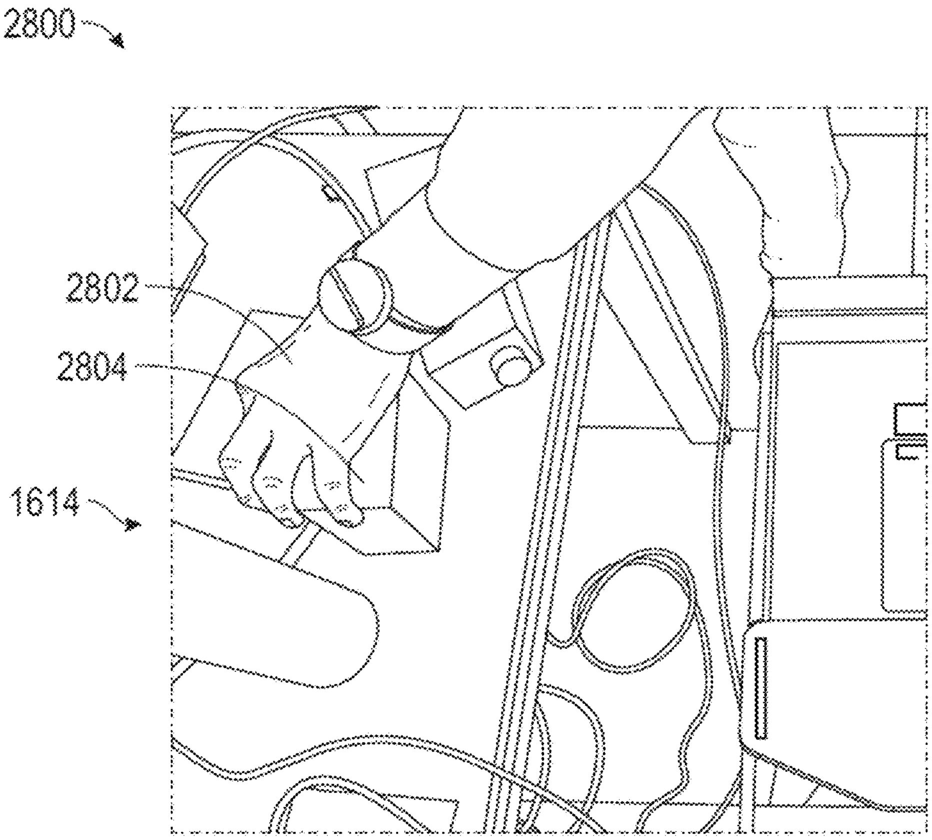
FIGS. 28A and 28B show visual image and a corresponding depth map of a hand placing an item in the bagging area of FIG. 16, representing the start of a drop action.
Figure 28B:
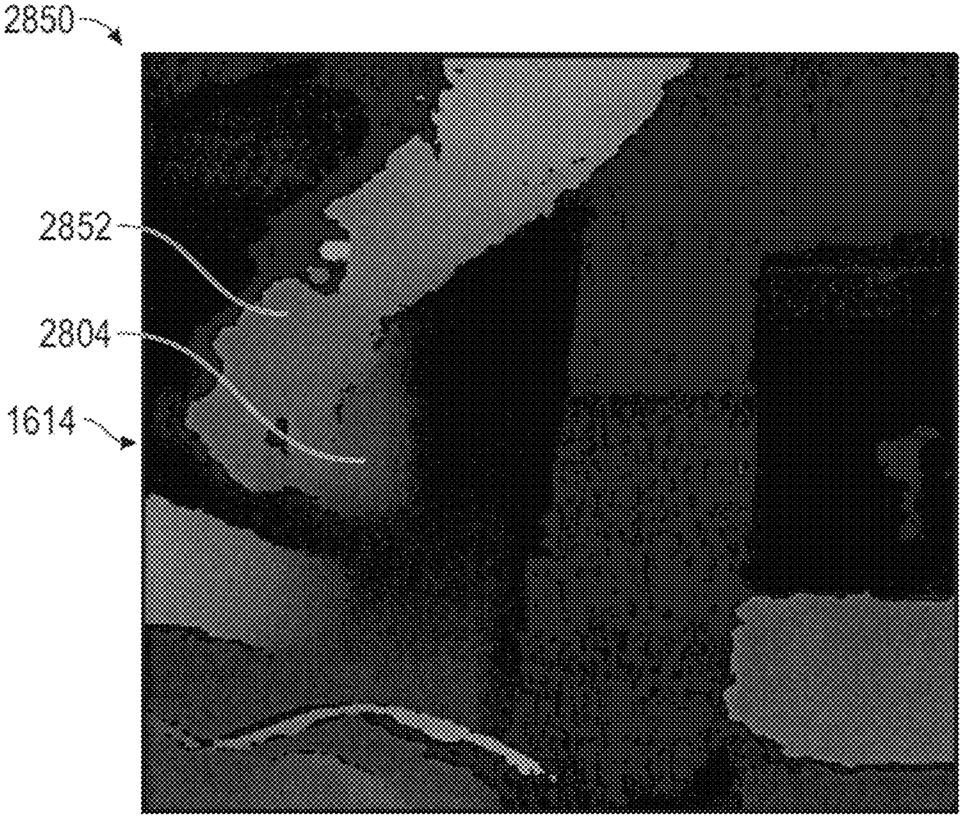

FIGS. 28A and 28B show visual image 2800 and a corresponding depth map 2850 of a hand 2802 placing an item 2804 in bagging area 1614, representing the start of a drop action. Depth map 2850 provides depth data, illustrated by shading intensity, that is positionally aligned with visual image 2800. Accordingly, visual image 2800 and depth map 2850 may be analyzed together to better discern that item 2804 is still in contact with hand 2802, indicating that item 2804 has not yet been released by hand 2802.

Figure 29A:
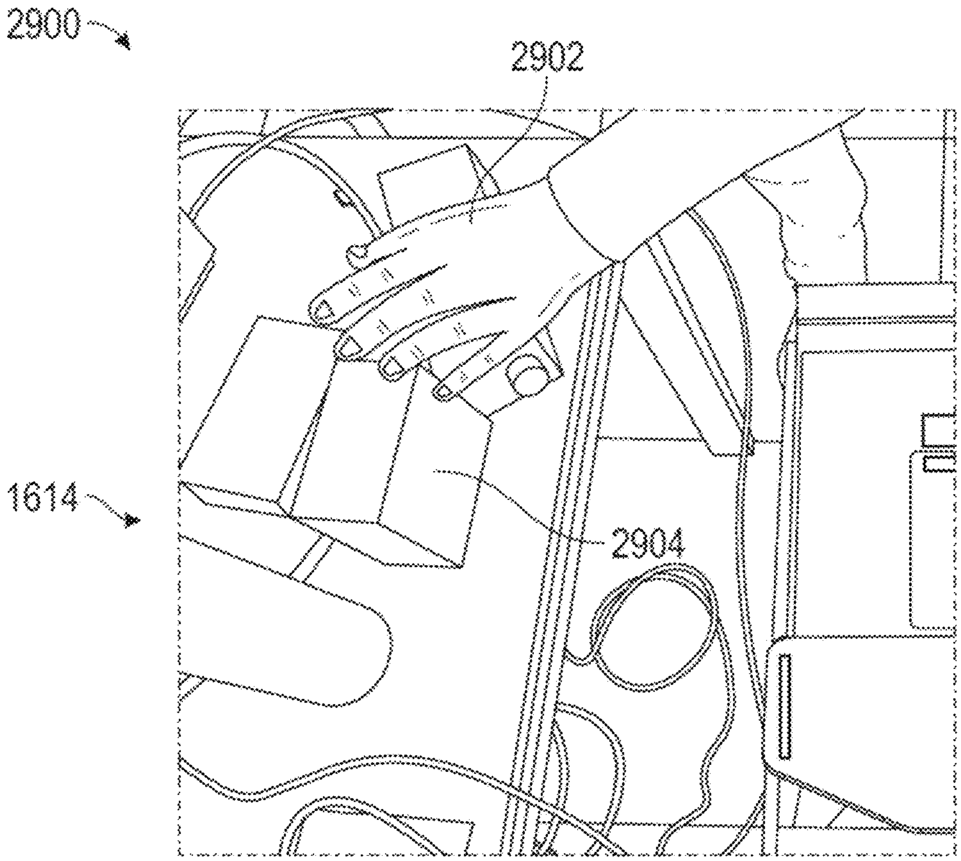
FIGS. 29A and 29B show a visual image and a corresponding depth map of a hand releasing an item in the bagging area of FIG. 16, representing completion of a drop action.
Figure 29B:
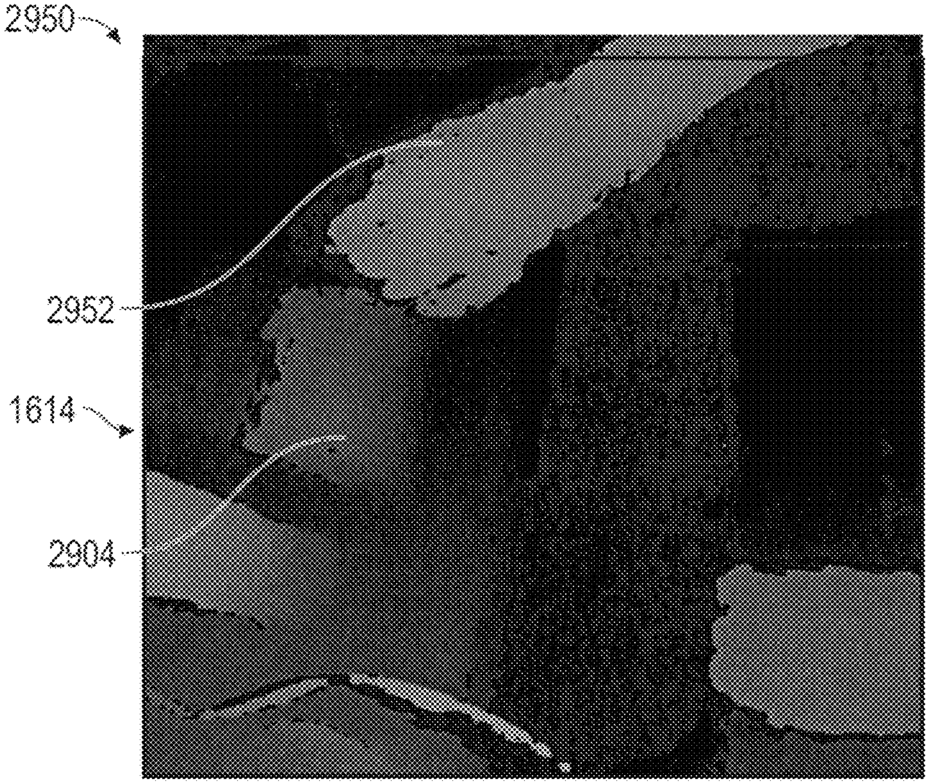

FIGS. 29A and 29B show a visual image 2900 and a corresponding depth map 2950 of a hand 2902 releasing an item 2904 in bagging area 1614, representing completion of a drop action. Depth map 2950 provides depth data, illustrated by shading intensity, that is positionally aligned with visual image 2900. Accordingly, visual image 2900 and depth map 2950 may be analyzed together to better discern that item 2904 is not in contact with hand 2902, indicating that item 2904 has been released by hand 2902.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system to detect scan avoidance behavior, comprising:

a camera positioned to capture video images of an operational area of a self-service point-of-sale terminal; and a computer having a processor and memory storing machine-executable instructions that, when executed by the processor, control the processor to:

receive video images from the camera;

preprocess frames of the video images to suppress background by generating a segmentation mask that restricts information in the frames to foreground pixels corresponding to interaction by a hand of a customer and an item within the operational area;

process the preprocessed video images to track movement, by a customer operating the self-service point-of-sale terminal, of the item as represented by an item region associated with a hand bounding region across successive frames, from a pickup area of the self-service point-of-sale terminal, through a scan area of a scanner of the self-service point-of-sale terminal, and to a bagging area of the self-service point-of-sale terminal; and determine scan avoidance when the movement indicates an item drop event in the bagging area for the tracked item region without receiving, from the scanner, a machine-readable code scan event associated with the tracked item region during movement through the scan area.

2. The system of claim 1, further comprising machine-executable instructions stored in the memory that, when executed by the processor, control the processor to generate the segmentation mask using a background suppression model trained on a set of training images representing a normal scene background, wherein the background suppression model divides each training image into rectangular patches, computes patch embeddings using selected layers of a pretrained neural network, learns Gaussian distribution parameters for the patch embeddings, and, during inference, compares patch embeddings for an input frame to the learned Gaussian distribution parameters based on Mahalanobis distance to determine the segmentation mask.

3. The system of claim 1, further comprising machine-executable instructions stored in the memory that, when executed by the processor, control the processor to generate an alert indicative of the scan avoidance.

4. The system of claim 1, further comprising machine-executable instructions stored in the memory that, when executed by the processor, control the processor to:

detect, within the video images, an item pick event when a hand of the customer picks the item up from a pickup area of the self-service point-of-sale terminal;

detect, within the video images, movement of the hand and the item through a scan area of a scanner of the self-service point-of-sale terminal;

detect, within the video images, an item drop event when the hand drops the item in a bagging area of the self-service point-of-sale terminal; and determine the scan avoidance when a machine-readable code scan event is not received from the scanner for the item during the movement through the scan area.

5. The system of claim 4, further comprising machine-executable instructions stored in the memory that, when executed by the processor, control the processor to determine that the hand is in contact with the item based on the segmentation mask and, when available, depth proximity.

6. The system of claim 4, further comprising machine-executable instructions stored in the memory that, when executed by the processor, control the processor to identify the item in a first frame of the video images and to reidentify the item frame to frame of the video images.

7. The system of claim 4, further comprising machine-executable instructions stored in the memory that, when executed by the processor, control the processor to classify the movement to determine when customer behavior indicates the scan avoidance by applying symbolic reasoning implemented by at least one finite-state machine configured to transition among pick, scan, and drop states based on the item pick event, the machine-readable code scan event, and the item drop event.

8. The system of claim 1, further comprising machine-executable instructions stored in the memory that, when executed by the processor, control the processor to determine the scan avoidance when the scanner did not read a label of the item during the movement of the item.

9. The system of claim 7, further comprising machine-executable instructions stored in the memory that, when executed by the processor, control the processor to determine the movement indicates scan avoidance when the movement is not classified as normal scan behavior by the at least one finite-state machine.

10. The system of claim 1, further comprising:

a depth sensor positioned to capture depth data of the operational area; and machine-executable instructions stored in the memory that, when executed by the processor, control the processor to process the video images and the depth data in a hand-item contact state classifier module that detects hand landmarks in the frames, segments and projects hand regions onto a registered depth map derived from the depth data to determine a hand contact status for the item by generating a polarized extension of a hand bounding region toward fingers, selecting a seed point within a segmentation mask outline of the hand, and implementing a region-growing process on a registered depth map with a spatial proximity constraint and a depth proximity constraint to segment a hand and a connected object.

11. A method for detecting scan avoidance behavior at a self-service point-of-sale terminal, comprising:

receiving video images of an operational area of the self-service point-of-sale terminal and receiving depth data of the operational area registered to the video images;

determining a hand bounding region indicative of a region in an image occupied by a hand of a consumer;

generating a polarized extension of the hand bounding region;

determining a segmented hand and object connection based on the polarized extension by implementing a region-growing process on a depth map derived from the depth data using (i) a spatial proximity constraint requiring a segmented region to be close to a seed point within the hand and (ii) a depth proximity constraint requiring depth information from the registered depth map to guide the region-growing process;

applying at least one hand-item contact classification rule to determine whether the hand is carrying an item; and determining scan avoidance behavior when the hand drops the item in a bagging area of the self-service point-of-sale terminal without a machine-readable code scan event.

12. The method of claim 11, the at least one hand-item contact classification rule comprising determining that the hand is carrying the item when a hand region area is smaller than a hand+connected object area by a factor defined for an application specific setup.

13. The method of claim 12, the at least one hand-item contact classification rule comprising determining that the hand is not carrying the item when a hand region area is not smaller than a hand+connected object area by a factor defined for an application specific setup.

14. The method of claim 11, wherein the polarized extension ensures inclusion of potential hand-object interactions.

15. The method of claim 11, further comprising:

selecting a seed point within a segmentation mask outline of the hand based on a center of gravity of a contour of the segmentation mask outline;

implementing a region-growing process to segment the hand and the connected item; and determining that the hand is carrying the item based on the segmented hand and connected item.

16. The method of claim 15, the region-growing process implementing a first constraint of spatial proximity that requires the segmented region to be close to the seed point, and a second constraint of depth proximity that requires depth information from a registered depth map guides the region-growing process.

17. The method of claim 11, further comprising analyzing a depth map histogram and determining whether the hand is carrying the item based on thresholding of the depth map depth histogram.

18. The method of claim 11, wherein the bounding region is a rectangle.

19. The method of claim 11, further comprising generating an alert to indicate detected scan avoidance.

20. The method of claim 19, the alert controlling a light corresponding to the self-service point-of-sale terminal.

* * * * *